US007606190B2

(12) United States Patent
Markovic et al.

(10) Patent No.: US 7,606,190 B2
(45) Date of Patent: Oct. 20, 2009

(54) APPARATUS AND MESSAGES FOR INTERWORKING BETWEEN UNLICENSED ACCESS NETWORK AND GPRS NETWORK FOR DATA SERVICES

(75) Inventors: Milan Markovic, Pleasanton, CA (US); Jianxiong Shi, Pleasanton, CA (US); Michael D. Gallagher, San Jose, CA (US); Rajeev Gupta, Sunnyvale, CA (US)

(73) Assignee: Kineto Wireless, Inc., Milpitas, CA (US)

( * ) Notice: Subject to any disclaimer, the term of this patent is extended or adjusted under 35 U.S.C. 154(b) by 423 days.

(21) Appl. No.: 11/128,461

(22) Filed: May 12, 2005

(65) Prior Publication Data

US 2005/0265279 A1    Dec. 1, 2005

Related U.S. Application Data

(63) Continuation-in-part of application No. 11/013,883, filed on Dec. 15, 2004, which is a continuation-in-part of application No. 10/688,470, filed on Oct. 17, 2003, now Pat. No. 7,127,250, application No. 11/128,461, which is a continuation-in-part of application No. 11/097,866, filed on Mar. 31, 2005.

(60) Provisional application No. 60/571,421, filed on May 14, 2004, provisional application No. 60/564,696, filed on Apr. 22, 2004, provisional application No. 60/419,785, filed on Oct. 18, 2002, provisional application No. 60/530,141, filed on Dec. 16, 2003, provisional application No. 60/552,455, filed on Mar. 12, 2004.

(51) Int. Cl.
*H04Q 7/00*    (2006.01)

(52) U.S. Cl. .................. 370/328; 370/329; 370/338; 370/341; 370/352; 455/435.1; 455/435.2

(58) Field of Classification Search .......... 370/328–329, 370/338, 348–349, 352, 401, 465–466, 469; 455/403, 435.1, 435.2, 552.1, 41.1, 466
See application file for complete search history.

(56) References Cited

U.S. PATENT DOCUMENTS 5,101,501 A    3/1992    Gilhousen et al.

(Continued)

FOREIGN PATENT DOCUMENTS

EP    0936777 A1    8/1999

(Continued)

OTHER PUBLICATIONS

U.S. Appl. No. 11/225,870, filed Sep. 12, 2005, Gallagher, Michael, Non-Final Office Action of related case mailed: May 30, 2006.

(Continued)

*Primary Examiner*—CongVan Tran
(74) *Attorney, Agent, or Firm*—Adeli & Tollen LLP

(57) ABSTRACT

Methods for performing various operations via unlicensed mobile access (UMA) radio link control (URLC) messages in an unlicensed mobile access network (UMAN). The UMAN comprises a first radio access network that may be employed for accessing data services provided by a core network comprising a second radio access network. URLC messages are exchanged between mobile stations (MSs) and UMA network controllers (UNCs) to perform various operations associated with the UMAN. An MS may access the UMAN via a wireless access point (AP) that is communicatively coupled to a UNC via an IP network. The URLC messages are sent between MSs and UNCs using an Up interface comprising a set of layered protocols over an underlying IP transport.

24 Claims, 21 Drawing Sheets

U.S. PATENT DOCUMENTS

| | | |
|---|---|---|
| 5,109,528 A | 4/1992 | Uddenfeldt |
| 5,226,045 A | 7/1993 | Chuang |
| 5,235,632 A | 8/1993 | Raith |
| 5,260,944 A | 11/1993 | Tomabechi |
| 5,260,988 A | 11/1993 | Schellineig et al. |
| 5,267,261 A | 11/1993 | Blakeney, II et al. |
| 5,327,578 A | 7/1994 | Breeden et al. |
| 5,333,175 A | 7/1994 | Ariyavisitakul |
| 5,367,558 A | 11/1994 | Gillis et al. |
| 5,390,233 A | 2/1995 | Jensen et al. |
| 5,392,331 A | 2/1995 | Patsiokas et al. |
| 5,406,615 A | 4/1995 | Miller et al. |
| 5,428,601 A | 6/1995 | Owen |
| 5,442,680 A | 8/1995 | Schellinger et al. |
| 5,448,619 A | 9/1995 | Evans et al. |
| 5,475,677 A | 12/1995 | Arnold et al. |
| 5,488,649 A | 1/1996 | Schellinger |
| 5,507,035 A | 4/1996 | Bantz et al. |
| 5,509,052 A | 4/1996 | Chia et al. |
| 5,515,420 A | 5/1996 | Urasaka et al. |
| 5,533,027 A | 7/1996 | Akerberg et al. |
| 5,594,782 A | 1/1997 | Zicker et al. |
| 5,610,969 A | 3/1997 | McHenry |
| 5,634,193 A | 5/1997 | Ghisler |
| 5,640,414 A | 6/1997 | Blakeney, II et al. |
| 5,659,598 A | 8/1997 | Byrne |
| 5,659,878 A | 8/1997 | Uchida et al. |
| 5,664,005 A | 9/1997 | Emery et al. |
| 5,673,307 A | 9/1997 | Holland et al. |
| 5,675,629 A | 10/1997 | Raffel et al. |
| 5,724,658 A | 3/1998 | Hasan |
| 5,732,076 A | 3/1998 | Ketseoglou et al. |
| 5,745,852 A | 4/1998 | Khan et al. |
| 5,758,281 A | 5/1998 | Emery et al. |
| 5,796,727 A | 8/1998 | Harrison et al. |
| 5,796,729 A | 8/1998 | Greaney et al. |
| 5,812,511 A | 9/1998 | Kawamura et al. |
| 5,812,522 A | 9/1998 | Lee et al. |
| 5,815,525 A | 9/1998 | Smith |
| 5,818,820 A | 10/1998 | Anderson et al. |
| 5,822,681 A | 10/1998 | Chang et al. |
| 5,822,767 A | 10/1998 | MacWilliams et al. |
| 5,825,759 A | 10/1998 | Liu |
| 5,852,767 A | 12/1998 | Sugita |
| 5,862,345 A | 1/1999 | Okanoue et al. |
| 5,870,677 A | 2/1999 | Takahashi et al. |
| 5,887,020 A | 3/1999 | Smith et al. |
| 5,887,260 A | 3/1999 | Nakata |
| 5,890,055 A | 3/1999 | Chu et al. |
| 5,890,064 A | 3/1999 | Widergen et al. |
| 5,903,834 A | 5/1999 | Wallstedt et al. |
| 5,915,224 A | 6/1999 | Jonsson |
| 5,926,760 A | 7/1999 | Khan et al. |
| 5,936,949 A | 8/1999 | Pasternak et al. |
| 5,940,512 A | 8/1999 | Tomoike |
| 5,946,622 A | 8/1999 | Bojeryd |
| 5,949,773 A | 9/1999 | Bhalla et al. |
| 5,960,341 A | 9/1999 | LeBlanc et al. |
| 5,960,361 A | 9/1999 | Chen |
| 5,960,364 A | 9/1999 | Dent |
| 5,987,010 A | 11/1999 | Schnizlein |
| 5,995,828 A | 11/1999 | Nishida |
| 6,016,318 A | 1/2000 | Tomoike |
| 6,035,193 A | 3/2000 | Buhrmann et al. |
| 6,052,592 A | 4/2000 | Schellinger et al. |
| 6,101,176 A | 8/2000 | Honkasalo |
| 6,112,080 A | 8/2000 | Anderson et al. |
| 6,112,088 A | 8/2000 | Haartsen |
| 6,119,000 A | 9/2000 | Stephenson et al. |
| 6,130,886 A | 10/2000 | Ketseoglou et al. |
| 6,134,227 A | 10/2000 | Magana |
| 6,138,019 A | 10/2000 | Trompower et al. |
| 6,167,279 A * | 12/2000 | Chang et al. ............... 455/462 |
| 6,226,515 B1 | 5/2001 | Pauli |
| 6,229,792 B1 | 5/2001 | Anderson et al. |
| 6,236,852 B1 | 5/2001 | Veerasamy et al. |
| 6,243,581 B1 | 6/2001 | Jawanda |
| 6,246,489 B1 | 6/2001 | Park |
| 6,256,511 B1 | 7/2001 | Brown |
| 6,263,211 B1 | 7/2001 | Brunner |
| 6,269,086 B1 | 7/2001 | Magana et al. |
| 6,320,873 B1 | 11/2001 | Nevo et al. |
| 6,327,470 B1 | 12/2001 | Ostling |
| 6,359,872 B1 | 3/2002 | Mahany et al. |
| 6,374,102 B1 | 4/2002 | Brachman et al. |
| 6,381,457 B1 | 4/2002 | Carlsson et al. |
| 6,389,059 B1 | 5/2002 | Smith et al. |
| 6,393,007 B1 | 5/2002 | Haartsen |
| 6,415,158 B1 | 7/2002 | King et al. |
| 6,426,819 B1 | 7/2002 | Crimmins et al. |
| 6,430,395 B2 | 8/2002 | Arazi et al. |
| 6,434,389 B1 | 8/2002 | Meskanen et al. |
| 6,445,921 B1 | 9/2002 | Bell |
| 6,463,307 B1 | 10/2002 | Larsson et al. |
| 6,498,934 B1 | 12/2002 | Muller |
| 6,539,237 B1 | 3/2003 | Sayers et al. |
| 6,542,516 B1 | 4/2003 | Vialen et al. |
| 6,553,219 B1 | 4/2003 | Vilander et al. |
| 6,556,822 B1 | 4/2003 | Matsumoto |
| 6,556,825 B1 | 4/2003 | Mansfield |
| 6,556,830 B1 | 4/2003 | Lenzo |
| 6,557,055 B1 | 4/2003 | Wiese |
| 6,574,266 B1 | 6/2003 | Haartsen |
| 6,587,444 B1 | 7/2003 | Lenzo et al. |
| 6,600,925 B1 | 7/2003 | Rams |
| 6,633,614 B1 | 10/2003 | Barton et al. |
| 6,633,761 B1 | 10/2003 | Singhal |
| 6,643,512 B1 | 11/2003 | Ramaswamy |
| 6,647,426 B2 | 11/2003 | Mohammed |
| 6,658,250 B1 | 12/2003 | Ganesan et al. |
| 6,665,276 B1 | 12/2003 | Culbertson et al. |
| 6,675,009 B1 | 1/2004 | Cook |
| 6,680,923 B1 | 1/2004 | Leon |
| 6,711,400 B1 | 3/2004 | Aura |
| 6,766,160 B1 | 7/2004 | Lemilainen |
| 6,785,535 B2 | 8/2004 | Lucidarme et al. |
| 6,788,656 B1 | 9/2004 | Smolentzov et al. |
| 6,801,519 B1 | 10/2004 | Mangel |
| 6,801,772 B1 | 10/2004 | Townend et al. |
| 6,801,777 B2 | 10/2004 | Rusch |
| 6,807,417 B2 | 10/2004 | Sallinen |
| 6,823,154 B2 | 11/2004 | Koga et al. |
| 6,824,048 B1 | 11/2004 | Itabashi et al. |
| 6,826,154 B2 | 11/2004 | Subbiah et al. |
| 6,829,227 B1 | 12/2004 | Pitt |
| 6,842,462 B1 | 1/2005 | Ramjee et al. |
| 6,842,621 B2 | 1/2005 | Labun et al. |
| 6,845,095 B2 | 1/2005 | Krishnarajah et al. |
| 6,850,503 B2 | 2/2005 | Dorenbosch et al. |
| 6,853,851 B1 | 2/2005 | Rautiola et al. |
| 6,895,255 B1 | 5/2005 | Bridgelall |
| 6,909,705 B1 | 6/2005 | Lee et al. |
| 6,922,559 B2 | 7/2005 | Mohammed |
| 6,925,074 B1* | 8/2005 | Vikberg et al. ............... 370/338 |
| 6,937,862 B2 | 8/2005 | Back et al. |
| 6,957,249 B2 | 10/2005 | Salo et al. |
| 6,970,719 B1 | 11/2005 | McConnell et al. |
| 6,993,359 B1 | 1/2006 | Nelakanti |
| 7,009,952 B1 | 3/2006 | Razavilar et al. |
| 7,028,186 B1 | 4/2006 | Stenman et al. |
| 7,039,025 B1 | 5/2006 | Menon et al. |
| 7,099,339 B1 | 8/2006 | Wang et al. |
| 7,107,055 B2 | 9/2006 | Gallagher et al. |
| 7,127,250 B2 | 10/2006 | Gallagher et al. |

| Patent No. | Date | Name |
|---|---|---|
| 7,171,205 B2 | 1/2007 | Gallagher |
| 7,197,309 B2 | 3/2007 | Gallagher |
| 7,200,112 B2 | 4/2007 | Sundar et al. |
| 7,200,399 B2 | 4/2007 | Gallagher |
| 7,209,744 B2 | 4/2007 | Gallagher |
| 7,212,819 B2 | 5/2007 | Gallagher |
| 7,215,961 B2 | 5/2007 | Gallagher |
| 7,231,046 B1 | 6/2007 | Einola et al. |
| 7,245,916 B2 | 7/2007 | Gallagher |
| 7,251,227 B2 | 7/2007 | de Jong et al. |
| 7,283,821 B2 | 10/2007 | Gallagher |
| 7,283,822 B2 | 10/2007 | Gallagher et al. |
| 7,324,818 B2 | 1/2008 | Gallagher et al. |
| 7,369,854 B2 | 5/2008 | Gallagher |
| 7,420,964 B2 | 9/2008 | Narvanen et al. |
| 2001/0029186 A1 | 10/2001 | Canyon et al. |
| 2001/0031645 A1 | 10/2001 | Jarrett |
| 2001/0046860 A1 | 11/2001 | Lee |
| 2001/0049790 A1 | 12/2001 | Faccin et al. |
| 2002/0032030 A1 | 3/2002 | Berglund et al. |
| 2002/0045459 A1 | 4/2002 | Morikawa |
| 2002/0059516 A1 | 5/2002 | Turtiainen et al. |
| 2002/0065099 A1 | 5/2002 | Bjorndahl |
| 2002/0066036 A1 | 5/2002 | Makineni |
| 2002/0075844 A1 | 6/2002 | Hagen |
| 2002/0080797 A1 | 6/2002 | Kim |
| 2002/0082015 A1 | 6/2002 | Wu |
| 2002/0085516 A1 | 7/2002 | Bridgelall |
| 2002/0086682 A1 | 7/2002 | Naghian |
| 2002/0102974 A1 | 8/2002 | Raith |
| 2002/0118674 A1 | 8/2002 | Faccin et al. |
| 2002/0123325 A1 | 9/2002 | Cooper |
| 2002/0131387 A1 | 9/2002 | Pitcher et al. |
| 2002/0131396 A1* | 9/2002 | Knuutila et al. ............. 370/349 |
| 2002/0132630 A1 | 9/2002 | Arazi et al. |
| 2002/0142761 A1 | 10/2002 | Wallstedt et al. |
| 2002/0147008 A1* | 10/2002 | Kallio ........................ 455/426 |
| 2002/0147016 A1 | 10/2002 | Arazi et al. |
| 2002/0150091 A1 | 10/2002 | Lopponen et al. |
| 2002/0155829 A1 | 10/2002 | Proctor, Jr. et al. |
| 2002/0160811 A1 | 10/2002 | Jannette et al. |
| 2002/0161905 A1 | 10/2002 | Haverinen et al. |
| 2002/0166068 A1 | 11/2002 | Kilgore |
| 2002/0191556 A1 | 12/2002 | Krishnarajah et al. |
| 2002/0191575 A1 | 12/2002 | Kalavade et al. |
| 2002/0196840 A1 | 12/2002 | Anderson |
| 2002/0197984 A1 | 12/2002 | Monin et al. |
| 2003/0007475 A1 | 1/2003 | Tsuda et al. |
| 2003/0026269 A1 | 2/2003 | Paryani |
| 2003/0031151 A1 | 2/2003 | Sharma et al. |
| 2003/0043773 A1 | 3/2003 | Chang |
| 2003/0087653 A1 | 5/2003 | Leung |
| 2003/0092445 A1 | 5/2003 | Timonen et al. |
| 2003/0112789 A1 | 6/2003 | Heinonen |
| 2003/0119480 A1 | 6/2003 | Mohammed |
| 2003/0119490 A1 | 6/2003 | Mohammed |
| 2003/0119527 A1 | 6/2003 | Labun |
| 2003/0119548 A1 | 6/2003 | Mohammed |
| 2003/0130008 A1 | 7/2003 | Rajaniemi et al. |
| 2003/0139180 A1 | 7/2003 | McIntosh et al. |
| 2003/0142673 A1 | 7/2003 | Patil |
| 2003/0172264 A1 | 9/2003 | Dillon |
| 2003/0176181 A1 | 9/2003 | Boesjes |
| 2003/0176186 A1 | 9/2003 | Mohammed |
| 2003/0193952 A1 | 10/2003 | O'Neill |
| 2003/0202486 A1 | 10/2003 | Anton et al. |
| 2003/0210199 A1 | 11/2003 | Sward et al. |
| 2003/0219022 A1 | 11/2003 | Dillon et al. |
| 2003/0219024 A1 | 11/2003 | Purnadai et al. |
| 2003/0226017 A1 | 12/2003 | Palekar et al. |
| 2003/0235186 A1 | 12/2003 | Park |
| 2004/0008649 A1 | 1/2004 | Wybenga |
| 2004/0009749 A1 | 1/2004 | Arazi et al. |
| 2004/0013099 A1 | 1/2004 | O'Neill |
| 2004/0025018 A1 | 2/2004 | Haas |
| 2004/0037312 A1 | 2/2004 | Spear |
| 2004/0053623 A1 | 3/2004 | Hoff et al. |
| 2004/0063451 A1 | 4/2004 | Bonta et al. |
| 2004/0068571 A1 | 4/2004 | Ahmavaara |
| 2004/0068653 A1 | 4/2004 | Fascenda |
| 2004/0072593 A1 | 4/2004 | Robbins et al. |
| 2004/0077346 A1 | 4/2004 | Krenik et al. |
| 2004/0077354 A1 | 4/2004 | Jason et al. |
| 2004/0077355 A1 | 4/2004 | Krenik et al. |
| 2004/0077356 A1 | 4/2004 | Krenik et al. |
| 2004/0077374 A1 | 4/2004 | Terry |
| 2004/0087307 A1 | 5/2004 | Ibe et al. |
| 2004/0116120 A1 | 6/2004 | Mohammed et al. |
| 2004/0147223 A1 | 7/2004 | Cho |
| 2004/0171378 A1 | 9/2004 | Rautila |
| 2004/0192211 A1 | 9/2004 | Gallagher et al. |
| 2004/0202132 A1 | 10/2004 | Heinonen |
| 2004/0203346 A1 | 10/2004 | Myhre et al. |
| 2004/0203737 A1 | 10/2004 | Myhre et al. |
| 2004/0203800 A1 | 10/2004 | Myhre et al. |
| 2004/0203815 A1 | 10/2004 | Shoemake et al. |
| 2004/0240525 A1* | 12/2004 | Karabinis et al. ............ 375/132 |
| 2005/0041787 A1* | 2/2005 | Casey et al. ............. 379/88.18 |
| 2005/0064896 A1 | 3/2005 | Rautiola et al. |
| 2005/0101245 A1 | 5/2005 | Ahmavaara |
| 2005/0101329 A1 | 5/2005 | Gallagher |
| 2005/0111409 A1* | 5/2005 | Spear et al. ................. 370/331 |
| 2005/0181805 A1 | 8/2005 | Gallagher |
| 2005/0186948 A1 | 8/2005 | Gallagher |
| 2005/0198199 A1 | 9/2005 | Dowling |
| 2005/0207395 A1 | 9/2005 | Mohammed |
| 2005/0239441 A1 | 10/2005 | Eronen |
| 2005/0239453 A1 | 10/2005 | Vikberg et al. |
| 2005/0255879 A1 | 11/2005 | Shi |
| 2005/0265279 A1 | 12/2005 | Markovic |
| 2005/0266853 A1 | 12/2005 | Gallagher |
| 2005/0271008 A1 | 12/2005 | Gallagher |
| 2005/0272424 A1 | 12/2005 | Gallagher |
| 2005/0272449 A1 | 12/2005 | Gallagher |
| 2006/0009201 A1 | 1/2006 | Gallagher |
| 2006/0009202 A1 | 1/2006 | Gallagher |
| 2006/0019656 A1 | 1/2006 | Gallagher |
| 2006/0019657 A1 | 1/2006 | Gallagher |
| 2006/0019658 A1 | 1/2006 | Gallagher |
| 2006/0019667 A1 | 1/2006 | Hicks |
| 2006/0025143 A1 | 2/2006 | Gallagher |
| 2006/0025144 A1 | 2/2006 | Gallagher |
| 2006/0025145 A1 | 2/2006 | Gallagher |
| 2006/0025146 A1 | 2/2006 | Gallagher |
| 2006/0025147 A1 | 2/2006 | Gallagher |
| 2006/0079259 A1 | 4/2006 | Gallagher |
| 2006/0079273 A1 | 4/2006 | Gallagher |
| 2006/0079274 A1 | 4/2006 | Gallagher |
| 2006/0094431 A1 | 5/2006 | Saifullah et al. |
| 2006/0098598 A1 | 5/2006 | Gallagher |
| 2006/0099935 A1 | 5/2006 | Gallagher et al. |
| 2006/0239277 A1 | 10/2006 | Gallagher et al. |
| 2007/0293222 A1 | 12/2007 | Vikberg et al. |
| 2008/0299976 A1 | 12/2008 | Gallagher et al. |
| 2008/0311916 A1 | 12/2008 | Gallagher et al. |
| 2008/0318599 A1 | 12/2008 | Gallagher et al. |

FOREIGN PATENT DOCUMENTS

| | | |
|---|---|---|
| EP | 1207708 B1 | 10/2004 |
| EP | 1749371 | 2/2007 |
| GB | 2282735 A | 4/1995 |
| WO | WO 9204796 A1 | 3/1992 |
| WO | WO 9724004 A1 | 7/1997 |
| WO | WO 9948312 A1 | 9/1999 |
| WO | WO 9948315 A1 | 9/1999 |

| | | |
|---|---|---|
| WO | WO 0028762 A1 | 5/2000 |
| WO | WO 0051387 A1 | 8/2000 |
| WO | WO 02/45456 A1 | 6/2002 |
| WO | WO 03039009 A2 | 5/2003 |
| WO | WO 03039009 A3 | 5/2003 |
| WO | WO 03092312 A1 | 11/2003 |
| WO | WO 04002051 A2 | 12/2003 |
| WO | WO 2004034219 A2 | 4/2004 |
| WO | WO 2004039111 A1 | 5/2004 |
| WO | WO 2005006597 A1 | 1/2005 |
| WO | WO 2005114920 | 1/2005 |
| WO | PCT/US2005/016921 | 5/2005 |
| WO | PCT/US2005/040689 | 11/2005 |
| WO | WO 2005107169 A1 | 11/2005 |
| WO | WO 2005107297 A1 | 11/2005 |
| WO | WO 2005114918 A3 | 12/2005 |
| WO | WO 2006053102 | 5/2006 |

OTHER PUBLICATIONS

U.S. Appl. No. 11/227,842, filed Sep. 14, 2005, Gallagher, Michael, Non-Final Office Action of related case mailed: Jun. 5, 2006.

U.S. Appl. No. 11/228,853, filed Sep. 15, 2005, Gallagher, Michael, Non-Final Office Action of related case mailed: Jun. 6, 2006.

U.S. Appl. No. 11/229,470, filed Sep. 15, 2005, Gallagher, Michael, Non-Final Office Action of related case mailed: Jun. 5, 2006.

U.S. Appl. No. 11/097,866, filed Mar. 31, 2005, Michael D. Gallagher et al., Non-published patent application (specification, drawings, claims, abstract) of a related pending U.S. Patent Application.

U.S. Appl. No. 11/110,222, filed Apr. 20, 2005, Michael D. Gallagher et al., Non-published patent application (specification, drawings, claims, abstract) and Preliminary Amendment of a related pending U.S. Patent Application.

U.S. Appl. No. 11/349,024, filed Feb. 6, 2006, Michael D. Gallagher, Non-published patent application (specification, drawings, claims, abstract) of a related pending U.S. Patent Application.

U.S. Appl. No. 10/116,023, filed Apr. 2, 2002, Mohammed, Jahangir, Non-Final Office Action of related case mailed: Apr. 13, 2006.

U.S. Appl. No. 11/004,439, filed Dec. 3, 2004, Gallagher, Michael, Non-Final Office Action of related case mailed: Apr. 21, 2006.

U.S. Appl. No. 11/225,398, filed Sep. 12, 2005, Gallagher, Michael, Non-Final Office Action of related case mailed: Apr. 5, 2006.

U.S. Appl. No. 11/225,871, filed Sep. 12, 2005, Gallagher, Michael, Non-Final Office Action of related case mailed: Mar. 30, 2006.

U.S. Appl. No. 11/225,872, filed Sep. 12, 2005, Gallagher, Michael, Non-Final Office Action of related case mailed: May 8, 2006.

U.S. Appl. No. 11/226,610, filed Sep. 13, 2005, Gallagher, Michael, Non-Final Office Action of related case mailed: Mar. 29, 2006.

U.S. Appl. No. 11/226,617, filed Sep. 13, 2005, Gallagher, Michael, Non-Final Office Action of related case mailed: Apr. 4, 2006.

U.S. Appl. No. 11/227,573, filed Sep. 14, 2005, Gallagher, Michael, Non-Final Office Action of related case mailed: Apr. 16, 2006.

U.S. Appl. No. 11/227,784, filed Sep. 14, 2005, Gallagher, Michael, Non-Final Office Action of related case mailed: Mar. 28, 2006.

U.S. Appl. No. 11/227,840, filed Sep. 14, 2005, Gallagher, Michael, Non-Final Office Action of related case mailed: Apr. 21, 2006.

U.S. Appl. No. 10/116,311 (Non-Final Office Action mailed: Feb. 9, 2006), filed Apr. 2, 2002, Jahangir Mohammed, Non-Final Office Action of a related pending U.S. Patent Application.

U.S. Appl. No. 10/115,767 (Non-Final Office Action mailed: Dec. 22, 2005), filed Apr. 2, 2002, Jahangir Mohammed, Non-Final Office Action of a related pending U.S. Patent Application.

U.S. Appl. No. 10/115,835 (Non-Final Office Action mailed: Jul. 25, 2005 ), filed Apr. 2, 2002, Jahangir Mohmammed, Non-Final Office Action of a related pending U.S. Patent Application.

U.S. Appl. No. 10/116,186 (Final Office Action mailed: Feb. 1, 2006), filed Apr. 2, 2002, Jahangir Mohmmed, Final Office Action of a related pending U.S. Patent Application.

U.S. Appl. No. 10/251,901 (Non-Final Office Action mailed: May 5, 2005), filed Sep. 20, 2002, Michael D. Gallagher, Non-Final Office Action of a related pending U.S. Patent Application.

U.S. Appl. No. 10/688,470 (Non-Final Office Action mailed: Dec. 15, 2005), filed Oct. 17, 2003, Michael D. Gallagher, Non-Final Office Action of a related pending U.S. Patent Application.

U.S. Appl. No. 11/004,439 (Non-Final Office Action mailed: Sep. 21, 2005), filed Dec. 3, 2004, Michael D. Gallagher, Non-Final Office Action of a related pending U.S. Patent Application.

*Ericsson Press Release*: "Ericsson presents the Mobile@Hometm concept," Mar. 21, 2001, http://www.ericsson.com/press/archive/2001Q1/20010321-0048.html, printed Mar. 21, 2006, pp. 1-2.

Claus Lindholt Hansen et al., "Mobile@Home- a New Use Case for Bluetooth in the Access Network," *LM Ericsson Business Unit Multi-Service Networks*, ISSLS 2002, Apr. 14-18, 2002, Seoul, Korea, www.issls-council.org/proc02/papers/S6A3m.pdf, printed Dec. 8, 2003, 10 pages.

Perkins, Charles E., "Simplified Routing for Mobile Computers Using TCP/IP, Wireless LAN Implementation," *IBM T.J. Watson Research Center*, 0-8186-2625-9/92 1992 Proceeding, IEEE Conference on Sep. 17-18, 1992, pp. 7-13.

Wu, Jon C. et al., "Intelligent Handoff for Mobile Wireless Internet," *Mobile Networks and Applications*, 6, 2001 Kluwer Academic Publishers, Manufactured in the Netherlands (2001) 67-79.

"Digital cellular telecommunications system (Phase 2+); Universal Mobile Telecommunications System (UMTS); Mobile radio interface Layer 3 specification; Core network protocols; Stage 3 (3GPP TS 24.008 version 5.6.0 Release 5); ETSI TS 124 008," ETSI Standards, European Telecommunications Standards Institute, Sophia-Antipo, FR, vol. 3-CN1, No. V560, Dec. 2002, pp. 293-317, XP014007949, ISSN: 0000-0001.

"3rd Generation Partnership Project; Technical Specification Group Services and System Aspects; 3GPP System to Wireless Local Area Network (WLAN) Interworking; System Description (Release 6); 3GPP TS 23.234," ETSI Standards, European Telecommunications Standard Institute, Sophia-Antipo, FR, vol. 3-SA, No. V230, Nov. 2003, XP014023920, ISSN: 0000-0001.

U.S. Appl. No. 11/107,538, filed Apr. 14, 2005, Mattson, et al.

U.S. Appl. No. 11/068,445, filed Feb. 24, 2005, Gupta, et al.

U.S. Appl. No. 11/080,714, filed Mar. 14, 2005, Agrawal, et al.

Non-Final Office Action of U.S. Appl. No. 10/116,311, mailing date Sep. 7, 2006, Mohammed.

Non-Final Office Action of U.S. Appl. No. 10/116,311, mailing date Mar. 6, 2007, Mohammed.

Final Office Action of U.S. Appl. No. 10/116,311, mailing date Aug. 24, 2007, Mohammed.

Non-Final Office Action of U.S. Appl. No. 10/116,311, mailing date May 12, 2008, Mohammed.

Final Office Action of U.S. Appl. No. 10/115,767, mailing date Jul. 27, 2006, Markovic, et al.

Non-Final Office Action of U.S. Appl. No. 10/115,767, mailing date Jun. 14, 2007, Markovic, et al.

Non-Final Office Action of U.S. Appl. No. 10/116,186, mailing date Nov. 16, 2005, Mohammed.

Non-Final Office Action of U.S. Appl. No. 10/116,186, mailing date Oct. 2, 2006, Mohammed.

Non-Final Office Action of U.S. Appl. No. 10/116,186, mailing date Aug. 10, 2007, Mohammed.

Non-Final Office Action of U.S. Appl. No. 10/116,186, mailing date Apr. 4, 2008, Mohammed.

Non-Final Office Action of U.S. Appl. No. 10/251,901, mailing date Aug. 9, 2006, Gallagher, et al., which issued as U.S. Patent 7,308,263.

Notice of Allowance of U.S. Appl. No. 10/251,901, mailing date Jun. 12, 2007, Gallagher, et al., which issue as U.S. Patent 7,308,263.

Notice of Allowance of U.S. Appl. No. 10/688,470, mailing date Jul. 19, 2006, Gallagher, et al., which issued as U.S. Patent 7,127,250.

Non-Final Office Action of U.S. Appl. No. 11/004,439, mailing date Jan. 12, 2007, Gallagher.

Non-Final Office Action of U.S. Appl. No. 11/004,439, mailing date Jun. 8, 2007, Gallagher.

Non-Final Office Action of U.S. Appl. No. 11/004,439, mailing date Nov. 28, 2007, Gallagher.

Non-Final Office Action of U.S. Appl. No. 11/004,439, mailing date Jun. 9, 2008, Gallagher.

Non-Final Office Action of U.S. Appl. No. 11/225,870, mailing date Oct. 17, 2006, Gallagher, et al., which issued as U.S. Patent 7,209,744.
Notice of Allowance of U.S. Appl. No. 11/225,870, mailing date Feb. 16, 2007, Gallagher, et al., which issued as U.S. Patent 7,209,744.
Non-Final Office Action of U.S. Appl. No. 11/225,398, mailing date Sep. 27, 2006, Gallagher, et al., which issued as 7,215,961.
Notice of Allowance of U.S. Appl. No. 11/225,398, mailing date Feb. 9, 2007, Gallagher, et al., which issued as 7,215,961.
Non-Final Office Action of U.S. Appl. No. 11/225,872, mailing date Sep. 20, 2006, Gallagher, et al., which issued as U.S. Patent 7,245,916.
Non-Final Office Action of U.S. Appl. No. 11/225,872, mailing date Feb. 13, 2007, Gallagher, et al., which issused as U.S. Patent 7,245,916.
Notice of Allowance of U.S. Appl. No. 11/225,872, mailing date Apr. 16, 2007, Gallagher, et al., which issued as U.S. Patent 7,245,916.
Final Office Action of U.S. Appl. No. 11/225,871, mailing date Aug. 18, 2006, Gallagher, et al., which issued as U.S. Patent 7,283,821.
Non-Final Office Action of U.S. Appl. No. 11/225,871, mailing date Dec. 4, 2006, Gallagher, et al., which issued as U.S. Patent 7,283,821.
Non-Final Office Action of U.S. Appl. No. 11/225,871, mailing date Mar. 21, 2007, Gallagher, et al., which issued as U.S. Patent 7,283,821.
Notice of Allowance of U.S. Appl. No. 11/225,871, mailing date Jun. 27, 2007, Gallagher, et al., which issued as U.S. Patent 7,283,821.
Final Office Action of U.S. Appl. No. 11/226,617, mailing date Sep. 15, 2006, Gallagher, et al.
Non-Final Office Action of U.S. Appl. No. 11/226,617, mailing date Nov. 2, 2006, Gallagher, et al.
Non-Final Office Action of U.S. Appl. No. 11/226,617, mailing date Feb. 13, 2007, Gallagher, et al.
Final Office Action of U.S. Appl. No. 11/226,617, mailing date Aug. 14, 2007, Gallagher, et al.
Non-Final Office Action of U.S. Appl. No. 11/226,617, mailing date Apr. 16, 2008, Gallagher, et al.
Final Office Action of U.S. Appl. No. 11/226,610, mailing date Aug. 18, 2006, Gallagher, et al.
Non-Final Office Action of U.S. Appl. No. 11/226,610, mailing date Oct. 24, 2006, Gallagher, et al.
Non-Final Office Action of U.S. Appl. No. 11/226,610, mailing date Feb. 13, 2007, Gallagher, et al.
Final Office Action of U.S. Appl. No. 11/226,610, mailing date Aug. 2, 2007, Gallagher, et al.
Notice of Allowance of U.S. Appl. No. 11/226,610, mailing date Nov. 28, 2007, Gallagher, et al.
Non-Final Office Action of U.S. Appl. No. 11/229,471, mailing date Jun. 19, 2006, Gallagher, et al.
Non-Final Office Action of U.S. Appl. No. 11/229,471, mailing date Oct. 24, 2006, Gallagher, et al.
Non-Final Office Action of U.S. Appl. No. 11/229,471, mailing date Apr. 19, 2007, Gallagher, et al.
Final Office Action of U.S. Appl. No. 11/229,471, mailing date Oct. 10, 2007, Gallagher, et al.
Non-Final Office Action of U.S. Appl. No. 11/229,471, mailing date Feb. 6, 2008, Gallagher, et al.
Non-Final Office Action of U.S. Appl. No. 11/228,853, mailing date Nov. 22, 2006, Gallagher, et al., which issued as 7,212,819.
Notice of Allowance of U.S. Appl. No. 11/228,853, mailing date Feb. 23, 2007, Gallagher, et al., which issued as U.S. Patent 7,212,819.
Non-Final Office Action of U.S. Appl. No. 11/229,470, mailing date Oct. 24, 2006, Gallagher, et al.
Non-Final Office Action of U.S. Appl. No. 11/229,470, mailing date May 22, 2007, Gallagher, et al.
Final Office Action of U.S. Appl. No. 11/229,470, mailing date Dec. 14, 2007, Gallagher, et al.
Non-Final Office Action of U.S. Appl. No. 11/229,470, mailing date Feb. 27, 2008, Gallagher, et al.
Notice of Allowance of U.S. Appl. No. 11/227,842, mailing date Nov. 27, 2006, Gallagher, et al., which issued as U.S. Patent 7,171,205.
Non-Final Office Action of U.S. Appl. No. 11/227,573, mailing date Sep. 19, 2006, Gallagher, et al., which issued as 7,324,818.
Non-Final Office Action of U.S. Appl. No. 11/227,573, mailing date Feb. 20, 2007, Gallagher, et al., which issued as 7,324,818.
Notice of Allowance of U.S. Appl. No. 11/227,573, mailing date Nov. 2, 2007, Gallagher, et al., which issued as 7,324,818.
Notice of Allowance of U.S. Appl. No. 11/227,841, mailing date May 4, 2006, Gallagher, et al., which issued as 7,107,055.
Non-Final Office Action of U.S. Appl. No. 11/227,840, mailing date Sep. 20, 2006, Gallagher, et al., which issued as 7,200,399.
Notice of Allowance of U.S. Appl. No. 11/227,840, mailing date Jan. 24, 2007, Gallagher, et al., which issued as 7,200,399.
Final Office Action of U.S. Appl. No. 11/227,784, mailing date Aug. 17, 2006, Gallagher, et al., which issued as 7,197,309.
Non-Final Office Action of U.S. Appl. No. 11/227,784, mailing date Oct. 24, 2006, Gallagher, et al., which issued as 7,197,309.
Notice of Allowance of U.S. Appl. No. 11/227,784, mailing date Jan. 24, 2007, Gallagher, et al., which issued as 7,197,309.
Non-Final Office Action of U.S. Appl. No. 11/129,424, mailing date May 1, 2008, Gallagher, et al.
Non-Final Office Action of U.S. Appl. No. 11/129,131, mailing date Feb. 21, 2007, Gallagher, et al.
Notice of Allowance of U.S. Appl. No. 11/129,131, mailing date Oct. 9, 2007, Gallagher, et al.
International Preliminary Report on Patentability and Written Opinion for PCT/US2005/016767, mailing date Nov. 23, 2006, Kineto Wireless, Inc., which was submitted with search report as item #11 on the IDS dated Jun. 16, 2006 and claims priority to U.S. Appl. No. 11/013,883, 11/097,866, and 11/129,134.
ETSI TS 100 940 V7.19.1 (Apr. 2003) Digital cellular telecommunications system (Phase 2+); Mobile radio interface layer 3 specification; (3GPP TS 04.08 version 7.19.1 Release 1998); ETSI Standards, European Telecommunications Standards Institute, Sophia-Antipolis, FR, Apr. 2003.
*Digital Enhanced Cordless Telecommunications (DECT); Global System for Mobile Communications (GSM); DECT/GSM Interworking Profile (IWP); Access and Mapping* (protocol/procedure description for 3,1 kHz speech service): ETSI EN 300 370 V1.3.1 European Standard (Telecommunications Series), European Telecommunications Standards Institute, Sophia Antipolis, FR, Jan. 2001.
*Digital Enhanced Cordless Telecommunications (DECT); Global System for Mobile Communications (GSM); DECT/GSM Integration Based on Dual-Mode Terminals*: ETSI EN 301 242 V1.2.2 European Standard (Telecommunications Series), European Telecommunication Standards Institute, Sophia Antipolis, FR, Sep. 1999.
*Digital Enhanced Cordless Telecommunications (DECT); DECT/ UMTS Interworking Profile (IWP); Part 1: General Description and Overview*: ETSI TS 101 863-1 V1.1.2, Technical Specification, European Telecommunications Standards Institute, Sophia Antipolis, FR, Nov. 2001.
*Radio Equipment and Systems (RES); Digital Enhanced Cordless Telecommunications/Global System for Mobile Communications (DECT/GSM) Interworking Profile; Profile Overview*: ETSI Technical Report, ETR 341, Source: ETSI DECT, ICS: 33.020, Reference: DTR/RES-03058. European Telecommunications Standards Institute, Sophia Antipolis, FR, Dec. 1996.
"Unlicensed Mobile Access (UMA); User Perspective (Stage 1);" UMA User Perspective (Stage 1) R1.0.0 (Sep. 1, 2004) Technical Specification, Sep. 1, 2004, 29 pages.
"Unlicensed Mobile Access (UMA); Architecture (Stage 2);" UMA Architecture (Stage 2) R1.0.0 (Sep. 1, 2004) Technical Specification, Sep. 1, 2004, 78 pages.
"Unlicensed Mobile Access (UMA); Protocols (Stage 3);" UMA Protocols (Stage 3) R1.0.0 (Sep. 1, 2004) Technical Specification, Sep. 1, 2004, 142 pages.
"Unlicensed Mobile Access (UMA); Architecture (Stage 2);" UMA Architecture (Stage 2) R1.0.1 (Oct. 8, 2004) Technical Specification, Oct. 8, 2004, 80 pages.
"Unlicensed Mobile Access (UMA); Protocols (Stage 3);" UMA Protocols (Stage 3) R1.0.1 (Oct. 8, 2004) Technical Specification, Oct. 8, 2004, 142 pages.
"Unlicensed Mobile Access (UMA); Architecture (Stage 2);" UMA Architecture (Stage 2) R1.0.2 (Nov. 3, 2004) Technical Specification, Nov. 3, 2004, 79 pages.

"Unlicensed Mobile Access (UMA); Protocols (Stage 3);" UMA Protocols (Stage 3) R1.0.2 (Nov. 5, 2004) Technical Specification, Nov. 5, 2004, 142 pages.

"Unlicensed Mobile Access (UMA); Architecture (Stage 2);" UMA Architecture (Stage 2) R1.0.3 (Feb. 28, 2005) Technical Specification, Feb. 28, 2005, 85 pages.

"Unlicensed Mobile Access (UMA); Protocols (Stage 3);" UMA Protocols (Stage 3) R1.0.3 (Feb. 26, 2005) Technical Specification, Feb. 26, 2005, 156 pages.

"Unlicensed Mobile Access (UMA); Architecture (Stage 2);" UMA Architecture (Stage 2) R1.0.4 (May 2, 2005) Technical Specification, May 2, 2005, 87 pages.

"Unlicensed Mobile Access (UMA); Protocols (Stage 3);" UMA Protocols (Stage 3) R1.0.4 (May 2, 2005) Technical Specification, May 2, 2005, 162 pages.

"3rd Generation Partnership Project; Technical Specification Group GSM/EDGE Radio Access Network; Generic Access to the A/Gb interface; Stage 2 (Release X);" 3GPP TS 43.318 V0.3.0, Jan. 2005, 64 pages.

"Proposal for Stage 2 description for Generic Access to A/Gb interface", Tdoc GP-050403, Jan. 24-28, 2005, 1 page.

"3rd Generation Partnership Project; Technical Specification Group GSM/EDGE Radio Access Network; Generic Access to the A/Gb interface; Stage 2 (Release 6);" 3GPP TS 43.318 V0.4.0, Jan. 2005, 66 pages.

"3rd Generation Partnership Project; Technical Specification Group GSM/EDGE Radio Access Network; Generic Access to the A/Gb interface; Stage 2 (Release 6);" 3GPP TS 43.318 V2.0.0, Jan. 2005, 66 pages.

"3rd Generation Partnership Project; Technical Specification Group GSM/EDGE Radio Access Network; Generic Access to the A/Gb interface; Stage 2 (Release 6);" 3GPP TS 43.318 V6.0.0, Jan. 2005, 68 pages.

"3rd Generation Partnership Project; Technical Specification Group GSM/EDGE Radio Access Network; Generic Access to the A/Gb interface; Stage 2 (Release 6);" 3GPP TS 43.318 V6.1.0 (Jan. 2005), Apr. 2005, 68 pages.

"Proposal for Stage 3 description for Generic Access to A/Gb interface", Tdoc GP-050279, Jan. 18, 2005, 1 page.

"3rd Generation Partnership Project; Technical Specification Group GSM/EDGE Radio Access Network; Generic Access to the A/Gb interface; Mobile Generic Access Interface Layer 3 Specification (Release x);" 3GPP TS 44.318 Vx.1.0, Jan. 2005, 133 pages.

"3rd Generation Partnership Project; Technical Specification Group GSM/EDGE Radio Access Network; Generic Access to the A/Gb interface; Mobile Generic Access Interface Layer 3 Specification (Release x);" 3GPP TS 44.318 V0.4.0, Apr. 2005, 161 pages.

"3rd Generation Partnership Project; Technical Specification Group GSM/EDGE Radio Access Network; Generic Access to the A/Gb interface; Mobile Generic Access Interface Layer 3 Specification (Release 6);" 3GPP TS 44.318 V0.5.0, Apr. 2005, 160 pages.

"3rd Generation Partnership Project; Technical Specification Group GSM/EDGE Radio Access Network; Generic Access to the A/Gb interface; Mobile Generic Access Interface Layer 3 Specification (Release 6);" 3GPP TS 44.318 V2.0.0, Apr. 2005, 152 pages.

"3rd Generation Partnership Project; Technical Specification Group GSM/EDGE Radio Access Network; Generic Access (GA) to the A/Gb interface; Mobile GA interface layer 3 specification (Release 6);" 3GPP TS 44.318 V6.0.0, Apr. 2005, 146 pages.

Notice of Allowance for U.S. Appl. No. 11/129,424, mailing date Feb. 6, 2009, M. Gallagher, et al., listed as item #153 of IDS dated Jun. 30, 2006.

Non-Final Office Action for U.S. Appl. No. 11/226,617, mailing date Nov. 12, 2008, M. Gallagher, et al., listed as item #158 of IDS dated Jun. 30, 2006.

Non-Final Office Action for U.S. Appl. No. 12/192,532, mailing date Feb. 4, 2009, M. Gallagher, et al., listed as item #10 above.

Non-Final Office Action for U.S. Appl. No. 12/193,598, mailing date Feb. 19, 2009, M. Gallagher, et al., listed as item #11 above.

Non-Final Office Action for U.S. Appl. No. 12/194,442, mailing date Mar. 16, 2009, M. Gallagher, et al., listed as item #12 above.

EP Office Action of EP05747754.9, mailing date Apr. 15, 2008, Kineto Wireless, Inc., listed as item #18 above.

* cited by examiner

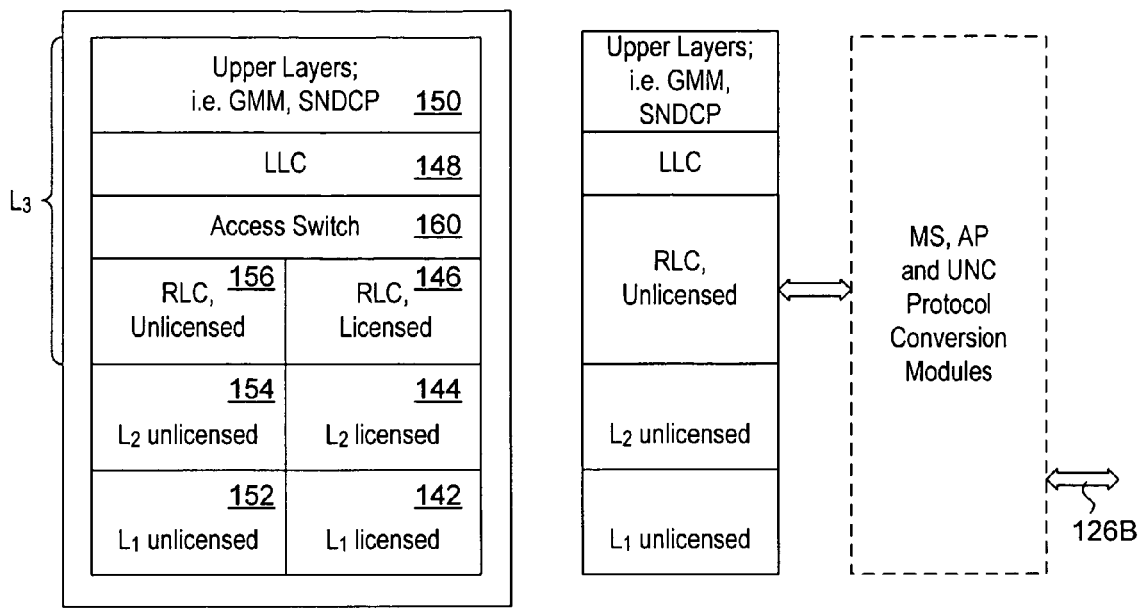
*Fig. 1B*   *Fig. 1C*
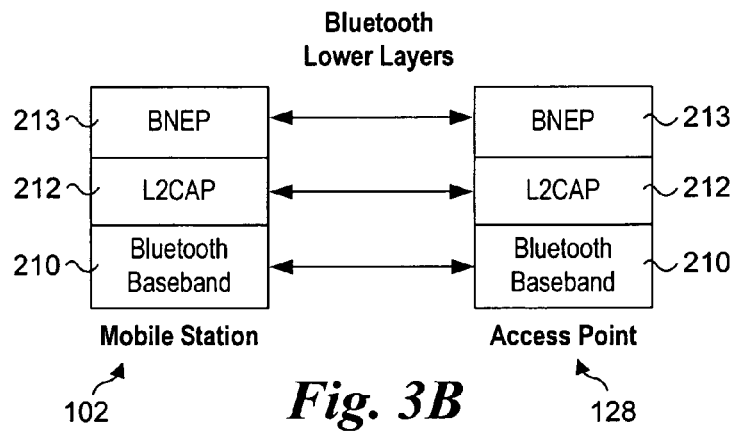
*Fig. 3B*
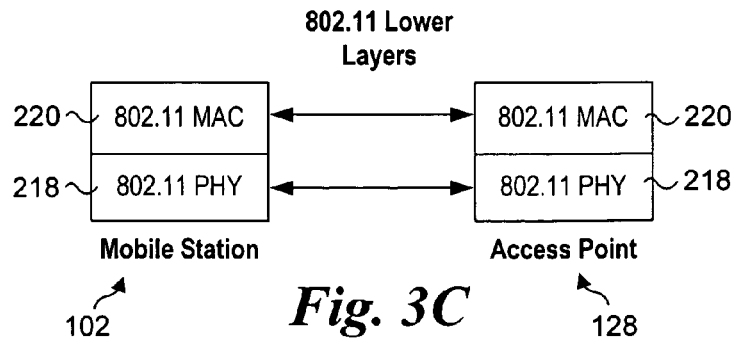
*Fig. 3C*

URLC-ACTIVATE-UTC-REQ

| Information Element | Type/Reference | Format | Presence | Length | Value/Notes |
|---|---|---|---|---|---|
| Length Indicator | Length Indicator | V | M | 2 | |
| UMA RLC Protocol Discriminator | Protocol Discriminator | V | M | ½ | e.g. 0111 |
| Skip Indicator | Skip Indicator | V | M | ½ | Always set to 0000. |
| URLC-ACTIVATE-UTC-REQ message identity | Message Type | | M | 2 | |
| TLLI | TLLI | V | M | 4 | |
| IP address for GPRS user data transport | IP Address | TLV | M | 7-19 | This IE contains MS IP address for GPRS user data transport if MS initiates activation. It contains UNC IP address for GPRS user data transport if UNC initiates activation. |
| UDP Port for GPRS user data transport | Communication Port Identification | TLV | M | 4 | This information element contains MS UDP port for GPRS user data transport if MS initiates activation. It contains UNC UDP port for GPRS user data transport if UNC initiates activation. |

URLC Cause Values

| URLC cause value Hexadecimal | Description |
|---|---|
| x00 | "success" |
| x01 | "URLC TC already exists" |
| x02 | "UNC resources not available" |
| x03 | "UNC internal failure" |
| x04 | "MS not authorized for data service via UMAN" |
| x05 | "message type non existent or not implemented" |
| x06 | "message not compatible with the protocol state" |
| x07 | "invalid mandatory information" |
| x08 | "syntactically incorrect message" |
| x09 | "GPRS suspended" |
| X0a | "normal deactivation" |

*Fig. 10*

URLC-ACTIVATE-UTC-ACK

| Information Element | Type/Reference | Format | Presence | Length | Value/Notes |
|---|---|---|---|---|---|
| Length Indicator | Length Indicator | V | M | 2 | |
| UMA RLC Protocol Discriminator | Protocol Discriminator | V | M | ½ | e.g. 0111 |
| Skip Indicator | Skip Indicator | V | M | ½ | Always set to 0000. |
| URLC-ACTIVATE-UTC-ACK message Identity | Message Type | | M | 2 | |
| TLLI | TLLI | V | M | 4 | |
| IP address for GPRS user data transport | IP Address | | C | 7-19 | This information element must be included if the URLC cause indicates success (0 or 1) and contains the following:<br>• MS IP address for GPRS user data transport if MS initiates activation.<br>• UNC IP address for GPRS user data transport if UNC initiates activation. |
| UDP Port for GPRS user data transport | Communication Port Identification | | C | 4 | This information element must be included if the URLC cause indicates success and contains the following:<br>• MS UDP port for GPRS user data transport if MS initiates activation.<br>• UDP port for GPRS user data transport if UNC initiates activation. |
| Remote IP address for GPRS user data transport | IP Address | | C | 7-19 | This information element must be included if responding to a duplicate activation request – URLC cause = 1. It contains the following:<br>• MS IP address for GPRS user data transport if UNC initiates activation.<br>• UNC IP address for GPRS user data transport if MS initiates activation. |
| Remote UDP Port for GPRS user data transport | Communication Port Identification | | C | 4 | This information element must be included if responding to a duplicate activation request – URLC cause = 1. It contains the following:<br>• MS UDP port for GPRS user data transport if UNC initiates activation.<br>• UNC UDP port for GPRS user data transport if MS initiates activation. |
| URLC TC Activation Status | URLC Cause | | M | 3 | |

URLC-DEACTIVATE-UTC-REQ

| Information Element | Type/Reference | Format | Presence | Length | Value |
|---|---|---|---|---|---|
| Length Indicator | Length Indicator | V | M | 2 | |
| UMA RLC Protocol Discriminator | Protocol Discriminator | V | M | ½ | e.g. 0111 |
| Skip Indicator | Skip Indicator | V | M | ½ | Always set to 0000. |
| URLC-DEACTIVATE-UTC-REQ message identity | Message Type | | M | 2 | |
| TLLI | TLLI | V | M | 4 | |
| URLC TC Deactivation Cause | URLC Cause | | M | 3 | |

*Fig. 12*    1100

URLC-DEACTIVATE-UTC-ACK

| Information Element | Type/Reference | Format | Presence | Length | Value |
|---|---|---|---|---|---|
| Length Indicator | Length Indicator | V | M | 2 | |
| UMA RLC Protocol Discriminator | Protocol Discriminator | V | M | ½ | e.g. 0111 |
| Skip Indicator | Skip Indicator | V | M | ½ | Always set to 0000. |
| URLC-DEACTIVATE-UTC-ACK message identity | Message Type | | M | 2 | |
| TLLI | TLLI | V | M | 4 | |

*Fig. 13*    1102

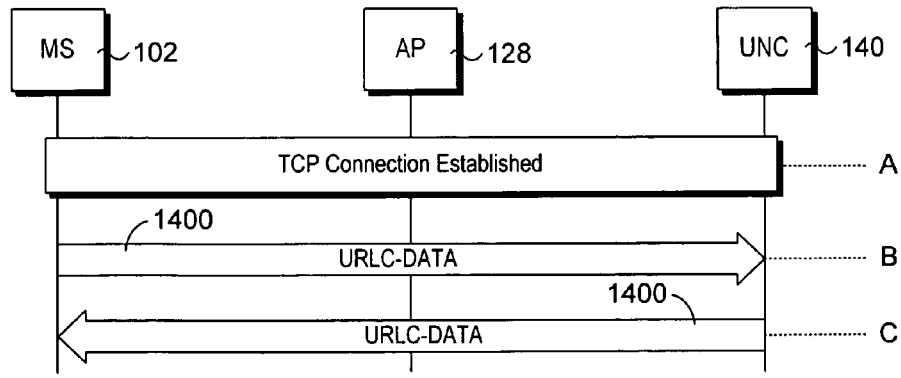

*Fig. 14*

URLC-DATA

| Information Element | Type/Reference | Presence | Format | Length | Value |
|---|---|---|---|---|---|
| UMA-RLC Protocol Discriminator | Protocol Discriminator | M | V | ½ | 0111 |
| Spare | | M | V | ½ | 0000 |
| URLC DATA message type | Message Type | M | V | 1 | 0000 0001 |
| Required QoS | QoS – Peak Throughput | M | V | 1/2 | Peak throughput – (as per 3GPP TS 23.107) Bits 8 7 6 5 |
| First Packet Indication | | M | V | 1/8 | Bit 4 Value: 1 – first uplink packet to UNC 0- not the first uplink packet |
| Requested Radio Priority | Radio Priority | M | V | 3/8 | As defined in GSM 04.08 excluding IEI and length. Bits 3 2 1 |
| TLLI | TLLI | M | V | 4 | As defined in GSM 04.08 excluding TLLI IEI |
| Packet Flow Identifier | Packet Flow Identifier | M | TV | 1+7/8 | As defined in GSM 04.08 excluding length. Value - Bits 7 6 5 4 3 2 1 |
| LLC PDU | | M | V | 0-1560 | |

*Fig. 15A*  1400A

URLC-DATA

| Information Element | Type/Reference | Format | Presence | Length | Value/Notes |
|---|---|---|---|---|---|
| Length Indicator | Length Indicator | V | M | 2 | |
| UMA RLC Protocol Discriminator | Protocol Discriminator | V | M | ½ | e.g. 0111 |
| Skip Indicator | Skip Indicator | V | M | ½ | 0000. |
| URLC-DATA message identity | Message Type | V | M | 1 | e.g. 0011 1111 |
| TLLI | TLLI | V | M | 4 | |
| Requested QoS | QoS | TLV | C | 5 | |
| Packet Flow Identifier | Packet Flow Identifier | TLV | O | 3 | Present if packet flow management procedures are supported. |
| LLC PDU | LLC PDU | TLV | M | 0-1560 | |

*Fig. 15B*  1400B

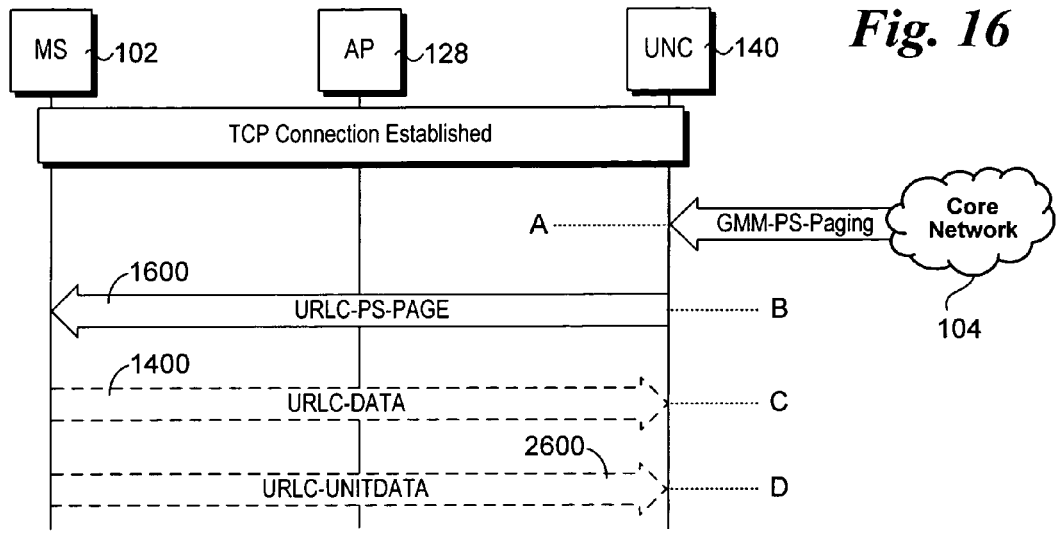

Fig. 16

URLC PACKET (SWITCHED SERVICE) (PS) PAGE

| Information Element | Type/Reference | Presence | Format | Length | Value/Notes |
|---|---|---|---|---|---|
| UMA-RLC Protocol Discriminator | Protocol Discriminator | M | V | ½ | 0111 |
| Spare | | M | V | ½ | 0000 |
| URLC PACKET PAGE message type | Message type | M | V | 1 | 0000 0011 |
| Mobile Identity | Mobile Identity | M | LV | 2-9 | GSM04.08 The mobile identity will be PTMSI if available, IMSI or other standard identifier |

Fig. 17A    1600A

URLC-PS-PAGE

| Information Element | Type/Reference | Format | Presence | Length | Value/Notes |
|---|---|---|---|---|---|
| Length Indicator | Length Indicator | V | M | 2 | |
| UMA RLC Protocol Discriminator | Protocol Discriminator | V | M | ½ | e.g. 0111 |
| Skip Indicator | Skip Indicator | V | M | ½ | 0000. |
| URLC-PS-PAGE message identity | Message Type | V | M | 1 | e.g. 0011 1111 |
| TLLI | TLLI | V | M | 4 | |
| Mobile Identity | Mobile Identity | TLV | M | 2-9 | The mobile identity IE contains either IMSI or PTMSI based on the request from SGSN. |

Fig. 17B    1600B

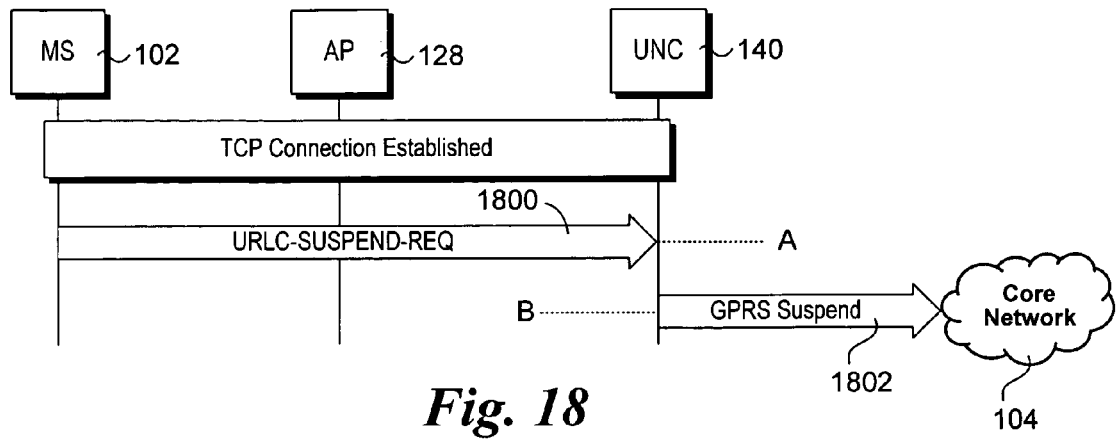

*Fig. 18*

URLC-SUSPEND-REQ

| Information Element | Type/Reference | Presence | Format | Length | Value |
|---|---|---|---|---|---|
| UMA-RLC Protocol Discriminator | Protocol Discriminator | M | V | ½ | 0111 |
| Spare | | M | V | ½ | 0000 |
| URLC SUSPEND REQUEST Message Type | Message type | M | V | 1 | 0000 0101 |
| Temporary Logical Link Identity | TLLI | M | V | 4 | 10.5.2.41a/GSM04.08 |
| Suspension Cause | Suspension Cause | M | V | 1 | 10.5.2.47/GSM04.08 |

*Fig. 19A*    1800 A

URLC-SUSPEND-REQ

| Information Element | Type/Reference | Presence | Format | Length | Value |
|---|---|---|---|---|---|
| Length Indicator | Length Indicator | M | V | 2 | |
| UMA-RLC Protocol Discriminator | Protocol Discriminator | M | V | ½ | 0111 |
| Skip Indicator | Skip Indicator | M | V | ½ | 0000 |
| URLC SUSPEND REQUEST Message Type | Message type | M | V | 1 | 0000 0101 |
| TLLI | TLLI | M | V | 4 | |
| Suspension Cause | Suspension Cause | M | TLV | 1 | |

*Fig. 19B*    1800B

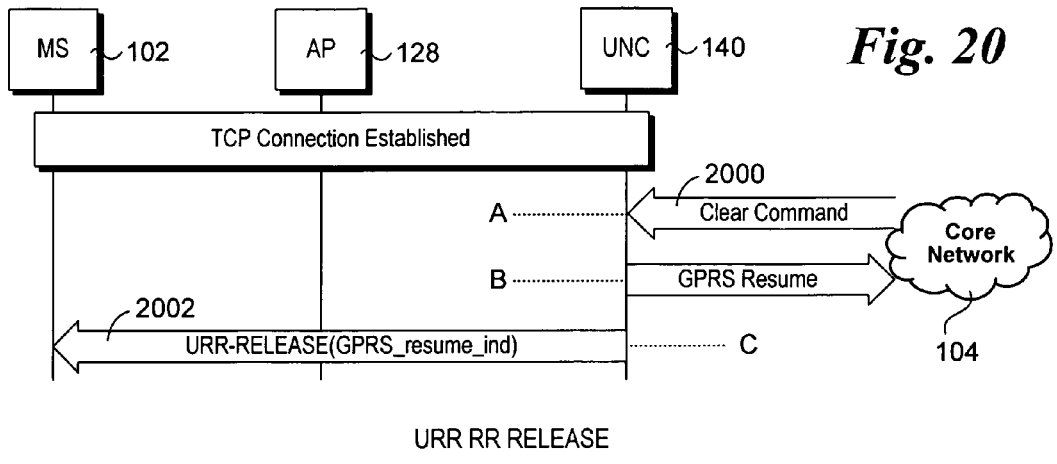

Fig. 20

URR RR RELEASE

| Information Element | Type/Reference | Presence | Format | Length | Value |
|---|---|---|---|---|---|
| UMA RR Protocol Discriminator | Protocol Discriminator | M | V | ½ | 0110 |
| Skip Indicator | Skip Indicator | M | V | ½ | 0000 |
| URR RR RELEASE Message Type | Message type | M | V | 1 | 0000 1101 |
| UMA RR Cause | UMA RR Cause | M | V | 1 | |
| GPRS Resumption | GPRS Resumption | O | TV | 1 | 10.5.2.14c/GSM04.08 |

Fig. 21A      2002A

URR RELEASE

| Information Element | Type/Reference | Presence | Format | Length | Value |
|---|---|---|---|---|---|
| Length Indicator | Length Indicator | M | V | 2 | |
| UMA RR Protocol Discriminator | Protocol Discriminator | M | V | ½ | 0110 |
| Skip Indicator | Skip Indicator | M | V | ½ | 0000 |
| URR RELEASE Message Type | Message type | M | V | 1 | 0000 1101 |
| UMA RR Cause | UMA RR Cause | M | V | 1 | |
| GPRS Resumption | GPRS Resumption | O | TV | 1 | |

Fig. 21B      2002B

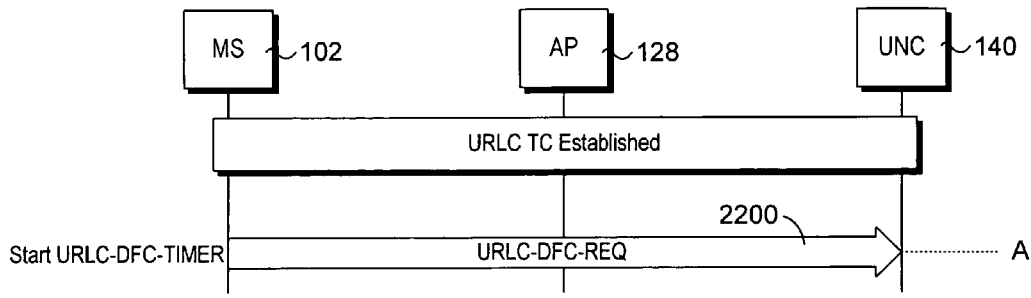

*Fig. 22*

URLC FLOW-CONTROL REQUEST

| Information Element | Type/Reference | Format | Presence | Length | Notes |
|---|---|---|---|---|---|
| UMA RLC Protocol Discriminator | Protocol Discriminator | V | M | ½ | e.g. 0111 |
| Spare | | V | M | ½ | 0000 |
| URLC FLOW-CONTROL REQUEST message identity | Message Type | V | M | 1 | e.g. 0011 1111 |
| FC-Adjustment | Integer | V | M | 1 | Percentage of default rate (0 to 100) |

*Fig. 23A*  2200A

URLC-DFC-REQ

| Information Element | Type/Reference | Format | Presence | Length | Notes |
|---|---|---|---|---|---|
| Length Indicator | Length Indicator | V | M | 2 | |
| UMA RLC Protocol Discriminator | Protocol Discriminator | V | M | ½ | e.g. 0111 |
| Skip Indicator | Skip Indicator | V | M | ½ | Always set to 0000. |
| URLC-DFC-REQ message identity | Message Type | V | M | 1 | e.g. 0011 1111 |
| TLLI | TLLI | V | M | 4 | |
| Requested Downlink User Data Rate | User Data Rate | TLV | M | 4 | |
| Packet Flow Identifier | Packet Flow Indentifier | TLV | O | 3 | Included if the request is related to a specific PFC. |

*Fig. 23B*  2200B

URLC-UFC-REQ

| Information Element | Type/Reference | Format | Presence | Length | Notes |
|---|---|---|---|---|---|
| Length Indicator | Length Indicator | V | M | 2 | |
| UMA RLC Protocol Discriminator | Protocol Discriminator | V | M | ½ | e.g. 0111 |
| Skip Indicator | Skip Indicator | V | M | ½ | Always set to 0000. |
| URLC-UFC-REQ message identity | Message Type | V | M | 1 | e.g. 0011 1111 |
| TLLI | TLLI | V | M | 4 | |
| Requested Uplink User Data Rate | User Data Rate | TLV | M | 4 | |

*Fig. 25*      2400

URLC-UNITDATA

| Information Element | Type/Reference | Presence | Format | Length | Value |
|---|---|---|---|---|---|
| UMA-RLC Protocol Discriminator | Protocol Discriminator | M | V | ½ | 0111 |
| Spare | | M | V | ½ | 0000 |
| URLC UNITDATA message type | Message Type | M | V | 1 | 0000 0010 |
| Required QoS | QoS – Peak Throughput | M | V | 1/2 | Peak throughput – as per 3GPP TS 23.107) Bits 8 7 6 5 |
| First Packet Indication | | M | V | 1/8 | Bit 4 Value: 1 – first uplink packet to UNC 0- not the first uplink packet |
| Requested Radio Priority | Radio Priority | M | V | 3/8 | As defined in GSM 04.08 excluding IEI and length. Bits 3 2 1 |
| TLLI | TLLI | M | V | 4 | As defined in GSM 04.08 excluding TLLI IEI |
| Packet Flow Identifier | Packet Flow Identifier | M | TV | 1+7/8 | As defined in GSM 04.08 excluding length. Value - Bits 7 6 5 4 3 2 1 |
| LLC PDU | | M | V | 0-1560 | |

*Fig. 27A*  2600A

URLC-UNITDATA

| Information Element | Type/Reference | Format | Presence | Length | Value/Notes |
|---|---|---|---|---|---|
| URLC-UNITDATA message identity | Message Type | V | M | 1 | e.g. 0011 1111 |
| TLLI | TLLI | V | M | 4 | |
| Requested QoS | QoS | TLV | C | 5 | |
| Packet Flow Identifier | Packet Flow Identifier | TLV | O | 3 | Present if packet flow management procedures are supported. |
| LLC PDU | LLC PDU | TLV | M | 0-1560 | |

*Fig. 27B*  2600B

URLC-STATUS

| Information Element | Type/Reference | Presence | Format | Length | Value |
|---|---|---|---|---|---|
| UMA-RLC Protocol Discriminator | Protocol Discriminator | M | V | ½ | 0111 |
| Spare | | M | V | ½ | 0000 |
| URLC STATUS Message Type | Message Type | M | V | 1 | 0000 1010 |
| URLC Cause | URLC Cause | M | V | 1 | |

*Fig. 28A*  2800A

URLC-STATUS

| Information Element | Type/Reference | Presence | Format | Length | Value |
|---|---|---|---|---|---|
| Length Indicator | Length Indicator | M | V | 2 | |
| UMA-RLC Protocol Discriminator | Protocol Discriminator | M | V | ½ | 0111 |
| Skip Indicator | Skip Indicator | M | V | ½ | 0000 |
| URLC STATUS Message Type | Message Type | M | V | 1 | 0000 1010 |
| TLLI | TLLI | M | V | 4 | |
| URLC Cause | URLC Cause | M | V | 1 | |
| PDU in Error | PDU in Error | M | TLV | 4-7 | |

APPARATUS AND MESSAGES FOR INTERWORKING BETWEEN UNLICENSED ACCESS NETWORK AND GPRS NETWORK FOR DATA SERVICES

CROSS-REFERENCE TO RELATED APPLICATIONS

The present application claims the priority of provisional patent application Ser. No. 60/571,421, filed May 14, 2004, and entitled "Up Interface Stage 3 Description." The present application is a Continuation in Part of U.S. Non-provisional application Ser. No. 11/013,883, entitled "Apparatus and Method for Extending the Coverage Area of A Licensed Wireless Communication System Using an Unlicensed Wireless Communication System," filed Dec. 15, 2004. The present application is a Continuation in Part of U.S. Non-provisional application Ser. No. 11/097,866, entitled "Method and System for Registering an Unlicensed Mobile Access Subscriber with a Network Controller," filed Mar. 31, 2005. U.S. Non-provisional application Ser. No. 11/097,866 claims the priority to provisional patent application Ser. No. 60/564,696 filed Apr. 22, 2004 and entitled "UMA Network Controller (UNC) Selection and UMA Location Services Support Mechanisms." U.S. Non-provisional application Ser. No. 11/097,866 is a Continuation in Part of U.S. Non-provisional application Ser. No. 10/688,470, entitled "Apparatus and Method for Extending the Coverage Area of a Licensed Wireless Communication System Using an Unlicensed Wireless Communication System," filed Oct. 17, 2003. U.S. Non-provisional application Ser. No. 11/097,866 is a Continuation in Part of U.S. Non-provisional application Ser. No. 11/013,883. U.S. Non-provisional application Ser. No. 11/013,883 claims priority to Provisional Patent Application Ser. No. 60/530,141, filed Dec. 16, 2003 and entitled "Unlicensed Mobile Access (UMA) Architecture." U.S. Non-provisional application Ser. No. 11/013,883 claims priority to Provisional Patent Application Ser. No. 60/552,455, filed Mar. 12, 2004, and entitled "Unlicensed Mobile Access Mobility Management and Emergency Services." U.S. Non-provisional application Ser. No. 11/013,883 is a Continuation in Part of U.S. Non-provisional application Ser. No. 10/688,470. U.S. Non-provisional application Ser. No. 10/688,470 claims priority to Provisional Patent Application Ser. No. 60/419,785, filed Oct. 18, 2002 and entitled "Method for Extending the Coverage Area of a Licensed Wireless Communication System using an Unlicensed Wireless Communication System."

This application is also related to commonly owned U.S. applications: Ser. No. 10/115,833, entitled "Unlicensed Wireless Communications Base Station to Facilitate Unlicensed and Licensed Wireless Communications with a Subscriber Device, and Method of Operation," filed Apr. 2, 2002; and application Ser. No. 10/251,901, entitled "Apparatus for Supporting the Handover of a Telecommunication Session between a Licensed Wireless System and an Unlicensed Wireless System," filed Sep. 20, 2002, the contents of each of which are hereby incorporated by reference.

FIELD OF THE INVENTION

The field of invention relates generally to telecommunications. More particularly, this invention relates to messaging employed in an unlicensed mobile access (UMA) telecommunication system that includes both licensed and unlicensed radio infrastructure.

BACKGROUND INFORMATION

Licensed wireless systems provide mobile wireless communications to individuals using wireless transceivers. Licensed wireless systems refer to public cellular telephone systems and/or Personal Communication Services (PCS) telephone systems. Wireless transceivers include cellular telephones, PCS telephones, wireless-enabled personal digital assistants, wireless modems, and the like.

Licensed wireless systems utilize wireless signal frequencies that are licensed from governments. Large fees are paid for access to these frequencies. Expensive base station (BS) equipment is used to support communications on licensed frequencies. Base stations are typically installed approximately a mile apart from one another (e.g., cellular towers in a cellular network). The wireless transport mechanisms and frequencies employed by typical licensed wireless systems limit both data transfer rates and range. As a result, the quality of service (voice quality and speed of data transfer) in licensed wireless systems is considerably inferior to the quality of service afforded by landline (wired) connections. Thus, the user of a licensed wireless system pays relatively high fees for relatively low quality service.

Landline (wired) connections are extensively deployed and generally perform at a lower cost with higher quality voice and higher speed data services. The problem with landline connections is that they constrain the mobility of a user. Traditionally, a physical connection to the landline was required.

In the past few years, the use of unlicensed wireless communication systems to facilitate mobile access to landline-based networks have seen rapid growth. For example, such unlicensed wireless systems may support wireless communication based on the IEEE 802.11a, b or g standards (WiFi), or the Bluetooth™ standard. The mobility range associated with such systems is typically on the order of 100 meters or less. A typical unlicensed wireless communication system includes a base station comprising a wireless access point (AP) with a physical connection (e.g., coaxial, twisted pair, or optical cable) to a landline-based network. The AP has a RF transceiver to facilitate communication with a wireless handset that is operative within a modest distance of the AP, wherein the data transport rates supported by the WiFi and Bluetooth™ standards are much higher than those supported by the aforementioned licensed wireless systems. Thus, this option provides higher quality services at a lower cost, but the services only extend a modest distance from the base station.

Currently, technology is being developed to integrate the use of licensed and unlicensed wireless systems in a seamless fashion, thus enabling a user to access, via a single handset, an unlicensed wireless system when within the range of such a system, while accessing a licensed wireless system when out of range of the unlicensed wireless system. unlicensed wireless networks and for directing them to an appropriate network controller. In order to support more rapid implementation by various vendors, a standardized set of messages for performing various functions, such at registration, channel activation, handover, and the like are needed.

SUMMARY OF THE INVENTION

In accordance with aspects of the present invention, methods for performing various operations using unlicensed mobile access (UMA) radio link control (URLC) messages in an unlicensed mobile access network (UMAN) are disclosed. The UMAN comprises a first radio access network that may be employed for accessing data services provided by a core network comprising a second radio access network. URLC messages are exchanged between mobile stations (MSs) and UMA network controllers (UNCs) to perform various operations associated with the UMAN. By employing a wireless link using an unlicensed radio frequency, such as an 802.11-based link or a Bluetooth™ link, the MS may access the UMAN via a wireless access point (AP) that is communicatively-coupled to the UNC via an IP network. The URLC messages are sent between MSs and UNCs using an Up interface comprising a set of layered protocols over an underlying IP transport.

In another aspect of the present invention, URLC messages with specific formats are disclosed. The messages include a URLC-DATA message, a URLC-UNITDATA message, a URLC-PS-PAGE message, a URLC-SUSPEND-REQ message, a URLC-DFC-REQ, and a URLC-STATUS message. Each of the URLC messages includes a basic set of information elements (IEs) including a protocol discriminator, and a message type via which the message may be identified. Further IEs relevant to each particular URLC message are also disclosed.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIG. 1B illustrates GPRS protocol layers of a mobile set in accordance with one embodiment;

FIG. 1C illustrates a method of protocol conversion in accordance with one embodiment;

FIG. 3B shows Bluetooth lower layers employed by a mobile station and access point to facilitate physical layer communications;

FIG. 3C shows 802.11 based lower layers employed by a mobile station and access point to facilitate physical layer communications;

FIG. 8 is a table illustrating one embodiment of a URLC-ACTIVATE-UTC-REQ message format;

FIG. 9 is a table illustrating one embodiment of a URLC-ACTIVATE-UTC-ACK message format;

FIG. 10 shows an exemplary lookup table containing URLC cause values;

FIG. 12 is a table illustrating one embodiment of a URLC-DEACTIVATE-UTC-REQ message format;

FIG. 13 is a table illustrating one embodiment of a URLC-DEACTIVATE-UTC-ACK message format;

FIG. 14 illustrates the use of URLC-DATA messages to transport GPRS Signaling and GPRS SMS messages over existing UMA signaling;

FIGS. 15A and 15B are tables illustrating respective embodiments of a URLC-DATA message format;

FIG. 16 illustrates the use of a URLC-PS-PAGE message to page a mobile station for PS services;

FIGS. 17A and 17B are tables illustrating respective embodiments of a URLC PS PAGE message format;

FIG. 18 illustrates the use of a URLC-SUSPEND-REQ message to initiate suspension of GPRS services;

FIGS. 19A and 19B are tables illustrating respective embodiments of a URLC-SUSPEND-REQ message format;

FIG. 20 illustrates the use of a URR-RELEASE message in connection with resuming GPRS services for a mobile station;

FIGS. 21A and 21B are tables illustrating respective embodiments of a URR RELEASE message format;

FIG. 22 illustrates the use of a URLC-DFC-REQ to initiate a flow control procedure in downlink direction;

FIGS. 23A and 23B are tables illustrating embodiments of a URLC FLOW-CONTROL REQUEST and a URLC-DFC-REQ message formats;

FIG. 25 is a table illustrating one embodiment of a URLC-UFC-REQ message format;

FIGS. 27A and 27B are tables illustrating respective embodiments of a URLC-UNITDATA message format;

FIGS. 28A and 28B are tables illustrating respective embodiments of a URLC-STATUS message format;

DETAILED DESCRIPTION

In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the present description the unlicensed wireless system may be a short-range wireless system, which may be described as an "indoor" solution. However, it will be understood through the application that the unlicensed wireless system includes unlicensed wireless systems that cover not only a portion of a building but also local outdoor regions, such as outdoor portions of a corporate campus serviced by an unlicensed wireless system. The mobile station may, for example, be a wireless phone, smart phone, personal digital assistant, or mobile computer. The "mobile station" may also, for example, be a fixed wireless device providing a set of terminal adapter functions for connecting Integrated Services Digital Network (ISDN) or Plain Old Telephone Service (POTS) terminals to the wireless system. Application of the present invention to this type of device enables the wireless service provider to offer so-called landline replacement service to users, even for user locations not sufficiently covered by the licensed wireless system. The present description is in the context of the UMA (Unlicensed Mobile Access) standardized architecture as promulgated by the UMA consortium. However, the invention is not so limited.

Throughout the following description, acronyms commonly used in the telecommunications industry for wireless services are utilized along with acronyms specific to the present invention. A table of acronyms specific to this application is included in Appendix I.

Figure 1A:
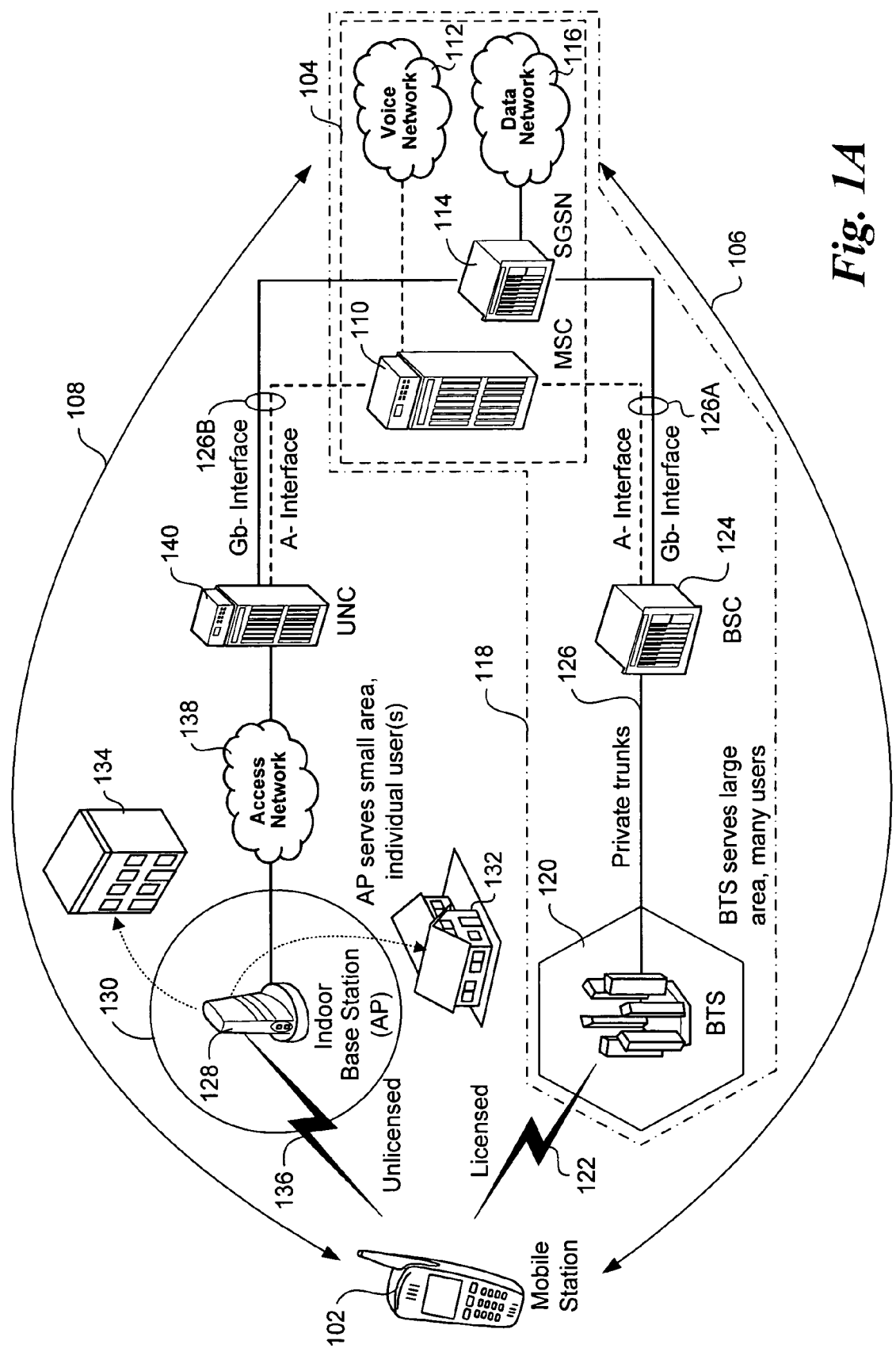
FIG. 1A provides an overview of the indoor access network (IAN) mobile service solution in accordance with one embodiment of the present invention.

FIG. 1A illustrates an Unlicensed Mobile Access (UMA) architecture 100 in accordance with one embodiment of the present invention. UMA architecture 100 enables a user of a mobile station 102 to access a voice and telecommunications network 104 via either a licensed wireless communications session 106, or an unlicensed wireless communication session 108. The telecommunications network 104 includes a mobile switching center (MSC) 110, which provides access to a voice network 112, and a Serving GPRS (General Packet Radio Service) Support Node (SGSN) 114, which provides access to a data network 116. MSC 110 also provides an internal visitor location register (VLR) function.

In further detail, the licensed wireless communication session is facilitated by infrastructure provided by a licensed wireless network 118 that includes telecommunications network 104. In the illustrated embodiment, licensed wireless network 118 depicts components common to a GSM-(Global System for Mobile Communication) based cellular network that includes multiple base transceiver stations (BTS) 120 (of which only one is shown for simplicity) that facilitate wireless communication services for various mobile stations 102 via respective licensed radio links 122 (e.g., radio links employing radio frequencies within a licensed bandwidth). Typically, the multiple BTSs 120 are configured in a cellular configuration (one per each cell) that covers a wide service area. The various BTSs 120 for a given area or region are managed by a base station controller (BSC) 124, with each BTS 120 communicatively-coupled to its BSC 124 via a private trunk 126. In general, a large licensed wireless network, such as that provided by a regional or nationwide mobile services provider, will include multiple BSCs 124.

Each BSC 124 communicates with telecommunications network 104 through a standard base station controller interface 126. For example, a BSC 124 may communicate with MSC 110 via the GSM A-interface for circuit switched voice services and with SGSN 114 via the GSM Gb interface for packet data services (GPRS). Conventional licensed voice and data networks 104 include protocols to permit seamless handoffs from one recognized BSC 124 to another BSC (not shown).

An unlicensed communication session 108 is facilitated via an (wireless) access point (AP) 128 comprising an indoor base station 130. Typically, AP 128 will be located in a fixed structure, such as a home 132 or an office building 134. The service area of indoor base station 130 includes an indoor portion of a building, although it will be understood that the service area of an indoor base station may include an outdoor portion of a building or campus. As indicated by the arrow representing unlicensed communication session 108, the mobile station 102 may be connected to the telecommunications network 114 via a second data path that includes an unlicensed wireless channel 136, access point 128, an access network 138, and an unlicensed mobile access network controller (UNC) 140. The UNC 140 communicates with telecommunications network 104 using a base station controller interface 126 B that is similar to base station controller interface 126 A, and includes a GSM A interface and Gb interface. AP 128 may include software entities stored in memory and executing on one or more microprocessors (not shown in FIG. 1A) adapted to perform protocol conversion.

The unlicensed wireless channel 136 is facilitated by a radio link employing a wavelength (or wavelength range) in an unlicensed, free spectrum (e.g., spectrum around 2.4 GHz, 5 GHz, 11-66 GHz). An unlicensed wireless service hosting unlicensed wireless channel 136 may have an associated communication protocol. As examples, the unlicensed wireless service may be a Bluetooth™ compatible wireless service, or a wireless local area network (LAN) (WiFi) service (e.g., the IEEE 802.11a, b, or g wireless standard). This provides the user with potentially improved quality of service in the service regions of the unlicensed wireless service (i.e., within the service range of a corresponding AP). Thus, when a subscriber is within range of the unlicensed AP, the subscriber may enjoy low cost, high speed, and high quality voice and data services. In addition, the subscriber enjoys extended service range since the handset can receive services deep within a building at locations that otherwise may not be reliably serviced by a licensed wireless system. At the same time, the subscriber can roam outside the range of the unlicensed AP without dropping communications. Instead, roaming outside the range of the unlicensed AP results in a seamless handoff (also referred to as a handover) wherein communication services are automatically provided by the licensed wireless system, as described in more detail in U.S. patent application Ser. No. 10/115,833, the contents of which are hereby incorporated by reference.

Mobile station 102 may include a microprocessor and memory (not shown) that stores computer program instructions for executing wireless protocols for managing communication sessions. As illustrated in FIG. 1B, in one embodiment the mobile station 102 includes a layer 1 protocol layer 142, layer 2 protocol layer 144, and a layer 3 signaling protocol layer for the licensed wireless service that includes a UMA radio link control (RLC) sublayer 146, a logical link control (LLC) sublayer 148, and upper layers 150. It will be understood that the level 1, level 2, and level 3 layers may be implemented as software modules, which may also be described as software "entities." In accordance with a common nomenclature for licensed wireless services, layer 1 is the physical layer, i.e., the physical baseband for a wireless communication session. The physical layer is the lowest layer of the radio interface and provides functions to transfer bit streams over physical radio links. Layer 2 is the data link layer. The data link layer provides signaling between the mobile station and the base station controller. The RLC sublayer is concerned with link layer connection between the MS and UNC/BSS for GPRS data service. The LLC sublayer 148 is used to convey information between layer-3 entities in the MS and SGSN for GPRS data service. The upper layers 150 include standard layer 3 protocols and applications used for GPRS data service.

The mobile station may also include an unlicensed wireless service physical layer 152 (i.e., a physical layer for unlicensed wireless service such as Bluetooth, WiFi, or other unlicensed wireless channel (e.g., WiMAX)). The mobile station also includes an unlicensed wireless service level 2 link layer 154, and an unlicensed wireless service radio resource sublayer(s) 156. An access mode switch 160 is included for the mobile management 148 and call management layers 150 to access the unlicensed wireless service radio resource sublayer 156 and unlicensed wireless service link layer 154 when the mobile station 102 is within range of an unlicensed AP 128 and to support switching between licensed RLC sublayer 146 and unlicensed RLC sublayer 156.

The unlicensed radio resource sublayer 156 and unlicensed link layer 154 may include protocols specific to the unlicensed wireless service utilized in addition to protocols selected to facilitate seamless handoff between licensed and unlicensed wireless systems. Consequently, the unlicensed radio resource sublayer 156 and unlicensed link layer 154 need to be converted into a format compatible with a conventional base station controller interface protocol 126 recognized by a MSC, SGSN, or other voice or data network.

Referring to FIG. 1C, in one embodiment of the present invention, the mobile station 102, AP 128 and UNC 140 provide an interface conversion function to convert the level 1, level 2, and level 3 layers of the unlicensed service into a conventional base station subnetwork (BSS) interface 126B (e.g., a Gb-interface). As a result of the protocol conversion, a communication session may be established that is transparent to the data network 104, i.e., the data network 104 uses its standard interface and protocols for the communication session as it would with a conventional communication session handled by a conventional base transceiver station. For example, in some embodiments the mobile station 102 and UNC 140 are configured to initiate and forward location update and service requests. As a result, protocols for a seamless handoff of services that is transparent to data network 104 are facilitated. This permits, for example, a single phone number to be used for both the licensed wireless service and the unlicensed wireless service. Additionally, the present invention permits a variety of services that were traditionally offered only through licensed wireless services to be offered through an unlicensed wireless service. The user thus gets the benefit of potentially higher quality service when their mobile station is located within the area serviced by a high bandwidth unlicensed wireless service while also having access to conventional phone services.

The licensed wireless service may comprise any licensed wireless service having a defined BSS interface protocol 126 for a voice/data network 104. In one embodiment, the licensed wireless service is a GSM/GPRS radio access network, although it will be understood that embodiments of the present invention include other licensed wireless services. For this embodiment, the UNC 140 interconnects to the GSM core network via the same base station controller interfaces 126 used by a standard GSM BSS network element. For example, in a GSM application, these interfaces are the GSM A-interface for circuit switched voice services and the GSM Gb interface for packet data services (GPRS). In a UMTS (Universal Mobile Telecommunications System) application of the invention, the UNC 140 interconnects to the UMTS network using a UMTS Iu-cs interface for circuit switched voice services and the UMTS Iu-ps interface for packet data services. In a CDMA application of the invention, the UNC 140 interconnects with the CDMA network using the CDMA A1 and A2 interfaces for circuit switched voice services and the CDMA A10 and A11 interfaces for packet data services.

In a GSM/GPRS embodiment, UNC 140 appears to the GSM/GPRS core network as a GSM BSS network element and is managed and operated as such. In this architecture the principle elements of transaction control (e.g., call processing) are provided by higher network elements; namely the MSC 110 visitor location register (VLR) and the SGSN 114. Authorized mobile stations are allowed access to the GSM/GPRS core network either directly through the GSM radio access network if they are outside of the service area of an AP 128 or via the UMA network system if they are within the service area of an AP.

Since a communication session hosted by the UMA architecture 100 is transparent to a voice network 112 or data network 116, the unlicensed wireless service may support all user services that are typically offered by a wireless service provider. In the GSM case, this typically includes the following basic services: Telephony; Emergency call (e.g., E911 calling in North America); Short message, mobile-terminated point-to-point (MT/PP); Short message, mobile-originated point-to-point (MO/PP); GPRS bearer services; and Handover (outdoor-to-indoor, indoor-to-outdoor, voice, data, SMS, SS). Additionally, GSM may also support various supplementary services that are well-known in the art.

Figure 2A:
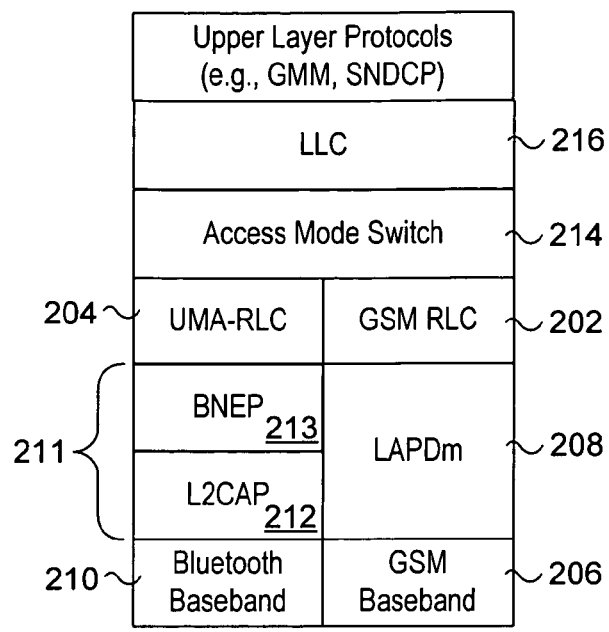
FIG. 2A illustrates an overview of a level 1, level 2, and level 3 GPRS-related protocol architecture for one embodiment of a mobile station that provides unlicensed radio links via Bluetooth signaling.

FIG. 2A provides an overview of a level 1, level 2, and level 3 GPRS-related protocol architecture for one embodiment of mobile station 102 that provides unlicensed radio links via Bluetooth signaling. As illustrated, there are two RLC Radio Link Control management entities: the GSM RLC entity 202 and the UMA-RLC entity 204. The protocol architecture includes a GSM baseband level 1 layer 206, GSM level 2 link layer (LAPDm) 208, Bluetooth baseband level 1 layer 210, Bluetooth level 2 layers 211 including a layer 2 connection access procedure (L2CAP) layer 212 and a BNEP layer 213, an access mode switch 214, and upper layer protocols 216. When the mobile station is operating in an UMA mode, the UMA-RLC entity 204 is the current "serving" RLC entity providing service to the upper layers including the GPRS mobility management (GMM) sublayer and the LLC sublayer via the designated service access points GMMRR-SAP and GRR-SAP respectively. The GSM RLC entity is detached from the GMM and LLC sublayers in this mode. The UMA-RLC entity 204 provides a new set of functions, and is responsible for emulation of the GSM RLC layer to provide the expected services to the GMM and LLC layers; i.e., packet transfer, GPRS suspension etc,. All existing GSM 04.64 primitives defined for the GRR-SAP and GMMRR-SAP apply. The plug-in of UMA-RLC entity 204 is made transparent to the upper layer protocols in this way. Moreover, a UMA-RLC entity 204 module is responsible for coordination with the GSM RLC entity to manage access mode switching and packet forwarding, as described in further detail in application Ser. No. 10/688,470 referenced above.

Figure 2B:
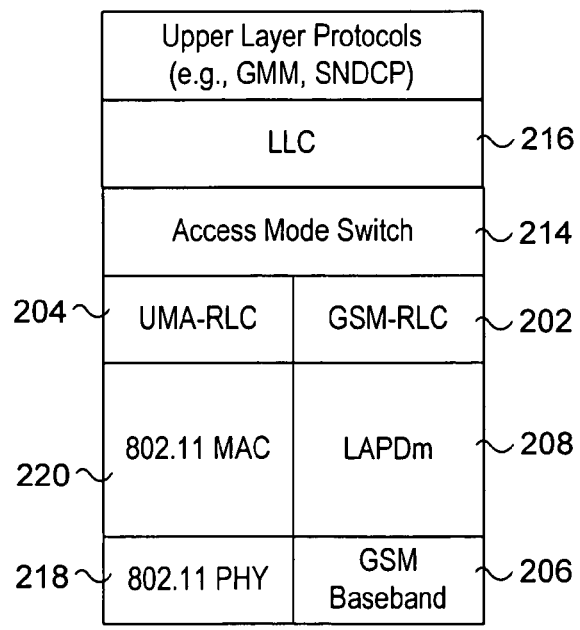
FIG. 2B illustrates an overview of a level 1, level 2, and level 3 GPRS-related protocol architecture for one embodiment of a mobile station that provides unlicensed radio links via IEEE 802.11 signaling.

FIG. 2B provides an overview of a level 1, level 2, and level 3 GPRS-related protocol architecture for one embodiment of mobile station 102 that provides unlicensed radio links via IEEE 802.11 signaling. All of the entities and layers are the same as described above for FIG. 2A, except that the Bluetooth layers have been replaced with an 802.11 PHY layer 218 and an 802.11 MAC layer 220.

Figure 3A:
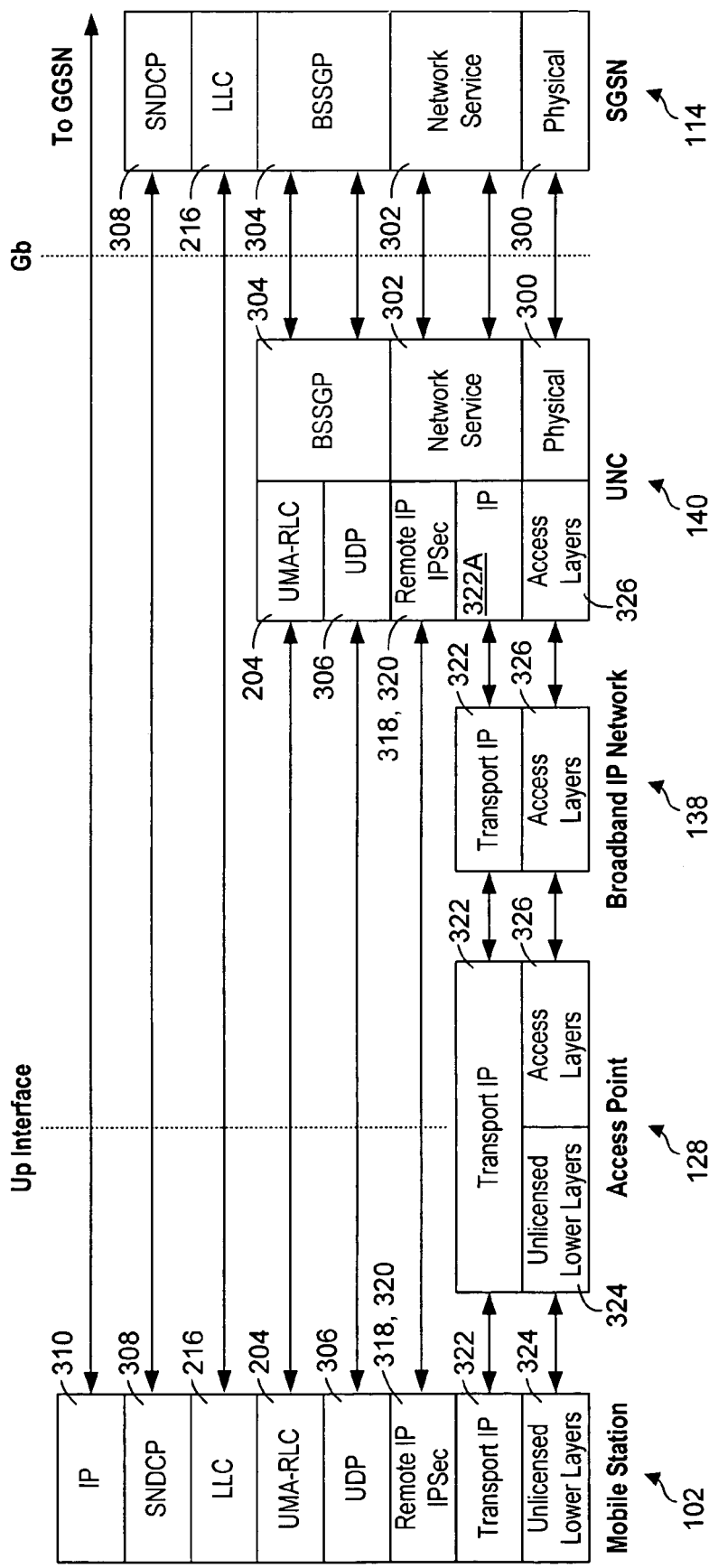
FIG. 3A illustrates the Up GPRS user plane protocol architecture and interworking with Gb interface, according to one embodiment.

FIG. 3A illustrates the Up GPRS user plane protocol architecture, according to one embodiment. The Up GPRS user plane protocol architecture effectively enables the tunneling of GPRS data packets through the UNC 140 utilizing the unlicensed spectrum, thus supporting a tunneling function for packet-switched traffic between the mobile station 102 and SGSN 118. The UMA-RLC (URLC) protocol supports the UMA "layer 3" signaling functions via UMA-RLC layers 204 provided by each of the mobile station 102 and UNC 140. The UNC 140, acting like a BSC, terminates URLC protocol messages and is responsible for the interworking between these messages and the analogous Gb-interface messages.

As illustrated in FIG. 3A, each of the UNC 140 and SGSN 114 employ conventional facilities for supporting GPRS data packets, including a physical layer 300, a network service layer 302, and a BSSGP layer 304. Each of mobile station 102 and UNC 140 include a UDP layer 306 and a UMA-RLC layer 204. Each of mobile station 102 and SGSN include an LLC layer 216 and an SNDCP layer 308. Mobile station 102 also includes an IP layer 310.

Under the architecture of FIG. 3A, GPRS LLC PDUs carrying data are carried transparently between the mobile station 102 and SGSN 114. This allows the mobile station to derive all GPRS services in the same manner as if it were in a GERAN BSS. All existing GPRS applications and MMI in mobile station 102 are unchanged. LLC PDUs are carried over UMA-RLC layer 204 from mobile station 102 to UNC 140, which relays the PDUs over to SGSN 114 using BSSGP messaging. The UMA-RLC layer for data transport 204 runs directly over the UDP layer 306 to leverage the IP bearer service.

The layers below the UMA-RLC layer 204 in each of mobile station 104 and UNC 140 include a TCP layer 316, a remote IP layer 318, and an IPSec (IP security) layer 320. As an option, a standard Secure Socket Layer (SSL) protocol running over TCP/IP (not shown) may be deployed in place of IPSec layer 320.

Lower-level IP connectivity between mobile station 102 and UNC 140 is supported by appropriate layers hosted by an intervening access point 128 and broadband IP network 138 (i.e., the access network 138 shown in FIG. 1A). The components for supporting the IP transport layer (i.e., the conventional network layer 3 under the seven-layer OSI model) include a transport IP layers 322 for each of the mobile station 104, AP 128, and IP network 138, and an IP layer 322A at UNC 140.

At the lowest layers (i.e., the physical and data link layers), mobile station 104 and AP 128 are depicted as providing unlicensed lower layers 324, while each of AP 128, IP network 138, and UNC 140 provide appropriate access layers 326. Typically, access layers 326 will include conventional Ethernet PHY and MAC layers (IEEE 802.3), although this is not limiting.

As shown in FIGS. 3B and 3C, the unlicensed layers lower layers 324 will depend on whether the unlicensed radio link uses Bluetooth signaling or IEEE 802.11 signaling. The Bluetooth lower layers depicted in FIG. 3B correspond to the mobile station architecture of FIG. 2A, and include a Bluetooth baseband layer 210, an L2CAP layer 212, and a BNEP layer 213. Meanwhile, the 801.11 lower layers shown in FIG. 3C correspond to the mobile station architecture of FIG. 2B, and include a 802.11 PHY layer 218 and in 802.11 MAC layer 220.

Figure 3D:
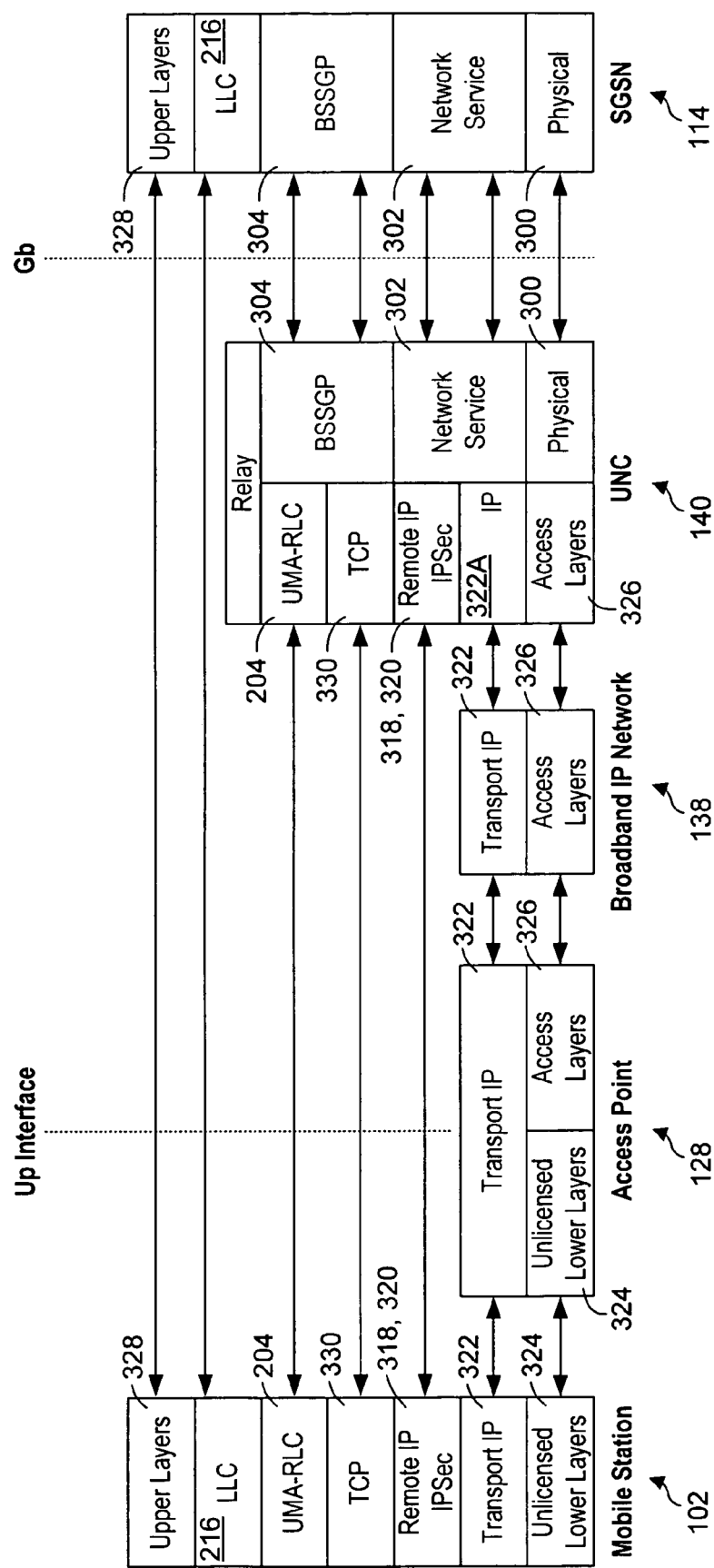
FIG. 3D illustrates the Up protocol architecture in support of GPRS Signaling, GPRS SMS and UMA specific signaling for data services, according to one embodiment.

FIG. 3D illustrates the Up protocol architecture in support of GPRS Signaling and SMS services, according to one embodiment. Under this architecture, the GPRS LLC PDUs for signaling on higher layer protocols and SMS (including upper layers 328) are carried transparently between MS 102 and SGSN 114. This allows the MS to obtain all GPRS services in the same ways as if it were connected to a GERAN BSS. The GPRS-RLC protocol is replaced with an equivalent (from the upper layer perspective) UMA-RLC protocol. Reliability is ensured by TCP layer 330. As in a GERAN BSS, the UNC, acting like a BSC, terminates the UMA-RLC protocol and inter-works it to the Gb-interface using BSSGP.

As noted above, the mobile station may be, for example, a wireless phone, smart phone, personal digital assistant, or mobile computer. The mobile station may also be, for example, a fixed wireless device providing a set of terminal adapter functions for connecting Integrated Services Digital Network (ISDN) or Plain Old Telephone Service (POTS) terminals to the wireless system.

Other terminal adapter types than those listed above may be employed with embodiments of the present invention. For example: (1) a terminal adapter that supports cordless telephones rather than POTS phones; (2) a terminal adapter that supports standard Session Initiation Protocol (SIP) telephones; and (3) a terminal adapter that also integrates a corded handset and user interface, such as one would find on a desk phone. In each case, the invention described herein describes how these terminal adapter functions can be connected to the wireless system via the unlicensed network.

The use of other standard Bluetooth capabilities together with embodiments of the present invention is possible. For example, there is a Bluetooth standard capability called "SIM Access Profile" that allows one Bluetooth device (e.g., an embedded cell phone subsystem in a car) to access the SIM that is in another Bluetooth device (e.g., the user's normal cell phone), allowing the first device to take on the "personality" associated with the SIM (i.e., that of the user's normal cell phone). The embodiments described above could make use of this standard capability to give the terminal adapter-attached devices (e.g., a POTS phone) the personality of the user's cell phone.

The UNC 140 provides functions equivalent to that of a GSM BSC, and as such controls one or more (virtual) UMA cells. In one embodiment, there may be a single UMA cell per UNC and, in an alternative embodiment, there may be one UMA cell per access point connected to a UNC. The latter embodiment may be less desirable due to the large number of APs expected to be used, so the UMA architecture permits flexible groupings of APs into UMA cells. Each UMA cell may be identified by a cell global identifier (CGI), with an unused absolute radio frequency channel number (ARFCN) assigned to each UMA cell. Each UMA cell may be mapped to a physical boundary by associating it with specific GSM location areas served by the MSC. GSM cells within the location areas mapped to a UMA cell are configured with ARFCN-to-CGI mappings for that UMA cell. Further, this ARFCN may be advertised in the BA list by the GSM cells to permit handovers. Note that UMA cells may use the same location area identifiers (LAI) as existing GSM cells, or a new LAI may be used for UMA cells. The latter is useful in reducing paging in GSM cells when a mobile station is known to be registered via an INC. The above discussion applies equally to GPRS routing areas and routing area identifiers (RAIs).

UMA CPE Addressing

Customer premise equipment (CPE) may include the mobile station and the access point (AP) through which the mobile station may access the UNC for UMA service. UMA CPE addressing parameters may include the parameters described below.

The UMA CPE addressing includes the international mobile subscriber identity (IMSI) associated with the SIM in the mobile equipment as a parameter. The IMSI is provided by the UMA mobile station to the UNC when it requests UMA service via the Up interface to the UNC. Unlike the GSM BSC, the UNC manages a context for each mobile station that is operating in UMA mode. Therefore, the UNC maintains a record for each served mobile station. For example, IMSI may be used by the UNC to find the appropriate mobile station record when the UNC receives a BSS-MAP paging message.

The UMA CPE addressing includes the address associated with the unlicensed interface in the mobile equipment (e.g., 802.11 MAC address) as a parameter. This identifier may be provided by the UMA mobile station to the UNC when it requests UMA service via the Up interface. The UNC may use this address as an alternative to the IMSI to limit the transfer of the IMSI over the Up interface and to assist in the routing of messages.

The UMA CPE addressing also includes the temporary logical link identifier (TLLI) assigned to the mobile station by the serving GPRS support node (SGSN) as a parameter. This identifier may be provided via standard Gb-interface procedures. The UNC tracks this address for each served mobile station to support GSM Gb-interface procedures (e.g., so that downlink GPRS packets may be routed to the correct mobile station).

The UMA CPE addressing also includes the access point ID (AP-ID) as a parameter. The AP-ID may be the MAC address of the unlicensed mode access point through which the mobile station is accessing UMA service. This identifier may be provided by the UMA mobile station to the UNC when it requests UMA service via the Up interface. The AP-ID may be used by the UNC to support location services (e.g., enhanced 911 service) to the user based on the AP from which the service is being accessed. The AP-ID may also be used by the service provider to restrict UMA service access only to authorized APs.

Other CPE addressing parameters that may be used depend on the security requirements of the Up interface (e.g., the need to manage UMA mobile station IP addresses for message routing via tunneled IPSec connections, or the need to manage local credentials assigned to the mobile station by the UNC).

UMA Cell Identification

In order to facilitate the mobility management functions in GSM/GPRS, the coverage area may be split into logical registration areas called location areas (for GSM) and routing areas (for GPRS). Mobile stations may be required to register with the network each time the serving location area (or routing area) changes. One or more location areas identifiers (LAIs) may be associated with each visited location register (VLR) in a carrier's network. Likewise, one or more routing area identifiers (RAIs) may be controlled by a single SGSN.

In one embodiment, a GSM cell is identified within the location or routing area by adding a cell identity (CI) to the location or routing area identification. The cell global identification (CGI) is the concatenation of the location area identification and the cell identity. In one embodiment, the cell identity is unique within a location area.

An Example UMA Approach to Cell Identification

One example of a UMA cell identification approach is described below. In this embodiment, a single UNC provides service for one or more UMA location areas and one or more UMA routing areas, and each UMA location area (or routing area) is distinct from, or the same as, the location area (or routing area) of the overlapping GSM cell. A UMA cell is identified within the UMA location or routing area by adding a cell identity (CI) to the location or routing area identification. The UMA cell global identification (UMA-CGI) is the concatenation of the location area identification and the cell identity. In one embodiment, a UMA cell may be a predefined partition of the overall UMA coverage area identified by a UMA-CGI value. Note that cell identification, like UMA information, may be transparent to the AP, such that the AP is not aware of its associated UMA-CGI value. The UMA components (e.g., mobile station and UNC) may support the ability to partition the overall UMA coverage area.

A partitioning method may include implementing a one-to-one or a many-to-one correspondence between GSM cell identity and UMA cell identity. Given the identification of a preferred GSM cell in a particular area, it may be possible to determine the corresponding UMA cell identity based, for example, on UNC provisioning. An example of a one-to-one relationship is mapping a GSM cell to a UMA cell. An example of a many-to-one relationship is mapping a GSM location area (and associated GSM cells) to a UMA cell.

When a UMA mobile station connects to the UNC for UMA service, it sends the CGI value and (optionally) a path loss criterion parameter (C1) of the current GSM camping cell, as well as the neighbor cells, to the UNC. The UNC maps the GSM camping cell's CGI value to a corresponding UMA cell's CGI value based on mapping logic provisioned in the UNC. This may be a one-to-one mapping (e.g., if there is one UMA cell per GSM cell) or a many-to-one mapping (e.g., if there is one UMA cell per GSM location area). If no GSM coverage is available in the UMA service area, the UNC may assign the mobile station to a default "no GSM coverage" UMA cell. A single UNC may serve one MSC. This does not preclude UNC embodiments that combine multiple UNC "instances," as defined above, in a single device (for example, a UNC that servers multiple MSCs). Each UNC may also be assigned a unique "UMA-Handover-CGI" value used for GSM-to-UMA handover purposes. For example, this may be the value provisioned in the GSM RAN BSC's ARFCN-to-CGI tables and in the MSCs (e.g., to point to the UNC).

UMA Operating Configurations

In one embodiment, at least three UMA operating configurations may be identified. In a common core configuration, the UMA LAI and an umbrella GSM RAN LAI (e.g., that serves the subscriber's neighborhood) may be different, and the network may be engineered such that the same core network entities (e.g., MSC and SGSN) serve both the UMA cells and the umbrella GSM cells. One advantage of this configuration is that subscriber movement between the UMA coverage area and the GSM coverage area does not result in inter-system (e.g., MAP) signaling (e.g., location updates and handovers are intra-MSC).

In a separate core configuration, the UMA LAI and umbrella GSM RAN LAI are different, and the network may be engineered such that different core network entities serve the UMA cells and the umbrella GSM cells. One advantage of this configuration is that engineering of the UMA and GSM networks can be more independent than in the Common Core Configuration.

In a common LAI configuration, the UMA LAI and GSM RAN LAI are the same (e.g., different cells within the same LAI). Advantages of this configuration are that subscriber movement (while idle) between the UMA coverage area and the GSM coverage area may not result in any location update signaling, and that the mobile station can easily switch to GSM mode if UMA mode resources are temporarily unavailable (e.g., to respond to paging). Further details of this and the foregoing separate core configuration are discussed in application Ser. No. 10/688,470.

UMA Registration and Deregistration

In one embodiment, as described above, a UMA registration process does not employ signaling to the PLMN infrastructure and is contained within the UMA system (i.e., between the mobile station and UNC). The UMA registration process may serve at least two purposes. It may inform the UNC that a mobile station is connected through a particular AP and is available at a particular IP address. The UNC may keep track of this information, for example, for mobile-terminated calling. The registration process may also provide the mobile station with the operating parameters associated with the UMA service on the AP. This may be analogous to the use of the GSM broadcast control channel (BCCH) to transmit system parameters to mobile stations in GSM cells. GSM system information message content that is applicable in UMA mode may be delivered to the mobile station during the UMA registration process.

Similarly, a UMA deregistration process may allow the mobile station to explicitly inform the UNC that it is leaving UMA mode, allowing the UNC to free resources that it may have assigned to the mobile station. The UNC may also support implicit UMA deregistration, wherein a secure channel to the mobile station is abruptly terminated.

UMA Redirection

In one embodiment, as described above, when a UMA mobile station connects to the UNC for UMA service, it may send a CGI value and a path loss criterion parameter (C1) of the current GSM camping cell, as well as the neighbor cells, to the UNC. Using this information, as well as internal database information, the UNC may be able to determine if it is the correct serving UNC for the mobile station, and if it is not the correct serving UNC, to redirect the mobile station to the correct UNC. The correct serving UNC may be the UNC whose UMA service area overlaps the mobile station's umbrella GSM coverage. In one embodiment, the correct serving UNC might be attached to the same MSC as the GSM BSC to which the umbrella GSM cell belongs. In an alternative embodiment, the correct serving UNC might be attached to a different MSC that may hand-over to the MSC that provides umbrella GSM coverage to the mobile station, allowing the UNC to handover calls to and from GSM. It may also enable certain location-based services (e.g., E911 Phase 1) that can be tied to the location of the GSM cell. An internal database used by the UNC may map GSM location areas to serving UNCs and conserve the amount of data that needs to be managed. This database may only need to change when a new UNC or a new GSM location area is added.

If no GSM coverage is available when a mobile station connects to the UNC for UMA service, then, under some instances, the UNC may not reliably determine the location of the mobile station for the purposes of assigning the mobile station to the correct serving UNC (e.g., to enable handover and location-based services). The UNC may permit the operator to determine the service policy in this case (e.g., the operator may provide service to the user with certain limitations, possibly with a user interface indication on the mobile station).

UMA Mobile Station Idle Mode Behavior

Figure 4:
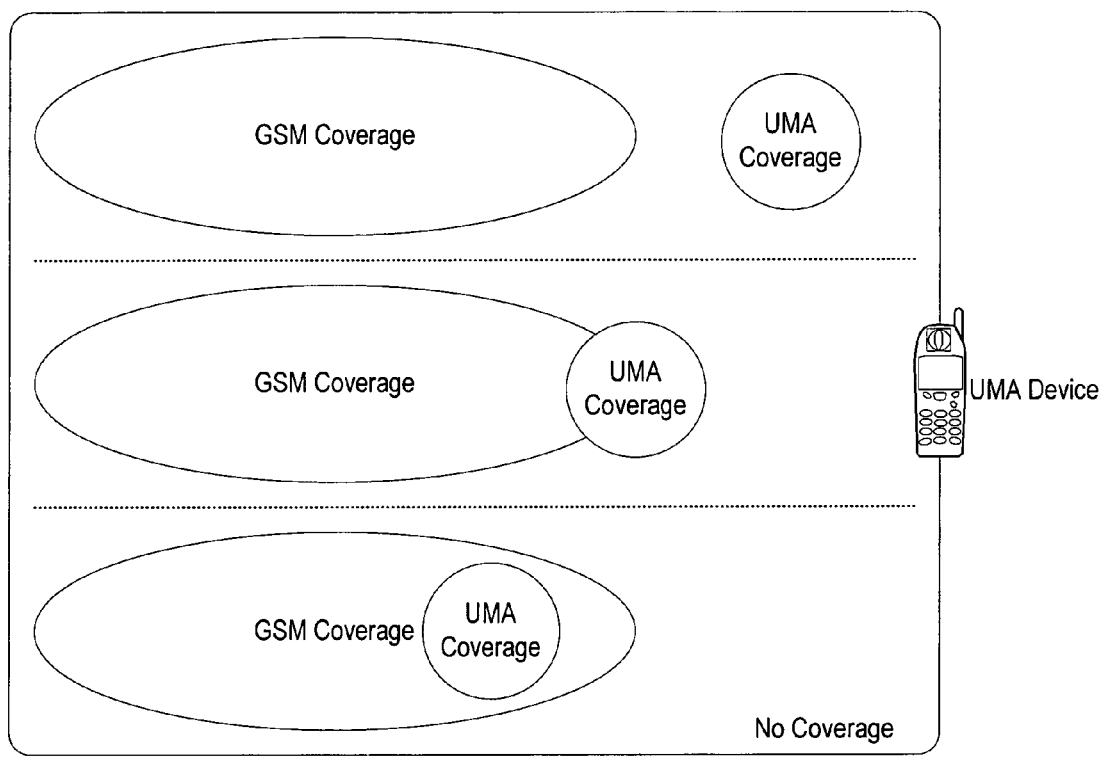
FIG. 4 illustrates several possible GSM/GPRS and UMA coverage scenarios in accordance with one embodiment.

As described above, a UMA device may encounter different radio environments as illustrated in FIG. 4. In a first environment, the GSM and UMA coverage areas are completely separate and non-overlapping. In a second environment, the GSM and UMA coverage is partially overlapping. In a third environment, which may be the most common, the UMA coverage is encapsulated within the GSM coverage. A UMA device may power on in any of these environments and further may transition in a number of attached states.

At power on, and when the mobile station is idle and there is no coverage of any type, the mobile station may scan for both GSM and UMA radio coverage. If GSM coverage is detected, then the normal GSM mobility management procedure may be initiated. This condition may apply when no UMA coverage has been detected by the mobile station when GSM coverage is detected, or prior to the completion of the UMA registration process. If UMA coverage is detected, then the UMA mobile station establishes an unlicensed wireless link (e.g., WLAN link) to the AP and monitors signal quality. When the received signal level at the mobile station passes a predefined threshold, the mobile station performs the UMA registration procedure. Based upon the information returned, the mobile station may determine if a full network registration is required, and if so, what type (e.g., GSM or combined GSM/GPRS). This procedure may apply when no GSM coverage exists or when UMA coverage is detected prior to detecting GSM coverage.

When the mobile station is idle in GSM coverage, and there is no UMA coverage, the mobile station may periodically scan for UMA coverage. If UMA coverage is detected, the mobile station may initiate the UMA registration procedure described above.

When the mobile station is idle in UMA coverage and there is no GSM coverage, the mobile station may continue to perform normal GSM PLMN search procedures. If GSM coverage is detected, the mobile station may send the GSM cell information to the UNC for possible UMA redirection purposes as described above. Alternatively, the mobile station may disable normal GSM PLMN search procedures to conserve power.

When the mobile station is idle in UMA coverage, and there is GSM coverage, the mobile station may continue to perform normal GSM cell reselection procedures and may store the identification of the selected GSM cell to speed the transition to GSM mode, if required. Alternatively, the mobile station may disable normal GSM cell reselection procedures to conserve power.

At power off in UMA coverage, a detach indication may be sent by the mobile station to the PLMN via the UMAN (e.g., if required by the PLMN network or normally sent by the mobile station at power off). This indication may be encoded per the current GSM mode of operation (e.g., GSM or GPRS).

The UMA environment may be an IEEE 802.11 environment. In this case, the mobile station periodically performs an active scan for available 802.11 APs. When an AP is discovered, it may be matched against a stored profile of user preferences and security credentials, in which case the mobile station may automatically associate with the AP. The mobile station may enter low-power sleep mode, waking up periodically to measure signal quality for determining when to trigger UMA registration.

The UMA environment may be a Bluetooth environment. In this case, the mobile station previously paired with the Bluetooth AP through which it will access UMA service. Periodically, the mobile station may enter a page scan receive mode, and respond to an AP transmit page to establish a link-level connection. Once a link-level control channel is established, and if the mobile station is not otherwise active, it may enter a low-power Bluetooth state (e.g., park mode) to conserve power. Periodically, the AP may poll the mobile station to allow it to re-enter active-power mode. This periodic traffic may also be used by the mobile station to measure signal quality to determine when to perform the UMA registration procedure.

Seamless Transitions for Data Services

A UMA device engaged in a data transaction or a simultaneous voice/data transaction may encounter a transition from GSM coverage to UMA coverage or a transition from UMA coverage to GSM coverage. In one embodiment, when the coverage transitions from GSM to UMA coverage, calls and data sessions may be handed over transparently between the GSM RAN and the UMAN. In the case of voice, the handover may be accomplished by a handover function. In the case of data, GPRS mobility management procedures enable seamless transitions of the active packet data sessions. Normal registration actions may occur upon a return to the idle state, if appropriate. When the coverage transitions from UMA to GSM coverage, calls may be handed over transparently between the UMAN and the GSM RAN. In the case of voice, the handover may be accomplished by a handover function. In the case of data, GPRS mobility management procedures enable seamless transitions of the active packet data sessions.

Messages for Unlicensed Radio Link Control (URLC) Management

The URLC Transport Channel (URLC TC) is defined as a UDP based point-to-point URLC connection between the MS and the UNC utilized for GPRS user data transfer. The URLC Transport Channel provides the association between the MS and UNC for the transport of GPRS user data over the Up interface. Given that the UMAN user data transport is UDP-based, the URLC Transport channel is associated with corresponding MS and UNC IP addresses and UDP ports used for GPRS user data transfer. The MS and UNC manage the URLC Transport Channel based on the requests for data transfer and a configurable timer URLC-CHANNEL-TIMER.

The following is the summary of the URLC TC characteristics and the associated procedures:
1) The URLC TC defines the uplink destination UNC IP address and UNC UDP port to be used by the MS for GPRS user data transfer. Furthermore, the MS maintains the value of the URLC-CHANNEL-TIMER that is received as one of the system parameters in the URR REGISTER ACK message.
2) The URLC TC defines the downlink destination MS IP address and MS UDP port to be used by the UNC for GPRS user data transfer
3) The MS or UNC will activate the URLC TC only when the GPRS user data transfer is initiated and the URLC is in the URLC-STANDBY state. The uplink and downlink GPRS user data can be transferred immediately when the URLC TC exists; i.e., the URLC is in the URLC-ACTIVE state.
4) There is no need for a specific URLC Transport Channel keep alive mechanism as the IPSec-tunnel is used for all GPRS data traffic and it will include IP level keep-alive procedures.
5) There is no need for a separate NAT traversal solution for URLC data transport, as the IPSec tunnel is used for GPRS data transfer and it will include NAT traversal procedures.

Figure 5:
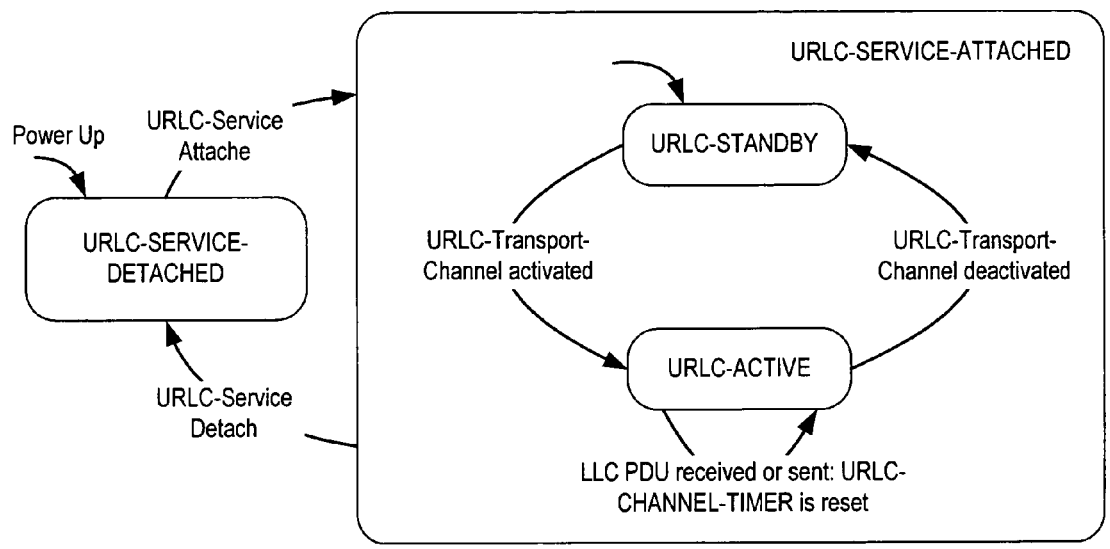
FIG. 5 is a schematic diagram illustrating the URLC states and associated behavior for a mobile station.

FIG. 5 depicts the URLC states and associated behavior on the MS side. The following is the definition of the MS URLC states:

URLC-SERVICE-DETACHED: The URLC and all the lower Up protocol layers are initialized and operational; however the URLC is not connected to LLC GRR? and GMMRR service access points (SAPs) and the GSM/GPRS RR/RLC controls GPRS SAPs; i.e. all upper layer requests are directed to GSM/GPRS RR/RLC and URLC can not communicate with upper layers (LLC and GMM). The MS is in GSM mode.

URLC-SERVICE-ATTACHED: The URLC is connected to and controls LLC GRR and GMMRR SAPs and the GSM/GPRS RR/RLC is not connected to GPRS SAPs; i.e. all upper layer requests are directed to MS URLC and GSM/GPRS RR/RLC cannot communicate with upper layers (LLC and GMM). The MS is in UMA mode.

URLC-STANDBY: This is the initial/default substate of the URLC-SERVICE-ATTACHED state. The MS is not able to send or receive GPRS user data to and from the UNC. The URLC Transport Channel does not exist when the MS is in URLC-STANDBY state. The UNC or the MS needs to activate the URLC Transport Channel before sending any GPRS user data. When the MS URLC successfully establishes a URLC Transport Channel, it transitions to the URLC-ACTIVE state.

URLC-ACTIVE: This is a substate of the URLC-SERVICE-ATTACHED state. The MS is able to send and receive GPRS user data to and from the UNC. The corresponding URLC Transport Channel exists.

Initially, immediately after the power up, the MS is in GSM mode and URLC is in the URLC-SERVICE-DETACHED state. When UMAN coverage is detected, mode selection prefers UMAN and upon a successful UMA registration, the MS switches to UMA mode. Simultaneously, the MS URLC acquires the control of the LLC GRR and GMMRR SAPs and transitions to URLC-SERVICE-ATTACHED state. The GSM/GPRS RR/RLC is now disconnected-and does not control the GPRS SAPs.

Upon entering URLC-SERVICE-ATTACHED state, the MS URLC initially transitions to URLC-STANDBY state and the corresponding URLC TC does not exist yet. The MS URLC must be able to buffer the uplink data packet or packets while the URLC TC activation is in progress. After successful URLC TC activation, the MS URLC transitions to URLC-ACTIVE state. The following are the possible triggers for URLC TC activation on the MS side:
1) The LLC initiates the uplink data transfer using LLC SAPI 3, 5, 9, or 11.

2) The UNC initiates URLC TC activation; i.e. the MS receives a URLC-ACTIVATE-GPRS-TC-REQ message from the UNC.

While the URLC is in the URLC-ACTIVE state, the corresponding URLC TC exists and the GPRS user data transport is enabled both in uplink and downlink direction. Upon the successful URLC TC activation and in parallel with transition to URLC-ACTIVE state, the MS URLC starts the URLC-CHANNEL-TIMER. The timer is restarted whenever any uplink user data packet is sent or downlink user data packet is received. When the URLC-CHANNEL-TIMER expires, the MS sends a URLC-DEACTIVATE-GPRS-TC-REQ message to the UNC to initiate URLC TC deactivation. Upon successful URLC TC deactivation, the MS URLC transitions to URLC-STANDBY state.

At any time, while in URLC-SERVICE-ATTACHED state, if the MS transitions to GSM mode or the UMAN radio link is lost, resulting in the UMAN deregistration, the URLC is disconnected from GPRS SAPs and the MS URLC enters URLC-SERVICE-DETACHED state. Simultaneously, the MS will release the associated URLC TC regardless of the URLC-CHANNEL-TIMER status.

The MS URLC maintains one URLC TC for all active user data flows; i.e. if the URLC is in URLC-ACTIVE state, any uplink user data packet is transferred using the active URLC TC regardless of the associated PFC and LLC SAP. Analogues, the URLC-CHANNEL-TIMER is restarted whenever any uplink user data packet is sent or downlink user data packet received regardless of the associated PFC and LLC SAP.

The URLC states on the network side are MS based; i.e. the URLC state information context is maintained per active MS. The UNC maintains the URLC Transport Channels and the corresponding URLC states for all mobile stations actively involved in GPRS user data transfer. The URLC TC is associated with the MS and is activated only when the actual user data transport takes place. The maximum number of simultaneously allocated URLC Transport Channels per MS is one.

Figure 6:
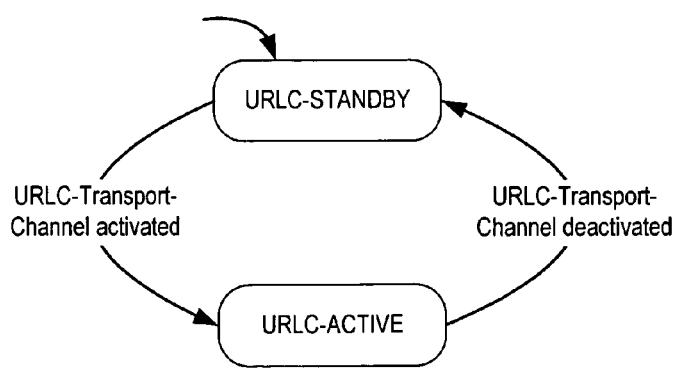
FIG. 6 is a schematic diagram illustrating the URLC states and associated behavior for a UMAN side.

FIG. 6 depicts the URLC states on the network side. The following states are defined:

URLC-STANDBY: The URLC Transport Channel does not exist when the URLC is in URLC-STANDBY state. When the corresponding URLC Transport Channel is activated, the URLC transitions to the URLC-ACTIVE state.

URLC-ACTIVE: The corresponding URLC Transport Channel exists.

Initially, after the MS registers for UMA service, the corresponding URLC state is URLC-STANDBY. Upon successful activation of the associated URLC TC, the URLC enters URLC-ACTIVE state. Both MS and UNC may initiate the URLC TC activation. If the activation was initiated by the MS, the UNC updates URLC state after successfully allocating URLC TC and forwarding the acknowledgment message to the MS. If the activation was initiated by the UNC, the UNC updates URLC state after receiving the acknowledgment message from the MS. The UNC must be able to buffer the downlink data packets for the MS while the URLC TC activation is in progress. While the URLC is in URLC-ACTIVE state, the UNC maintains the required information associated with the URLC TC and URLC state. This enables UNC to automatically send and receive GPRS user data to/from the MS while the URLC is active; i.e. the corresponding URLC TC exists.

After the URLC TC is deactivated, the corresponding URLC enters the URLC-STANDBY state. If the deactivation was initiated by the MS, the UNC updates the URLC state after the associated URLC TC is released and the acknowledgment message is sent to the MS. If the deactivation is triggered by the UMA Deregistration, the UNC immediately updates URLC state and released the associated URLC TC.

TCP is used to support the signaling channel between the MS and the UNC over which the UMA RR and UMA RLC protocol messages are transferred in both directions. Each MS establishes a single TCP connection to the UNC for signaling messages for GSM and GPRS services. Meanwhile, UDP is used for two purposes: 1) To support the bi-directional transfer of GPRS user plane traffic between the UNC and MS; and 2) To support the bidirectional transfer of RTP/RTCP speech packets between the UNC and MS URLC Message Formats The UMA-RLC Acknowledgement mode protocol provides a reliable message delivery over the UP interface, using the same TCP connection as UMA-RR. UMA-RLC signaling messages, GPRS signaling messages, and SMS messages are transferred using this service. Each UMA-RLC message includes the following information elements (IEs):

1. UAM-RLC protocol discriminator—To distinguish UMA-RLC messages from UMA-RR messages, the UMA-RLC protocol uses the protocol discriminator 0111 for bits 3 to 0 of the first octet of every UMA-RLC message. The remaining 4 bits are set to 0. It is noted that this is merely exemplary, as other sequences may be used, depending on the particular implementation.

2. Spare/Skip Indicator—In one embodiment, Bits 5 to 8 of the first octet of every UMA-RLC message contains a spare or skip indicator. (From a binary standpoint, the spare and skip indictor IEs are identical and perform the same function). An UMA-RLC message received with spare/skip indicator other than 0000 shall be ignored.

3. Message Type—the message type IE (information element) and its use are defined in GSM04.07. The UMA-RLC message types for one embodiment are listed in Table 1 below.

4. Other information elements, as required.
   i. The Presence column indicates whether an information element is mandatory ("M"), optional ("O") or conditionally present ("C").
   ii. The Format column indicates how the IE is formatted: "TLV" for tag-length-value format, "LV" for length-value and "V" for value only. The tag for the IE is also referred to as the Information Element Identifier (IEI). Mandatory information elements use "V" or "LV" format, depending on whether they are fixed or variable length. Optional and conditional information elements always use "TLV" format.

5. Length Indicator. In one embodiment, a separate Length Indicator IE is used to specify the length of a given message. In another embodiment, the underlying transport layer is used to provide a length indication for each message. Accordingly, a separate Length Indicator IE is not included in this message format. Both types of formats are illustrated by the URLC messages disclosed herein.

TABLE 1

| Message name | Identity |
| --- | --- |
| URLC-DATA | 1 |
| URLC UNITDATA | 2 |
| URLC-PS-PAGE | 3 |

TABLE 1-continued

| Message name | Identity |
| --- | --- |
| URLC-CS-PAGE | 4 |
| URLC-SUSPEND | 5 |
| URLC-UFC-REQ | 6 |
| URLC-DFC-REQ | 7 |
| URLC-ACTIVATE-UTC-REQ | 8 |
| URLC-ACTIVATE-UTC-ACK | 9 |
| URLC-DEACTIVATE-UTC-REQ | 10 |
| URLC-DEACTIVATE-UTC-ACK | 11 |
| URLC STATUS | 12 |

MS-Initiated URLC Transport Channel (URLC TC) Activation

Figure 7A:
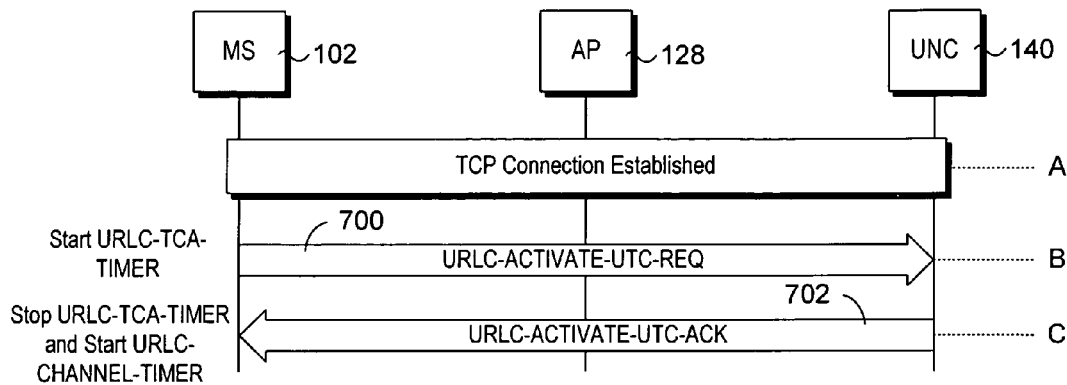
FIG. 7A illustrates a URLC message exchange initiated by a mobile station to activate a URLC transport channel.

An MS-initiated URLC TC activation is triggered by the uplink GPRS user data request when the URLC is in the URLC-STANDBY state. An example of an MS-initiated URLC TC activation message exchange sequence is shown in FIG. 7A Messages and associated signals passing between the different elements in the Figures herein are shown as horizontal arrows with arrowheads connecting the elements of the communication systems that are involved. When the arrow passes across an element and no arrowhead is shown, then this element functions as a pass through. The particular elements of the system architecture of FIG. 1 that are involved in FIG. 7A are, from left to right, a mobile station (e.g. MS 102), an access point (e.g., WLAN AP 128), and a UNC (e.g., UNC 140).

Prior to the depicted operations, various operations are performed to establish a connection with between MS 102 and AP 128, and then to establish a connection between MS 102 and UNC 140. At step A, a TCP connection has been established between the MS 102 and UNC 140. Upon receiving the uplink user data transfer request from the LLC for LLC SAPI 3, 5, 9 or 11 (not shown) and while the MS URLC is in the URLC-Standby state, the MS URLC prepares a URLC-ACTIVATE-UTC-REQ message 700 and includes the following information elements: MS IP address for downlink GPRS user data transfer and MS UDP port number for downlink GPRS user data transfer (see FIG. 8 and discussion below). Subsequently, the MS URLC sends the URLC-ACTIVATE-UTC-REQ message to the UNC at step B and starts timer URLC-TCA-TIMER to wait for the response. The MS URLC buffers the uplink data packets while the URLC TC activation is in progress.

Upon receiving the URLC-ACTIVATE-UTC-REQ message from the MS, the UNC verifies the following: the MS is UMA registered; the URLC is in URLC-STANDBY state; and the URLC TC associated with the MS does not exist. If all the checks are successful, the UNC allocates the IP address and the UDP port number for the MS GPRS user data transport. If the allocation is successful, the UNC creates the corresponding URLC TC and stores the associated information. The URLC state is updated to URLC-ACTIVE. Subsequently, the UNC sends a URLC-ACTIVATE-UTC-ACK message 702 to the MS with the cause indicating successful activation, as depicted at step C in FIG. 7A. The message includes the UNC IP address and UNC UDP port to be used for the uplink GPRS user data transport.

Upon receiving the URLC-ACTIVATE-UTC-ACK message while the MS initiated URLC TC activation is in progress, the MS stops timer URLC-TCA-TIMER, creates and stores the corresponding URLC TC record with the required information and the MS URLC transitions into URLC-ACTIVE state. The MS URLC starts URLC-CHANNEL-TIMER and forwards any outstanding uplink user data packets. The timer is restarted whenever any user data packet is sent to or received from the UNC.

Details of one embodiment of a URLC-ACTIVATE-UTC-REQ message 700 are shown in FIG. 8. For illustrative purposes, each message format illustrated herein includes an Information Element column, a Type/Reference column, a Presence column, a Format column, a Length Column, and a Value or Value/Notes column. It is noted that the actual messages will include a value that identifies the message type, along with appropriate IE values in accordance with each particular message format. Also, as with each of the messages discussed herein, URLC-ACTIVATE-UTC-REQ message 700 includes a UAM RLC protocol Discriminator IE, a Skip Indicator IE, and a Message Type IE (URLC-ACTIVATE-UTC-REQ in this instance). As used herein, these three IEs are referred to as "basic" IEs to indicate they are included in each message format.

In one embodiment, the TLLI (Temporary Logical Link Identity) IE contains the value field defined in 3GPP TS 44.018. The IP address for GPRS user data transport IE contains the MS IP address for GPRS user data -transport if the MS initiates activation. It contains UNC IP address for GPRS user data transport if UNC initiates activation (as shown in FIG. 10). The UDP Port for GPRS user data transport IE contains the MS UDP port for GPRS user data transport if the MS initiates activation. It contains UNC UDP port for GPRS user data transport if UNC initiates activation.

FIG. 9 shows details of one embodiment of a URLC-ACTIVATE-UTC-ACK message 702. In addition to the basic IEs, this message format includes an IP address for GPRS user data transport IE, a UDP Port for GPRS user data transport IE, a Remote IP address for GPRS user data transport IE, a Remote UDP Port for GPRS user data transport IE, and a URLC TC Activation Status IE. The IP address for GPRS user data transport IE must be included if the URLC cause indicates success (0 or 1) and contains an MS IP address for GPRS user data transport if an MS initiates activation or a UNC IP address for GPRS user data transport if a UNC initiates activation. The UDP Port for GPRS user data transport IE must be included if the URLC cause indicates success and contains an MS UDP port for GPRS user data transport if an MS initiates activation or a UDP port for GPRS user data transport if a UNC initiates activation.

The Remote IP address for GPRS user data transport IE must be included if responding to a duplicate activation request—URLC cause=1. It contains an MS IP address for GPRS user data transport if a UNC initiates activation or a UNC IP address for GPRS user data transport if an MS initiates activation. The Remote UDP Port for GPRS user data transport IE must be included if responding to a duplicate activation request—URLC cause=1. It contains an MS UDP port for GPRS user data transport if a UNC initiates activation or a UNC UDP port for GPRS user data transport if an MS initiates activation. The URLC TC Activation Status IE contains a coded value identifying the status of the activation and/or cause of failure. An exemplary set of coded URLC cause values are shown in FIG. 10.

Network-Initiated URLC TC Activation

Figure 7B:
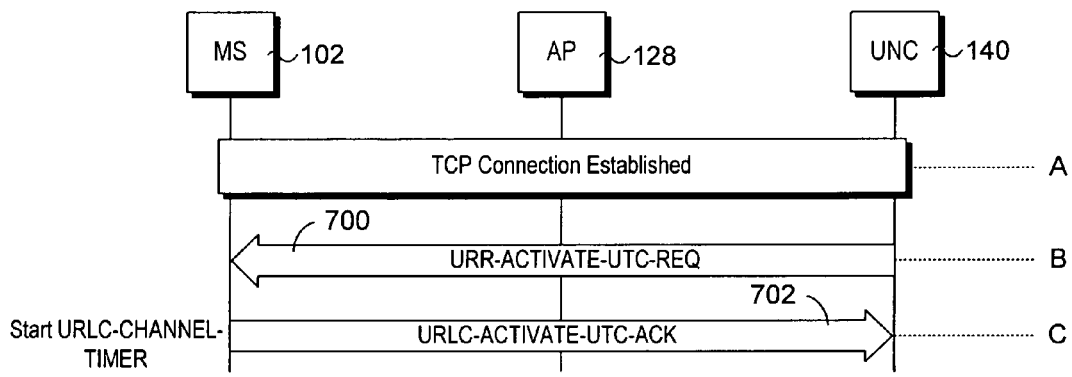
FIG. 7B illustrates a URLC message exchange initiated by a UNC to activate a URLC transport channel.

A UNC-initiated URLC TC activation is triggered by the downlink GPRS user data request when the URLC is in the URLC-STANDBY state. FIG. 7B shows a message flow depicting the messages and timers associated with this procedure. As before, a TCP connection between MS 102 and UNC 140 has been established at step A. Upon receiving the downlink user data transfer request associated with LLC SAPI 3, 5, 9 or 11 (not shown) and while the URLC is in the URLC-Standby state, the UNC allocates the IP address and the UDP port number for the MS GPRS user data transport. Assuming successful allocation, the UNC prepares a URLC-ACTIVATE-UTC-REQ message 700 that includes UNC IP address for uplink GPRS user data transfer and a UNC UDP port number for uplink GPRS user data transfer. Subsequently, at step B, the UNC sends the URLC-ACTIVATE-UTC-REQ message 700 to the MS and starts timer URLC-TCA-TIMER to wait for the response.

Upon receiving the URLC-ACTIVATE-UTC-REQ message from the UNC, the MS verifies the following: the URLC is in URLC-STANDBY state; the corresponding URLC TC does not exist; and the GPRS service is not suspended. Assuming successful verification, the MS allocates the IP address and UDP port number for the MS GPRS user data transport and stores the associated information. The URLC state is updated to URLC-ACTIVE and the MS URLC starts URLC-CHANNEL-TIMER. Subsequently at step C, the MS sends a URLC-ACTIVATE-UTC-ACK message 702 to the UNC with the cause indicating successful activation. The message includes the MS IP address and MS UDP port to be used for the downlink GPRS user data transport.

Upon receiving the URLC-ACTIVATE-UTC-ACK message 702 while the UNC initiated URLC TC activation is in progress, the UNC stops timer URLC-TCA-TIMER, creates and stores the corresponding URLC TC record with the required information and the URLC transitions into URLC-ACTIVE state. The UNC then forwards any outstanding downlink user data packets.

MS-Initiated Deactivation of URLC Transport Channel

Figure 11:
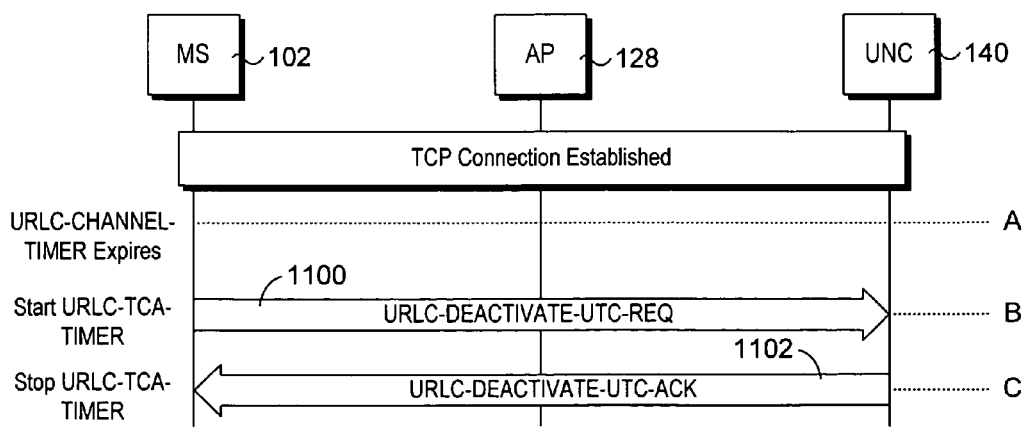
FIG. 11 illustrates a URLC message exchange initiated by a mobile station to deactivate a URLC transport channel.

When the URLC-CHANNEL-TIMER expires, the MS URLC initiates deactivation of the URLC TC by sending the request to the UNC as per the message flow depicted in FIG. 11. More particularly, when the URLC-CHANNEL-TIMER expires (step A) and if there are no outstanding uplink GPRS user data messages to he transferred, the MS sends a URLC-DEACTIVATE-UTC-REQ message 1100 to the UNC to request the deactivation and starts its URLC-TCA-TIMER to wait for the confirmation.

Upon receiving a URLC-DEACTIVATE-UTC-REQ message from the MS, the UNC verifies the following: The MS is registered for UMA service; the corresponding URLC TC is in URLC-Active state; and the corresponding URLC TC exists. Assuming successful verification, the UNC sends a URLC-DEACTIVATE-UTC-ACK message 1102 to the MS indicating successful deactivation, with the cause IE is set to "success". The UNC releases the corresponding URLC TC and updates the URLC state to URLC-STANDBY. Upon receiving a URLC-DEACTIVATE-UTC-ACK message 1102 from the UNC, the MS URLC stops its URLC-TCA-TIMER, and releases the URLC TC. In parallel, the MS URLC transitions to URLC-STANDBY state.

FIG. 12 shows one embodiment of a URLC-DEACTIVATE-UTC-REQ message 1100. In addition to the basic IEs, the message format includes a TLLI IE and a URLC TC Deactivation Cause IE. The value of this IE identifies the cause for the deactivation (via lookup of the URLC cause value table of FIG. 10). Meanwhile, FIG. 13 shows one embodiment of a URLC-DEACTIVATE-UTC-ACK message 1102. In addition to the basic IEs, the message format includes a TLLI IE.

Implicit Deactivation of URLC Transport Channel

If the UMA deregistration is performed for a mobile station with an active URLC TC, the UNC automatically releases the associated URLC TC and deletes related records including URLC state information. The MS releases the URLC TC and the MS URLC enters URLC-SERVICE-DETACHED state upon UMA deregistration. This includes scenarios where an implicit UMA deregistration is performed due to lower layer failures; e.g. radio connection loss, secure connection loss, etc.

URLC GPRS Signaling and SMS Messages Transport

While the MS is registered for UMA services, the corresponding TCP session for signaling transport is always available and, assuming that the MS URR and URLC are attached to GSM/GPRS SAPs, both the mobile station and the UNC can initiate GPRS signaling or SMS message transfer automatically using URLC DATA service as illustrated FIG. 14. The URLC-DATA transport mechanism is utilized for all GPRS GMM/SM signaling and SMS messages. GPRS signaling and SMS messages are tunneled between the MS and UNC using TCP transport. The TCP session management (establishment and release) are the responsibility of the transport layer and the same TCP session is used for GSM, GPRS and UMA signaling.

The message flow sequence of FIG. 14 may be initiated at any time while the TCP session depicted at step A is active. At step B, MS 102 sends a URLC-DATA message 1400 to UNC 140 to initiate uplink GPRS Signaling/SMS Message transfer. At step C, the UNC is depicted as sending URLC-DATA message 1400 to the MS to initiate downlink GPRS Signaling/SMS Message transfer.

An MS initiates uplink GPRS Signaling/SMS Message transfer in the following manner. Assuming that the TCP signaling session is always available while the MS is UMAN registered, the MS URLC is able to immediately forward any uplink GPRS signaling or SMS message to the UNC. Upon the request from the LLC to transfer an uplink LLC PDU carrying GPRS signaling message (identified with LLC SAPI 1) or GPRS SMS message (LLC SAPI 7), the MS URLC encapsulates the complete LLC PDU within a URLC DATA message 1400, embodiments of which are shown in FIGS. 15A and 15B as URLC DATA message formats 1400A and 1400B, respectively. Subsequently, the MS forwards the URLC DATA message to the UNC using the existing signaling TCP session.

In addition to the basic IE's, each of message formats 1400A and 1400B includes a Required QoS IE, a TLLI IE, a PFI IE, and the encapsulated LLC PDU. The Required QoS IE defines the peak throughput required or requested. This information may be specified through a 4-bit code or may be provided by the LLC with the LLC PDU request. The PFI (packet flow indicator) IE is included if the packet flow feature is supported by the MS and the core network.

The message format 1400A further includes a Requested Radio Priority IE and a First Packet Indication IE. The Requested Radio Priority is included as a component of the QoS IE as per 3GPP TS 48.018. The First Packet Indication is used to identify whether or not a packet is the first packet on an uplink, and is set to 1 whenever the first uplink packet is sent over the UMA network after MS power on or hand-in. The First Packet Indication IE value is set to 0 for subsequent uplink packets. This IE is ignored or not included for the downlink direction.

Upon receiving the uplink GPRS signaling or SMS message from the MS, the UNC extracts the received LLC PDU and available message parameters, determines the serving SGSN, BVCI, UMAN cell-id including RAI and constructs the corresponding BSSGP-UL-UNITDATA PDU. Subsequently, the UNC relays the PDU to the SGSN via the Gb interface using the BSSGP uplink unitdata procedure as per standard GPRS.

A UNC initiates downlink GPRS Signaling/SMS Message transfer in the following manner. Upon receiving a BSSGP-DL-UNITDATA PDU for the MS that contains a downlink LLC PDU with GPRS signaling or SMS message identified with LLC SAPI 1 or 7 respectively, the UNC encapsulates the complete LLC PDU within a URLC DATA message and includes the following parameters. A TLLI IE is included as a component of the URLC UNITDATA header. A PFI is included if the packet flow feature is supported by the MS and the core network. Subsequently, the UNC forwards the URLC DATA message to the MS using the existing signaling TCP session. Upon receiving the URLC-DATA message that includes the downlink GPRS signaling or SMS LLC PDU from the UNC, the MS extracts the received LLC PDU and TLLI and forwards the PDU to the LLC layer via the GRR SAP as per standard GPRS.

URLC Paging for Packet-Switched (PS) Service

The SGSN initiates the GPRS packet-switched (PS) service paging procedure prior to initiating downlink data transfer to a mobile station in GMM-STANDBY state. In the standard GPRS implementation, the SGSN sends paging request to the BSS indicating the area where the paging needs to be performed. The BSS then pages the MS in the group of cells indicated in the request utilizing GSM/GPRS radio interface. Paging in UMAN environment is more efficient than GPRS paging, as the UNC maintains the exact location of all UMAN registered MSs; consequently, the paging request is routed directly to the specific MS and is performed only if the MS is UMAN registered.

FIG. 16 depicts interactions involved in the PS paging procedure via UMAN. Upon receiving a Paging PS PDU (in a GMM-PS-Paging message) via the BSSGP interface from the SGSN at step A, the UNC verifies the corresponding MS is UMAN registered and that the MS can use GPRS services via UMAN. Assuming that the UNC determines that the MS is currently UMAN registered for GPRS service, the UNC constructs the corresponding URLC-PS-PAGE message 1600 that will include the Mobile Identity IE received in the original request; e.g., PTMSI or IMSI or another applicable identifier. Exemplary formats 1600A and 1600B for URLC-PS-PAGE message 1600 are shown in FIGS. 17A and 17B. Subsequently, the UNC forwards the URLC-PS-PAGE message 1600 to the MS via the signaling TCP session, as shown at step B.

Upon receiving a URLC-PS-PAGE message from the UNC, the MS URLC forwards the indication to the GMM layer using the GMMRR SAP as per standard GPRS. Subsequently, the MS sends an uplink LLC PDU as a page response per standard GPRS. The MS may either send a URLC-DATA message 1400 or a URLC-UNITDATA message 2600 (described below). Given that the MS responds to a PS Paging with an LLC PDU encapsulated within the standard URLC-DATA or URLC-UNITDATA message (steps C and D), the UNC will process the message as any other GPRS signaling/SMS or user data message.

GPRS Suspend Procedure

The GPRS suspend service provides a mechanism for the MS to notify the SGSN when the downlink GPRS service needs to be suspended. GPRS Suspend procedure interactions are depicted in FIG. 18. The MS will suspend GPRS service in UMAN coverage while transitioning to dedicated mode if unable to support simultaneous circuit mode and packet mode services. The UMAN supports simultaneous CS and PS services.

While transitioning to dedicated mode and if unable to support simultaneous CS and PS services, the MS requests the suspension of the downlink GPRS data transfer by sending a URLC-SUSPEND-REQ message 1800 to the UNC, as shown at step A in FIG. 18. As shown in the exemplary message formats 1800A and 1800B for a URLC-SUSPEND-REQ message 1800 shown in FIGS. 19A and 19B, the message includes the TLLI and cause IEs as per standard GSM/GPRS. The message is transferred via the signaling TCP session. Upon receiving a URLC-SUSPEND-REQ message from the MS, the UNC extracts the TLLI received as a parameter and constructs the corresponding BSSGP GMM Suspend request message as per standard GPRS. Subsequently the UNC initiates and completes the GPRS suspend procedure via the Gb interface as per standard GPRS, as depicted at step B.

GPRS Resume Procedure

The GPRS resume procedure enables a mechanism to resume the downlink GPRS service, if it was previously suspended, after the dedicated mode procedure is complete. GPRS Resume service interactions are depicted in the FIG. 20. After receiving a Clear Command 2000 from the core network (at step A) indicating that the dedicated mode procedure is complete and the RR channel needs to be released, and if the GPRS service has been suspended for that MS, the UNC initiates a GPRS Resume procedure over the Gb interface (step B). Upon completion, the UNC forwards a URR-RELEASE message 2002 to the MS including the standard GPRS resume indication. Respective embodiments of a URR-RELEASE message 2002 including a GPRS Resumption IE are shown in a URR RR RELEASE message format 2002A of FIG. 21A and a URR RELEASE message format 2002B of FIG. 21B.

Upon receiving a URR-RELEASE message 2002 from the UNC, and if the GPRS service has been suspended, the MS URR layer forwards the indication to the MM/GMM layer as per standard GSM/GPRS. Depending on the indication, the GMM layer may initiate GPRS resume procedure as per standard GSM/GPRS.

MS-Initiated Downlink Flow Control

The MS-initiated downlink flow control procedure is based on the standard GPRS downlink flow control mechanism enhanced for UMA service. The MS implements the flow control algorithm to monitor and calculate the data rate that could be supported based on the current conditions. When the flow control condition is detected (e.g. the utilization of the buffers reaches a high watermark level), the MS recalculates the estimated data rate that could be supported and sends the requests to the UNC to adjust the data rate accordingly. Upon receiving the request, the UNC calculates adjusted leak rate and sends the corresponding MS flow control request to the SGSN per standard GPRS. The MS-based flow control procedure over the Gb interface is not discussed herein, as it is already specified in the corresponding 3GPP standards.

Initially, before detecting a flow control condition, the flow control condition does not exist in the MS. In this state, the MS URLC monitors the average downlink data rate and the utilization of resources (e.g. downlink buffers), and when utilization exceeds a certain threshold, a downlink flow control condition is detected.

When the downlink flow control condition is detected, the MS sends a URLC-DFC-REQ message 2200 to the UNC and starts the URLC-DFC-TIMER, as shown in FIG. 22. Whenever the timer expires, the MS checks the downlink flow control condition, and if it continues to exist, the MS restarts the timer, and optionally sends another URLC-DFC-REQ message to the UNC. The MS remains in this state while the flow control condition persists. As soon as the flow control condition is resolved, the MS deactivates the URLC-DFC-TIMER and transitions to the default state in which no downlink flow control condition exists.

Upon detecting the downlink flow control condition, the MS initiates a downlink flow control procedure by sending a URLC-DFC-REQ message to the UNC. Respective embodiments illustrating a URLC FLOW-CONTROL REQUEST message format 2200A and a URLC-DFC-REQ message format 2200B are shown in FIGS. 23A and 23B. In addition to the basic IE's, message format 2200A includes a Flow-Control Adjustment IE containing a percentage of a default transfer rate, while message format 2200B includes a Request Downlink User Data Rate IE containing a new estimated data rate that can be supported. Both of these IEs are used to request adjustment of the downlink data transfer rate for the MS. At the same time, the MS starts timer URLC-DFC-TIMER to continue monitoring the flow control condition. The timer URLC-DFC-TIMER is a configurable timer. The MS sends this request to the UNC via the signaling TCP connection.

The actual mechanism used by the MS to detect and monitor flow control condition is implementation dependent, and thus not specified herein. For example, the implementation may be based on the downlink buffers maintained and monitored by the MS URLC. When the utilization of the buffers exceeds the threshold (high mark level), the MS initiates the downlink flow control procedure and starts the timer. The flow control procedure is active until the buffer utilization level reaches the low watermark level.

Upon receiving the URLC-DFC-REQ message from the MS, the UNC verifies the URLC TC associated with the MS is active, and that the current leak rate for the MS is higher than requested. Assuming successful verification, the UNC calculates the corresponding leak rate and initiates MS or PFC based flow control procedure over the Gb interface as per standard GPRS.

When the URLC-DFC-TIMER expires, the MS re-evaluates the flow control condition and performs the following based on the outcome of the evaluation. If the flow control condition still exists (e.g., downlink buffer utilization is still above the low watermark level), the MS calculates a new data rate that can be supported and forwards the corresponding URLC-DFC-REQ to the UNC via the signaling TCP connection. Simultaneously, the MS starts timer URLC-DFC-REQ to continue monitoring the downlink data transfer. If the flow condition has been resolved (e.g., buffer utilization is below the low mark level), the MS aborts the flow control procedure.

Uplink Flow Control

The uplink flow control procedure is used to dynamically manage sharing of the available Gb interface bandwidth. The UNC implements the flow control algorithm to monitor and calculate the data rate that could be supported per MS based on the current conditions. When the uplink flow control condition is detected (e.g. the utilization of the uplink buffers reached a high watermark level), the UNC recalculates the estimated data rate that could be supported and sends a corresponding request to the MS to adjust the uplink data rate. Upon receiving the request, the MS URLC immediately adjusts the uplink data rate as per request.

Figure 24:
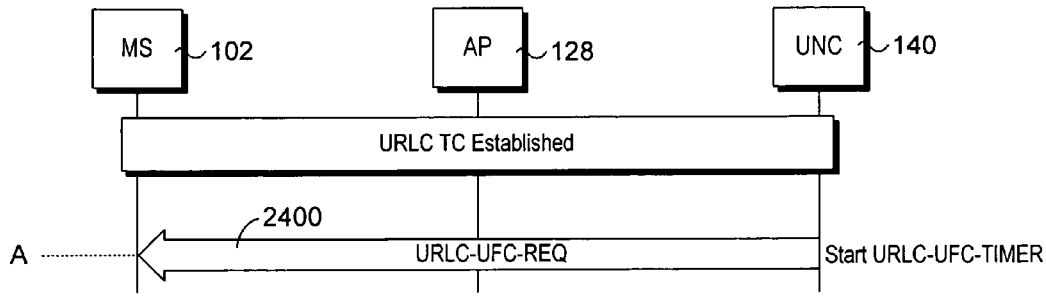
FIG. 24 illustrates the use of a URLC-UFC-REQ to initiate a flow control procedure in uplink direction.

Initially, before detecting a flow control condition, the flow control condition does not exist in the UNC. In this state, the UNC URLC monitors the average downlink data rate per MS and the utilization of resources (e.g., downlink buffers), and when utilization exceeds a certain threshold, a downlink flow control condition is detected. When the downlink flow control condition is detected, the UNC sends a URLC-UFC-REQ message 2400 to the MS and starts the URLC-UFC-TIMER, as shown in FIG. 24. Whenever the timer expires, the UNC checks the downlink flow control condition, and if it continues to exist, the UNC restarts the timer, and optionally sends another URLC-UFC-REQ message to the MS. The UNC remains in this state while the flow control condition persists. As soon as the flow control condition is resolved, the UNC deactivates the URLC-UFC-TIMER and transitions to the default state in which no downlink flow control condition exists.

Upon detecting the uplink flow control condition, the UNC initiates an uplink flow control procedure by sending a URLC-UFC-REQUEST message 2400 to the MS. One embodiment of this message is shown in FIG. 25. In addition to the basic IE's the illustrated message format includes a Requested Uplink User Data Rate IE containing data identifying a new estimated maximum data rate that can be supported. At the same time, the UNC starts a configurable URLC-UFC-TIMER to continue monitoring the flow control condition. The UNC maintains only one URLC-UFC-TIMER per MS in the uplink flow control mode. The UNC sends the URLC-UFC-REQUEST message to the MS via the signaling TCP connection.

The actual mechanism used by the UNC to detect and monitor flow control condition is implementation dependent, and thus not specified herein. One possible implementation may be based on the uplink buffers maintained and monitored by the MS URLC. There would be one buffer per active MS. When the utilization of the corresponding uplink buffer exceeds the threshold (high mark level), the UNC initiates the uplink flow control procedure for that MS and starts the URLC-UFC-TIMER. The flow control procedure is active for that MS until the buffer utilization level reaches the low mark level. Upon receiving the URLC-UFC-REQUEST message from the UNC, the MS immediately adjusts the uplink data rate accordingly.

When the URLC-UFC-TIMER expires, the UNC re-evaluates the flow control condition and performs the following based on the outcome of the evaluation. If the flow control condition still exists (e.g., buffer utilization is still above the low mark level), the UNC calculates a new uplink data rate that can be supported and forwards the corresponding URLC-UFC-REQUEST to the MS via the signaling TCP connection. Simultaneously, the UNC starts timer URLC-UFC-TIMER to continue monitoring the uplink data transfer associated with the MS. If the flow condition has been resolved (e.g., buffer utilization is below the low mark level), the UNC aborts the flow control procedure and deactivates URLC-UFC-TIMER. Based on the implemented uplink flow control algorithm, the UNC may gradually increase the uplink data rate using the same URLC-UFC-REQ message.

UMA-RLC Unacknowledged Mode

The UMA-RLC Unacknowledged mode protocol provides the mechanism for unacknowledged message delivery over the Up interface, using UDP. In one implementation, all user plane messages are transport using this service, over UDP, regardless of the RLC mode requested by LLC. In general, the message format is identical to that for UMA-RLC acknowledged mode.

Figure 26:
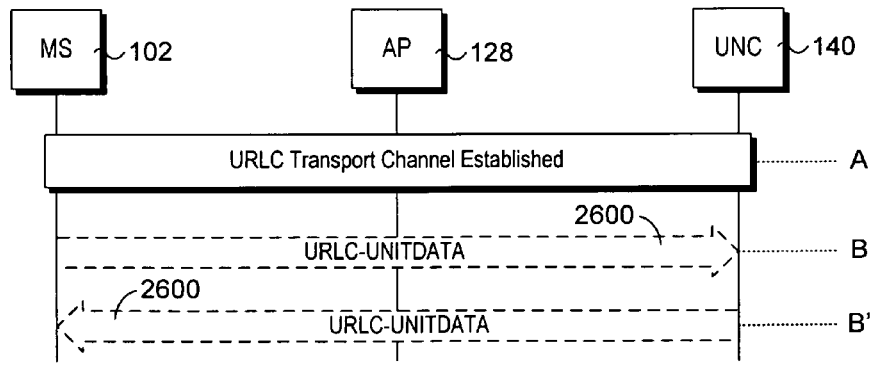
FIG. 26 illustrates the use of URLC-UNITDATA messages to transport data over a UDP transport layer.

While the corresponding URLC TC is available, both mobile station and UNC can initiate GPRS user data transfer automatically using URLC UNITDATA service as illustrated in FIG. 26. For example, at step A, a URLC transport channel is available. Accordingly, a URCL-UNITDATA message 2600 may be sent from the MS to the UNC (step B) or a URCL-UNITDATA 2600 message may be sent from the UNC to the MS (step B'). The GPRS user data packets are tunneled using UDP transport as specified for URLC Transport Channel.

Exemplary message formats 2600A and 2600B for URLC-UNITDATA message 2600 are shown in FIGS. 27A and 27B. These message formats are substantially analogous to URLC-DATA message formats 1400A and 1400B, respectively, shown in FIGS. 15A and 15B and discussed above, with the primary difference being the message type value.

MS-Initiated Uplink GPRS User Data Transfer

Assuming that the URLC TC has been already activated, the MS URLC is able to immediately forward any uplink GPRS user data packets to the UNC. Upon the request from the LLC to transfer an uplink LLC PDU with GPRS user data identified with LLC SAPI 3, 5, 9 or 11, the MS URLC restarts the URLC-CHANNEL-TIMER, encapsulates the complete LLC PDU within a URLC UNITDATA message and includes the following parameters: the TLLI IE is included as a component of the URLC UNITDATA header; the QoS IE is included and the required information is provided by the LLC with the LLC PDU request; Radio Priority is included as a component of the QoS IE as per 3GPP TS 48.018; and the PFI is included if the packet flow feature is supported by the MS and the core network.

Subsequently, the MS forwards the URLC UNITDATA message to the UNC using the existing URLC TC; i.e., using the corresponding UNC IP address and UDP port number. Upon receiving the uplink user data message from the MS, the UNC extracts the received LLC PDU and available message parameters, determines the serving SGSN, BVCI, UMAN cell-id including RAI and constructs the corresponding BSSGP-UL-UNITDATA PDU. Subsequently, the UNC relays the PDU to the SGSN via the Gb interface using the BSSGP uplink unitdata procedure as per standard GPRS.

UNC-Initiated Downlink GPRS User Data Transfer

Assuming that the URLC TC has been already activated, the UNC is able to immediately forward any downlink GPRS user data packets to the MS. Upon receiving a BSSGP-DL-UNITDATA PDU for the MS that contains a downlink LLC PDU with GPRS user data identified with LLC SAPI 3, 5, 9 or 11, the UNC encapsulates the complete LLC PDU within a URLC-UNITDATA message and includes the following parameters: a TLLI IE is included as a component of the URLC-UNITDATA header; and a PFI is included if the packet flow feature is supported by the MS and the core network. Subsequently, the UNC forwards the URLC UNIT-DATA message to the MS using the existing URLC TC; i.e., using the corresponding MS IP address and UDP port number. Upon receiving the downlink user data message from the UNC, the MS URLC restarts URLC-CHANNEL-TIMER, extracts the received LLC PDU and TLLI and forwards the PDU to the LLC layer via the GRR SAP as per standard GPRS.

Error Handling Procedures

The error handling procedures related to unknown or erroneous UMA-RR and UMA-RLC protocol data are consistent with procedures specified in 3GPP TS 04.18, 3GPP TS 24.007 and 3GPP TS 24.008. UMA-RLC protocol error handling scenarios are applicable to both TCP and UDP based transport. Errors are identified by corresponding UMA-RR-STATUS messages and URLC-STATUS messages. Exemplary URLC-STATUS message formats 2800A and 2800B are shown in FIGS. 28A and 28B. In addition to the basic IEs, each message format includes a URLC Cause IE, with a corresponding value employed via the URLC Cause Values lookup table of FIG. 10. URLC-STATUS message format 2800B further includes a TLLI IE and a PDU in Error IE, the latter of which contains a faulty message that is returned to the sender of the message.

If a message is received that is too short to include all the mandatory elements for the specific message type, the message is ignored and silently discarded. This applies to both UMA-RR and UMA-RLC messages. If a mobile station in UMA mode receives a message over UDP with message type not defined for a specific PD or not implemented, it will be ignored and silently discarded. If a mobile station in UMA mode receives a message over TCP with message type not defined for a specific PD or not implemented, it will return an URR- or URLC-STATUS message including the following cause IE: "message type non existent or not implemented". If a mobile station in UMA mode receives a UMA-RR message not compatible with the protocol state, it will return an URR-STATUS message with cause—"message type not compatible with the protocol state" (if the RR connection exists). If a mobile station in UMA mode receives an UMA-RLC message not compatible with the protocol state, it will return an URLC-STATUS message with cause "message type not compatible with the protocol state". The same processing logic applies to a UNC.

If a mobile station in UMA mode receives a UMA-RR message with a missing or syntactically incorrect mandatory element or out of sequence information element, the message is ignored and the MS will return a URR-STATUS message including the cause—"invalid mandatory information" (if the RR connection exists). If a mobile station in UMA mode receives a UMA-RR or UMA RLC message containing unknown IE, it will ignore that information element and continue with message processing. If a mobile station in UMA mode receives a UMA-RLC message with a missing or syntactically incorrect mandatory element or out of sequence information element, the message is ignored and the MS will return a URLC-STATUS message including the cause—"syntactically incorrect message". If a mobile station in UMA mode receives a UMA-RR message with semantically incorrect contents, it will ignore the message and return a URR- STATUS message with the cause—"syntactically incorrect message" (if the RR connection exists). The same processing logic applies to UNC.

UNC Architecture

Figure 29:
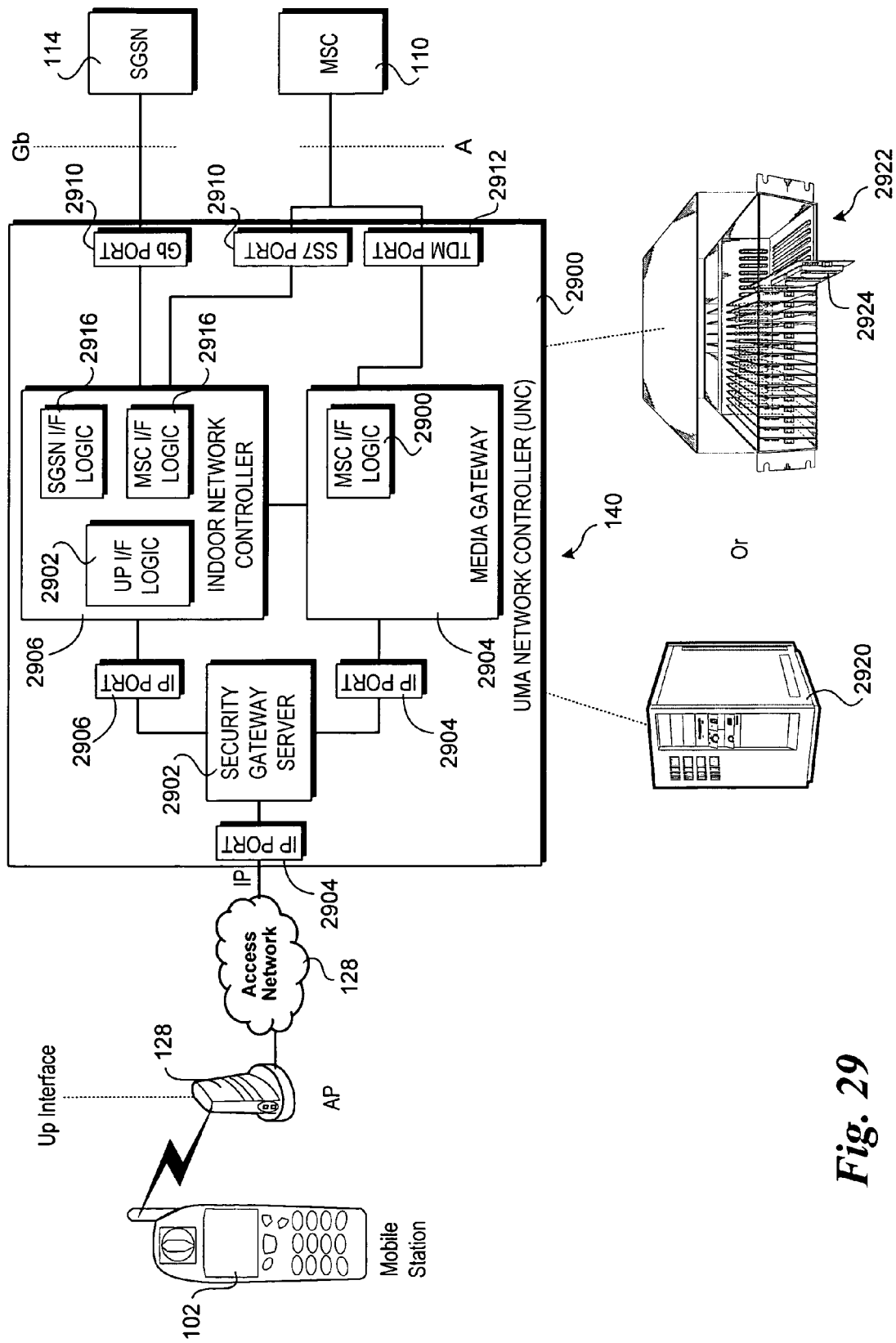
FIG. 29 is a schematic block diagram illustrating one embodiment of a high-level architecture of a UNC.

A block diagram illustrating a high level architecture corresponding to one embodiment of a UNC is shown in FIG. 29. At the heart of the UNC architecture is an indoor network controller (INC). In general, the INC perform operations that are synonymous to those described above for the UNC. However, in the illustrated architecture, an integrated gateway server is included. Accordingly, INC is shown as a separate entity for the UNC. In implementations under which the gateway server is a separate unit, the INC and UNC are one in the same.

The integrated gateway server performs security and authentication services. It may be an integrated unit (as shown), or may be a separate (physical) unit connected to the UNC via an appropriate communication link.

In general, the UNC may provide one or more communication ports to support communications between mobile stations and the UNC (e.g., via and AP and broadband IP network as shown in FIG. 1). For example, in the illustrated embodiment of FIG. 29, separate IP ports and are respectively provided for gateway server and INC. Accordingly, a separate IP address may be used initially to support authentication of an MS attempting to access a UMAN via authentication services provided by gateway server, while subsequent (e.g., once authenticated) messages to and from MS may employ IP port. In one embodiment, another separate respective IP ports and are provided to interface to an MSC in an SGSN in the core network.

The INC includes resources to support (i.e., generate and process) the UP interface messages described herein. These resources are depicted as UP Interface (I/F) logic. Similarly, INC includes A interface logic to support communications with MSC via an A interface and Gb interface logic to support communications with SGSN via a Gb interface. Each of UP interface logic, A interface logic, and Gb interface logic may be implemented via execution of software, built-in programmed hardware, or a combination of the two. For example, UP interface logic may be facilitated by executing one or more software modules on a processor, wherein the software modules are coded to generated and/or process URR and URLC messages.

In general, a UNC may be implemented by a single server, multiple distributed servers, and multiple clustered servers. For example, a single server may be employed for running various software applications to provide the various functions shown in the block diagram of the UNC architecture of FIG. 29. Optionally, some of the functions, such as the gateway server functions, may be provided by a separate server. In yet another configuration, a blade server is employed. The blade server includes multiple server blades that are installed in a common rack or chassis, with each server blade functioning as a separate server, each with its own processor(s), memory, and network interfaces. In one embodiment, the functions provided by each of the gateway server, UP interface logic, A interface logic, and Gb interface logic are facilitated via execution of software applications and/or modules on respective server blades.

Mobile Station Architecture

Figure 30:
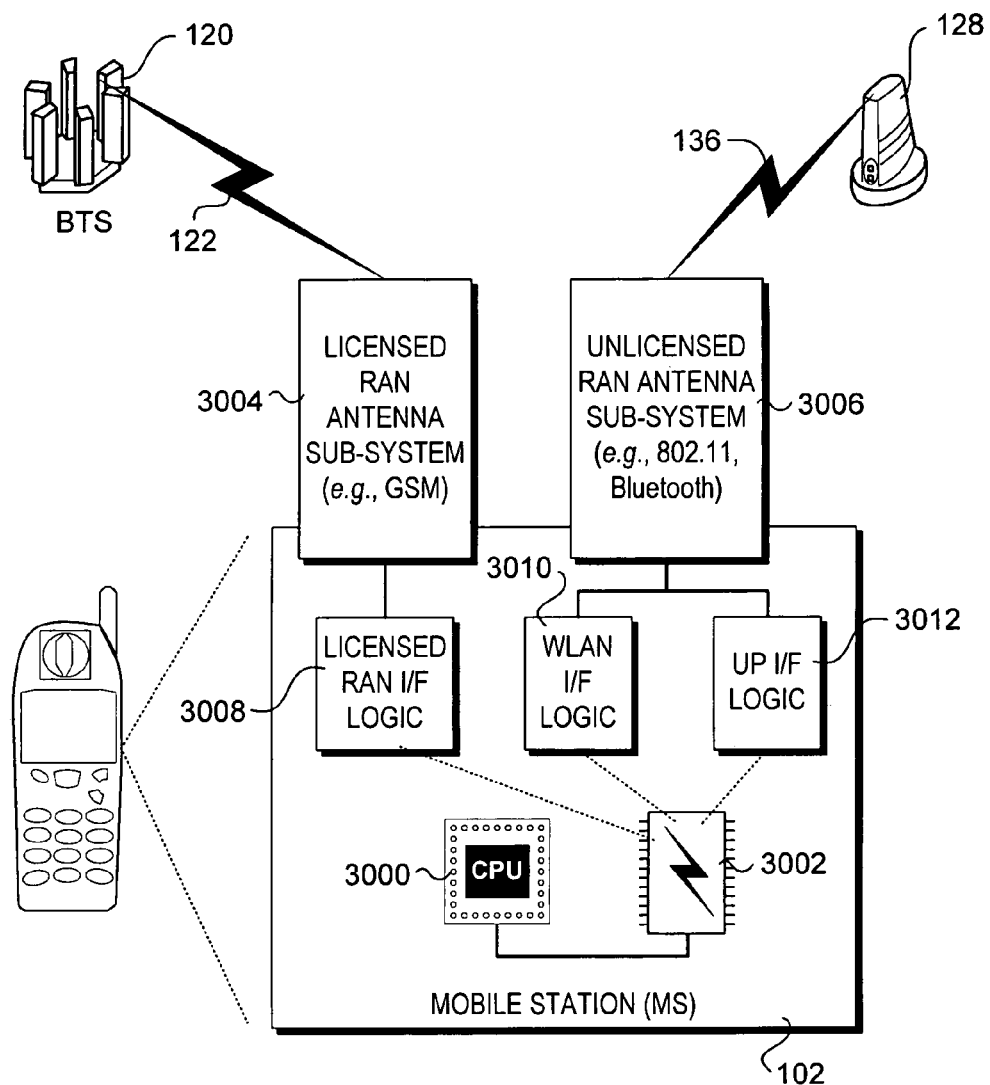
FIG. 30 is a schematic block diagram illustrating one embodiment of a high-level architecture of a mobile station.

FIG. 30 shows a block diagram illustrating a high-level architecture for one embodiment of a mobile station. The architecture includes a processor 3000 coupled to a non-volatile memory 3002, a licensed RAN antenna sub-system 3004 and an unlicensed RAN antenna sub-system 3006. Non-volatile memory 3002 is used to store software/firmware instructions for performing various functions and operations described herein. These functions and operations are depicted licensed RAN interface logic 3008, WLAN interface logic 3010, and Up interface logic 3012.

Licensed RAN antenna subs-system 3004 and licensed RAN interface logic 3008 are employed to facilitate conventional licensed RAN operations. For example, in one embodiment the licensed RAN comprises a GSM network, and thus these components facilitate normal GSM network operations typically employed by GSM-based cellular devices and the like, which are well-known in the cellular communication art. Meanwhile, the unlicensed RAN antenna system 3006 and WLAN interface logic 3010 are used to support an unlicensed wireless channel (i.e., link) 136 with an access point 128 via which UMAN services may be accessed. In general, these blocks represent conventional components and logic employed to support communications over an unlicensed WLAN link. For example, these components are illustrative of components that may be employed to implement the Bluetooth lower layers shown in FIG. 3B for a Bluetooth link, or the 802.11 lower layers shown in FIG. 3C for an 802.11 link.

Up interface logic 3012 is used to provide the MS-side Up interface functions and operations described herein. This includes generating and processing various URR messages, as well as providing the various UP interface layers depicted in FIGS. 3A and 3D-F.

As discussed above, the various message formats depicted herein are exemplary. However, each message should include a basic set of information elements including a protocol discriminator, a skip indicator, and a message identity. The inclusion of an UCI information element as a basic IE is depicted in the exemplary message formats illustrated herein; however, the UCI IE or a similar IE for indicating whether a message is a first message, other message, or emergency-related is not required and this functionality may be facilitated by other means, such as by maintaining appropriate state information on the communicating devices (i.e., mobile stations and UNCs).

Under a proposed implementation, message delineation over a streaming transport (e.g., TCP) is performed by the underlying transport itself. Accordingly, there is not a need to include an information element specifying the length of a variable-length message format. However, this is not meant to be limiting, as the use of an information element for specifying the length of a message is contemplated by the inventors as another means for delineating streamed messages.

The formats of the various information elements is also merely exemplary. For example, a given set of information may be provided via a single IE or via multiple IEs. Furthermore, the information contained in the IEs depicted herein may be arranged in other formats and/or grouped in alternate manners.

The means for facilitating various message generation and processing operations, as well as various aspects of the Up interface may include execution of software/firmware instructions on an appropriate processing element, such as, but not limited to, a processor, multiple processors, a multi-core processor, a microcontroller, etc. Thus, embodiments of this invention may be used as or to support instructions executed upon some form of processing core or otherwise implemented or realized upon or within a machine-readable medium. A machine-readable medium includes any mechanism for storing or transmitting information in a form readable by a machine (e.g., a computer). For example, a machine-readable medium can include a read only memory (ROM); a random access memory (RAM); a magnetic disk storage media; an optical storage media; and a flash memory device, etc. In addition, a machine-readable medium can include propagated signals such as electrical, optical, acoustical or other form of propagated signals (e.g., carrier waves, infrared signals, digital signals, etc.). For example, in one contemplated implementation, instructions embodied as software upgrades for facilitating UMA messaging may be downloaded to a mobile device via a wireless link, such as a UMAN or GSM link.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

APPENDIX I

Table Of Acronyms

| Acronym | Definition |
|---|---|
| AP | Access Point |
| ARFCN | Absolute RF Channel Number |
| ATM | Asynchronous Transfer Mode |
| ATM VC | ATM Virtual Circuit |
| BA | BCCH Allocation |
| BAS | Broadband Access System |
| BB | Broadband |
| BCCH | Broadcast Common Control Channel |
| BRAS | Broadband Remote Access System |
| BSC | Base Station Controller |
| BSS | Base Station Subsystem |
| BSSGP | Base Station System GPRS Protocol |
| BSSMAP | Base Station System Management Application Part |
| BTS | Base Transceiver Station |
| CDMA | Code Division Multiple Access |
| CGI | Cell Global Identification |
| CIC | Circuit Identity Code |
| CLIP | Calling Line Presentation |
| CM | Connection Management |
| CPE | Customer Premises Equipment |
| CS | Circuit Switched |
| CVSD | Continuos Variable Slope Delta modulation |
| DSL | Digital Subscriber Line |
| DSLAM | DSL Access Multiplexer |
| DTAP | Direct Transfer Application Part |
| ETSI | European Telecommunications Standards Institute |
| FCAPS | Fault-management, Configuration, Accounting, Performance, and Security |
| FCC | US Federal Communications Commission |
| GERAN | GSM Edge Radio Access Network |
| GGSN | Gateway GPRS Support Node |
| GMM/SM | GPRS Mobility Management and Session Management |
| GMSC | Gateway MSC |
| GSM | Global System for Mobile Communication |
| GPRS | General Packet Radio Service |
| GSN | GPRS Support Node |
| GTP | GPRS Tunnelling Protocol |
| HLR | Home Location Register |
| IAN | Indoor Access Network (see also UMA Cell) |
| IAN-RR | Indoor Access Network Radio Resource Management |
| IBS | Indoor Base Station. |
| IBSAP | IBS Application Protocol |

APPENDIX I-continued

Table Of Acronyms

| Acronym | Definition |
|---|---|
| IBSMAP | IBS Management Application Protocol |
| IEP | IAN Encapsulation Protocol |
| IETF | Internet Engineering Task Force |
| IMEI | International Mobile Station Equipment Identity |
| IMSI | International Mobile Subscriber Identity |
| INC | Indoor Network Controller |
| INC | Indoor Network Controller |
| IP | Internet Protocol |
| ISDN | Integrated Services Digital Network |
| ISP | Internet Service Provider |
| ISP IP | Internet Service Provider's IP |
| IST | IAN Secure Tunnel |
| ISUP | ISDN User Part |
| ITP | IAN Transfer Protocol |
| LA | Location Area |
| LAI | Location Area Identification |
| LLC | Logical Link Control |
| MAC | Medium Access Control |
| MAP | Mobile Application Part |
| MDN | Mobile Directory Number |
| MG | Media Gateway |
| MM | Mobility Management |
| MM | Mobility Management |
| MS | Mobile Station |
| MSC | Mobile Switching Center |
| MSC | Mobile Switching Center |
| MSISDN | Mobile Station International ISDN Number |
| MSRN | Mobile Station Roaming Number |
| MTP1 | Message Transfer Part Layer 1 |
| MTP2 | Message Transfer Part Layer 2 |
| MTP3 | Message Transfer Part Layer 3 |
| NAPT | Network Address and Port Translation |
| NAT | Network Address Translation |
| NS | Network Service |
| PCM | Pulse Code Modulation |
| PCS | Personal Communication Services |
| PCS | Personal Communications Services |
| PLMN | Public Land Mobile Network |
| POTS | Plain Old Telephone Service |
| PPP | Point-to-Point Protocol |
| PPPoE | PPP over Ethernet protocol |
| PSTN | Public Switched Telephone Network |
| P-TMSI | Packet Temporary Mobile Subscriber Identity |
| QoS | Quality of Service |
| RA | Routing Area |
| RAC | Routing Area Code |
| RAI | Routing Area Identification |
| RAI | Routing Area Identity |
| RAN | Radio Access Network |
| RF | Radio Frequency |
| RFC | Request for Comment (IETF Standard) |
| RLC | Radio Link Control |
| RR | Radio Resource Management |
| RTCP | Real Time Control Protocol |
| RTCP | Real Time Control Protocol |
| RTP | Real Time Protocol |
| RTP | Real Time Protocol |
| SAP | Service Access Point |
| SCCP | Signaling Connection Control Part |
| SCO | Synchronous Connection-Oriented |
| SDCCH | Standalone Dedicated Control Channel |
| SGSN | Serving GPRS Support Node |
| SMC | Short Message Service Centre |
| SMS | Short Message Service |
| SM-SC | Short Message Service Centre |
| SMS-GMSC | Short Message Service Gateway MSC |
| SMS-IWMSC | Short Message Service Interworking MSC |
| SNDCP | SubNetwork Dependent Convergence Protocol |
| SS | Supplementary Service |
| SSL | Secure Sockets Layer |
| TCAP | Transaction Capabilities Application Part |
| TCP | Transmission Control Protocol |
| TCP | Transmission Control Protocol |
| TLLI | Temporary Logical Link Identity |
| TMSI | Temporary Mobile Subscriber Identity |
| TRAU | Transcoder and Rate Adaptation Unit |
| TTY | Text telephone or teletypewriter |

APPENDIX I-continued

Table Of Acronyms

| | |
|---|---|
| UDP | User Datagram Protocol |
| UMA Cell | Unlicensed Mobile Access Cell (see also IAN) |
| UMTS | Universal Mobile Telecommunication System |
| UNC | UMA Network Controller (see also INC) |
| VLR | Visited Location Register |
| VMSC | Visited MSC |
| WLAN | Wireless Local Area Network |
| WSP IP | Wireless Service Provider's IP Network |

What is claimed is:

1. A method for facilitating operations in an unlicensed mobile access network (UMAN), the method comprising:
  establishing a dedicated connection between a mobile station (MS) and the UMAN via a UMA network controller (UNC);
  establishing a TCP (transmission control protocol) session between the MS and the UNC;
  sending unlicensed mobile access (UMA) radio link control (URLC) messages between the MS and the UNC to facilitate corresponding operations, each URLC message including,
    a protocol discriminator; and
    a message type via which the message may be identified; and
  transferring GPRS (general packet radio service) signaling or SMS (short message service) messages between the MS and UNC using a URLC DATA message, the URLC DATA message including an encapsulated Logical Link Control Packet Data Unit (LLC PDU) comprising signaling or SMS data to be transferred.

2. The method of claim 1, wherein the URLC DATA message includes:
  a required quality of service IE defining a throughput level used to perform the data transfer operation.

3. The method of claim 1, wherein the URLC DATA message includes:
  a temporary logical link identifier (TLLI) IE.

4. The method of claim 1, wherein the URLC DATA message includes:
  a packet flow identifier IE comprising information identifying a packet flow corresponding to the data transfer.

5. A method for facilitating operations in an unlicensed mobile access network (UMAN), the method comprising:
  establishing a dedicated connection between a mobile station (MS) and the UMAN via a UMA network controller (UNC);
  establishing a TCP (transmission control protocol) session between the MS and the UNC;
  sending unlicensed mobile access (UMA) radio link control (URLC) messages between the MS and the UNC to facilitate corresponding operations, each URLC message including,
    a protocol discriminator; and
    a message type via which the message may be identified,
  wherein the operations include performing a downlink flow control procedure between the UNC and the MS by:
    at the MS, detecting downlink flow control conditions for downlink data transfer from the UNC to the MS;
    calculating a downlink data rate that may be supported by the downlink flow control conditions; and
    sending a URLC-DFC (Downlink Flow Control)-REQ message from the MS to the UNC including an information element specifying a downlink data rate to be employed for the downlink.

6. A method for facilitating operations in an unlicensed mobile access network (UMAN), the method comprising:
  establishing a dedicated connection between a mobile station (MS) and the UMAN via a UMA network controller (UNC);
  establishing a TCP (transmission control protocol) session between the MS and the UNC;
  sending unlicensed mobile access (UMA) radio link control (URLC) messages between the MS and the UNC to facilitate corresponding operations, each URLC message including,
    a protocol discriminator; and
    a message type via which the message may be identified,
  wherein the operations include transferring GPRS user data between the MS and the UNC using a URLC UNITDATA message including an encapsulated Logical Link Control Packet Data Unit (LLC PDU) comprising the GPRS user data and sent over a UDP (User Datagram Protocol) transport.

7. The method of claim 6, wherein the URLC UNITDATA message is transferred from the MS to the UNC.

8. The method of claim 6, wherein the URLC UNITDATA message includes:
  a required quality of service IE defining a throughput level used to perform the data transfer operation.

9. The method of claim 6, wherein the URLC DATA message includes:
  a temporary logical link identifier (TLLI) IE.

10. The method of claim 6, wherein the URLC DATA message includes:
  a packet flow identifier IE comprising information identifying a packet flow corresponding to the data transfer.

11. An unlicensed mobile access (UMA) network controller (UNC) to operate in a UMA network (UMAN) comprising a first radio access network, the UNC comprising:
  a first network interface comprising an IP (Internet Protocol) Network interface;
  a second network interface comprising an Up interface, via which UMA messages are to be transmitted to and received from a mobile station (MS) via an access point communicatively coupled between the MS and the UNC, the Up interface including a plurality of layers implemented over the IP network interface;
  a third network interface, via which the UNC may be connected to a core network that is accessible to a second radio access network;
  means for generating and/or processing a plurality of UMA radio link control (URLC) messages transmitted over the Up interface to perform corresponding operations, wherein each of the URLC messages includes a set of basic information elements (IEs) including,
    a protocol discriminator;
    a skip indicator; and
    a message type via which the message may be identified;
  means for processing a URLC DATA message received from an MS, the URLC DATA message including an encapsulated Logical Link Control Packet Data Unit (LLC PDU) comprising data to be transferred to the core network via the UNC; and
  means for generating a URLC DATA message via which data is to be sent to the MS, the URLC DATA message including an encapsulated Logical Link Control Packet Data Unit (LLC PDU) comprising the data.

12. An unlicensed mobile access (UMA) network controller (UNC) to operate in a UMA network (UMAN) comprising a first radio access network, the UNC comprising:
- a first network interface comprising an IP (Internet Protocol) Network interface;
- a second network interface comprising an Up interface, via which UMA messages are to be transmitted to and received from a mobile station (MS) via an access point communicatively coupled between the MS and the UNC, the Up interface including a plurality of layers implemented over the IP network interface;
- a third network interface, via which the UNC may be connected to a core network that is accessible to a second radio access network;
- means for generating and/or processing a plurality of UMA radio link control (URLC) messages transmitted over the Up interface to perform corresponding operations, wherein each of the URLC messages includes a set of basic information elements (IEs) including,
  - a protocol discriminator;
  - a skip indicator; and
  - a message type via which the message may be identified; and
- means for processing a URLC UNITDATA message received from an MS, the URLC UNITDATA message including an encapsulated Logical Link Control Packet Data Unit (LLC PDU) comprising data to be transferred to the core network via the UNC and being sent over a UDP (User Datagram Protocol) transport; and
- means for generating a URLC UNITDATA message via which data is to be sent to the MS, the URLC UNITDATA message including an encapsulated Logical Link Control Packet Data Unit (LLC PDU) comprising the data and to be sent over a UDP (User Datagram Protocol) transport.

13. An unlicensed mobile access (UMA) network controller (UNC) to operate in a UMA network (UMAN) comprising a first radio access network, the UNC comprising:
- a first network interface comprising an IP (Internet Protocol) Network interface;
- a second network interface comprising an Up interface, via which UMA messages are to be transmitted to and received from a mobile station (MS) via an access point communicatively coupled between the MS and the UNC, the Up interface including a plurality of layers implemented over the IP network interface;
- a third network interface, via which the UNC may be connected to a core network that is accessible to a second radio access network;
- means for generating and/or processing a plurality of UMA radio link control (URLC) messages transmitted over the Up interface to perform corresponding operations, wherein each of the URLC messages includes a set of basic information elements (IEs) including,
  - a protocol discriminator;
  - a skip indicator; and
  - a message type via which the message may be identified;
- means for processing a URLC-DFC (Downlink Flow Control)-REQ message from an MS including an information element specifying a downlink data rate to be employed for a downlink portion of a URLC transport channel between the MS and the UNC; and
- means for adjusting the downlink data rate to correspond to the downlink data rate specified in the URLC-DFC-REQ message.

14. A mobile station (MS), comprising:
- a first wireless interface to access a first radio access network comprising a core network;
- a second wireless interface to access a second radio access network comprising an unlicensed mobile access network (UMAN) via an access point (AP) using an unlicensed radio frequency;
- an Up interface to communicate with the UMAN via a UMA network controller (UNC) communicatively coupled to the AP via an Internet Protocol (IP) network;
- means for generating and/or processing a plurality of UMA radio link control (URLC) messages transmitted over the Up interface to perform corresponding operations, wherein each of the URLC messages includes a set of basic information elements (IEs) including,
  - a protocol discriminator;
  - a skip indicator; and
  - a message type via which the message may be identified;
- means for processing a URLC DATA message received at the MS from a UNC, the URLC DATA message including an encapsulated Logical Link Control Packet Data Unit (LLC PDU) comprising data transferred from the core network via the UNC; and
- means for generating a URLC DATA message via which data is to be sent to the core network via a UNC, the URLC DATA message including an LLC PDU comprising the data.

15. A mobile station (MS), comprising:
- a first wireless interface to access a first radio access network comprising a core network;
- a second wireless interface to access a second radio access network comprising an unlicensed mobile access network (UMAN) via an access point (AP) using an unlicensed radio frequency;
- an Up interface to communicate with the UMAN via a UMA network controller (UNC) communicatively coupled to the AP via an Internet Protocol (IP) network;
- means for generating and/or processing a plurality of UMA radio link control (URLC) messages transmitted over the Up interface to perform corresponding operations, wherein each of the URLC messages includes a set of basic information elements (IEs) including,
  - a protocol discriminator;
  - a skip indicator; and
  - a message type via which the message may be identified;
- means for processing a URLC UNITDATA message received at the MS from a UNC, the URLC UNITDATA message including an encapsulated Logical Link Control Packet Data Unit (LLC PDU) comprising data transferred from the core network via the UNC and being sent over a UDP (User Datagram Protocol) transport; and
- means for generating a URLC UNITDATA message via which data is to be sent to the core network via a UNC, the URLC UNITDATA message including an encapsulated LLC PDU comprising the data and to be sent over a UDP transport.

16. A mobile station (MS), comprising:
- a first wireless interface to access a first radio access network;
- a second wireless interface to access a second radio access network comprising an unlicensed mobile access network (UMAN) via an access point (AP) using an unlicensed radio frequency;

an Up interface to communicate with the UMAN via a UMA network controller (UNC) communicatively coupled to the AP via an Internet Protocol (IP) network;

means for generating and/or processing a plurality of UMA radio link control (URLC) messages transmitted over the Up interface to perform corresponding operations, wherein each of the URLC messages includes a set of basic information elements (IEs) including,
 a protocol discriminator;
 a skip indicator; and
 a message type via which the message may be identified;

means for detecting downlink flow control conditions for downlink data transfer from a UNC to the MS;

means for calculating a downlink data rate that may be supported by the downlink flow control conditions; and means for generating a URLC-DFC (Downlink Flow Control)-REQ message including an information element specifying a downlink data rate to be employed for the downlink.

17. A computer-readable storage medium of an unlicensed mobile access (UMA) network controller (UNC) storing a computer program for execution by at least one processor, wherein said computer-readable storage medium does not comprise carrier signals, the computer program storing sets of instructions for:
 generating and processing a plurality of UMA radio link control (URLC) messages sent from the UNC to a mobile station (MS) and received at the UNC from the MS via an access point (AP) communicatively coupled between the UNC and the MS,
  wherein each of the URLC messages includes a set of basic information elements (IEs) including,
   a protocol discriminator;
   a skip indicator; and
   a message type via which the message may be identified; and receiving data from the MS using a URLC DATA message, the URLC DATA message including an encapsulated Logical Link Control Packet Data Unit (LLC PDU) comprising the data, the LLC PDU being extracted from the URLC DATA message at the UNC to obtain the data.

18. A computer-readable storage medium of an unlicensed mobile access (UMA) network controller (UNC) storing a computer program for execution by at least one processor, wherein said computer-readable storage medium does not comprise carrier signals, the computer program storing sets of instructions for:
 generating and processing a plurality of UMA radio link control (URLC) messages sent from the UNC to a mobile station (MS) and received at the UNC from the MS via an access point (AP) communicatively coupled between the UNC and the MS,
  wherein each of the URLC messages includes a set of basic information elements (IEs) including,
   a protocol discriminator;
   a skip indicator; and
   a message type via which the message may be identified; and
 sending data to the MS using a URLC DATA message, the URLC DATA message generated at the UNC and including an encapsulated Logical Link Control Packet Data Unit (LLC PDU) comprising the data, the LLC PDU for being extracted from the URLC DATA message at the MS to obtain the data.

19. A computer-readable storage medium of an unlicensed mobile access (UMA) network controller (UNC) storing a computer program for execution by at least one processor, wherein said computer-readable storage medium does not comprise carrier signals, the computer program storing sets of instructions for:
 generating and processing a plurality of UMA radio link control (URLC) messages sent from the UNC to a mobile station (MS) and received at the UNC from the MS via an access point (AP) communicatively coupled between the UNC and the MS,
  wherein each of the URLC messages includes a set of basic information elements (IEs) including,
   a protocol discriminator;
   a skip indicator; and
   a message type via which the message may be identified; and
 receiving data from the MS using a URLC UNITDATA message, the URLC UNITDATA message including an encapsulated Logical Link Control Packet Data Unit (LLC PDU) comprising the data and sent over a UDP (User Datagram Protocol) transport, the LLC PDU being extracted from the URLC UNITDATA message at the UNC to obtain the data.

20. A computer-readable storage medium of an unlicensed mobile access (UMA) network controller (UNC) storing a computer program for execution by at least one processor, wherein said computer-readable storage medium does not comprise carrier signals, the computer program storing sets of instructions for:
 generating and processing a plurality of UMA radio link control (URLC) messages sent from the UNC to a mobile station (MS) and received at the UNC from the MS via an access point (AP) communicatively coupled between the UNC and the MS,
  wherein each of the URLC messages includes a set of basic information elements (IEs) including,
   a protocol discriminator;
   a skip indicator; and
   a message type via which the message may be identified; and
 sending data to the MS using a URLC UNITDATA message, the URLC UNITDATA message generated at the UNC and including an encapsulated Logical Link Control Packet Data Unit (LLC PDU) comprising the data and sent over a UDP (User Datagram Protocol) transport, the LLC PDU for being extracted from the URLC UNITDATA message at the MS to obtain the data.

21. A computer-readable storage medium of an unlicensed mobile access (UMA) network controller (UNC) storing a computer program for execution by at least one processor, wherein said computer-readable storage medium does not comprise carrier signals, the computer program storing sets of instructions for:
 generating and processing a plurality of UMA radio link control (URLC) messages sent from the UNC to a mobile station (MS) and received at the UNC from the MS via an access point (AP) communicatively coupled between the UNC and the MS,
  wherein each of the URLC messages includes a set of basic information elements (IEs) including,
   a protocol discriminator;
   a skip indicator; and
   a message type via which the message may be identified;
 receiving a URLC-DFC (Downlink Flow Control)-REQ message from the MS including an information element specifying a downlink data rate to be employed for the downlink; and employing the downlink data rate that is specified for the downlink.

22. A computer-readable storage medium of a mobile station (MS) storing a computer program for execution by at least one processor, wherein said computer-readable storage medium does not comprise carrier signals, the computer program storing sets of instructions for:

generating and processing a plurality of unlicensed mobile access (UMA) radio link control (URLC) messages sent from the MS to an unlicensed network controller (UNC) and received at the MS from the UNC via an access point (AP) communicatively coupled between the UNC and the MS,
wherein each of the URLC messages includes a set of basic information elements (IEs) including,
a protocol discriminator;
a skip indicator; and
a message type via which the message may be identified;
sending data to the UNC using a URLC DATA message, the URLC DATA message generated at the MS and including an encapsulated Logical Link Control Packet Data Unit (LLC PDU) containing the data, the LLC PDU for being extracted from the URLC DATA message at the UNC to obtain the data; and
receiving data from the UNC using a URLC DATA message, the URLC DATA message including an encapsulated Logical Link Control Packet Data Unit (LLC PDU) comprising the data, the LLC PDU being extracted from the URLC DATA message at the MS to obtain the data.

23. A computer-readable storage medium of a mobile station (MS) storing a computer program for execution by at least one processor, wherein said computer-readable storage medium does not comprise carrier signals, the computer program storing sets of instructions for:

generating and processing a plurality of unlicensed mobile access (UMA) radio link control (URLC) messages sent from the MS to an unlicensed network controller (UNC) and received at the MS from the UNC via an access point (AP) communicatively coupled between the UNC and the MS,
wherein each of the URLC messages includes a set of basic information elements (IEs) including,
a protocol discriminator;
a skip indicator; and
a message type via which the message may be identified; and
sending data to the UNC using a URLC UNITDATA message, the URLC UNITDATA message generated at the MS and including an encapsulated Logical Link Control Packet Data Unit (LLC PDU) comprising the data and sent over a UDP (User Datagram Protocol) transport, the LLC PDU for being extracted from the URLC UNITDATA message at the UNC to obtain the data; and
receiving data from the UNC using a URLC UNITDATA message, the URLC UNITDATA message including an encapsulated Logical Link Control Packet Data Unit (LLC PDU) comprising the data and sent over a UDP (User Datagram Protocol) transport, the LLC PDU being extracted from the URLC UNITDATA message at the MS to obtain the data.

24. A computer-readable storage medium of a mobile station (MS) storing a computer program for execution by at least one processor, wherein said computer-readable storage medium does not comprise carrier signals, the computer program storing sets of instructions for:

generating and processing a plurality of unlicensed mobile access (UMA) radio link control (URLC) messages sent from the MS to an unlicensed network controller (UNC) and received at the MS from the UNC via an access point (AP) communicatively coupled between the UNC and the MS,
wherein each of the URLC messages includes a set of basic information elements (IEs) including,
a protocol discriminator;
a skip indicator; and
a message type via which the message may be identified;
detecting downlink flow control conditions for receiving downlink data from the UNC;
calculating a downlink data rate that may be supported by the downlink flow control conditions;
sending a URLC-DFC (Downlink Flow Control)-REQ message to the UNC including an information element specifying a downlink data rate to be employed for the downlink; and
employing the downlink data rate that is specified for the downlink.

* * * * *

UNITED STATES PATENT AND TRADEMARK OFFICE
CERTIFICATE OF CORRECTION

PATENT NO. : 7,606,190 B2  Page 1 of 1
APPLICATION NO. : 11/128461
DATED : October 20, 2009
INVENTOR(S) : Markovic et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 949 days.

Signed and Sealed this

Fourteenth Day of December, 2010

David J. Kappos
*Director of the United States Patent and Trademark Office*